(12) United States Patent
Kowal et al.

(10) Patent No.: US 11,661,073 B2
(45) Date of Patent: May 30, 2023

(54) ELECTRONICS TO REMOTELY MONITOR AND CONTROL A MACHINE VIA A MOBILE PERSONAL COMMUNICATION DEVICE

(71) Applicant: Hartford Fire Insurance Company, Hartford, CT (US)

(72) Inventors: Henry Z. Kowal, Simsbury, CT (US); Maureen King, Burlington, CT (US); Andrew J. Schneider, Madison, CT (US); Scott A. Luc, Waxhaw, NC (US); David K. Hagen, Southington, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 443 days.

(21) Appl. No.: 16/110,026

(22) Filed: Aug. 23, 2018

(65) Prior Publication Data
US 2020/0062274 A1 Feb. 27, 2020

(51) Int. Cl.
*G06Q 40/08* (2012.01)
*B60W 50/12* (2012.01)
(Continued)

(52) U.S. Cl.
CPC ........ *B60W 50/12* (2013.01); *B60W 50/0098* (2013.01); *G06Q 40/08* (2013.01); *G07C 5/008* (2013.01); *G07C 5/02* (2013.01); *B60W 2540/043* (2020.02); *B60W 2710/18* (2013.01); *B60W 2710/20* (2013.01); *B60W 2710/30* (2013.01)

(58) Field of Classification Search
CPC ........ G06Q 40/08; G06Q 50/30; G06Q 30/02; G06Q 10/06; G06Q 40/00; G06Q 10/0635; B60W 2540/30; B60W 50/14; B60W 40/09
See application file for complete search history.

(56) References Cited

U.S. PATENT DOCUMENTS 8,140,358 B1 3/2012 Ling et al.
8,635,091 B2 1/2014 Amigo et al.
(Continued)

*Primary Examiner* — Hao Fu
(74) *Attorney, Agent, or Firm* — Buckley, Maschoff & Talwalkar LLC

(57) ABSTRACT

Embodiments may monitor operation of a machine and provide feedback to maintain use within certain parameters. Mobile personal communication device sensors are each configured to monitor at least one machine parameter (speed, acceleration, location, etc.), generate a signal encapsulating the monitored machine parameter, and transmit the generated sensor signals to a control unit of the communication device. The control unit may receive the generated sensor signals, store the received signals, and selectively combine the received signals. The communication device also includes a transmitter coupled to the control unit capable of transmitting the combined signal. A transceiver remote from the machine may determine a current machine condition and compare that condition to received conditions from other machines. Feedback may then be provided to adjust operation of the machine based on the comparison. For example, an operator interface may provide audio and/or visual feedback to the operator of a vehicle.

20 Claims, 35 Drawing Sheets

(51) Int. Cl.
*G07C 5/00* (2006.01)
*G07C 5/02* (2006.01)
*B60W 50/00* (2006.01)

(56) References Cited

U.S. PATENT DOCUMENTS

| | | | |
|---|---|---|---|
| 8,731,768 B2 | 5/2014 | Fernandes et al. | |
| 8,738,523 B1 * | 5/2014 | Sanchez | G06Q 40/00 |
| | | | 705/4 |
| 8,768,734 B2 | 7/2014 | Gryan et al. | |
| 8,799,032 B2 | 8/2014 | Fernandes et al. | |
| 8,892,451 B2 | 11/2014 | Everett et al. | |
| 8,930,229 B2 | 1/2015 | Bowne et al. | |
| 8,930,231 B2 | 1/2015 | Bowne et al. | |
| 9,037,394 B2 | 5/2015 | Fernandes et al. | |
| 9,070,168 B2 | 6/2015 | Amigo et al. | |
| 9,111,316 B2 | 8/2015 | Fernandes et al. | |
| 9,311,858 B2 | 4/2016 | Cho et al. | |
| 9,418,382 B2 | 8/2016 | Gryan et al. | |
| 9,424,751 B2 | 8/2016 | Hodges et al. | |
| 9,524,593 B2 | 12/2016 | Amigo et al. | |
| 9,672,569 B2 | 6/2017 | Fernandes et al. | |
| 9,672,571 B2 | 6/2017 | Fernandes et al. | |
| 9,754,424 B2 | 9/2017 | Ling et al. | |
| 9,865,018 B2 | 1/2018 | Bowne et al. | |
| 10,664,917 B1 * | 5/2020 | Wasserman | G01C 21/3453 |
| 2011/0307188 A1 | 12/2011 | Peng et al. | |
| 2013/0006674 A1 | 1/2013 | Bowne et al. | |
| 2013/0046510 A1 | 2/2013 | Bowne et al. | |
| 2013/0179198 A1 | 7/2013 | Bowne et al. | |
| 2014/0067434 A1 * | 3/2014 | Bourne | G06Q 40/08 |
| | | | 705/4 |
| 2014/0266789 A1 * | 9/2014 | Matus | H04Q 9/00 |
| | | | 340/870.07 |
| 2014/0343972 A1 | 11/2014 | Fernandes et al. | |
| 2015/0149219 A1 | 5/2015 | Bowne et al. | |
| 2015/0170289 A1 | 6/2015 | Bowne et al. | |
| 2015/0170290 A1 | 6/2015 | Bowne et al. | |
| 2015/0332518 A1 | 11/2015 | Menon et al. | |
| 2016/0351050 A1 * | 12/2016 | Takahara | G08G 1/0968 |
| 2016/0375908 A1 * | 12/2016 | Biemer | G07C 5/008 |
| | | | 701/1 |
| 2017/0021764 A1 * | 1/2017 | Adams | G06Q 40/08 |
| 2017/0132712 A1 | 5/2017 | Bowne et al. | |
| 2017/0132713 A1 | 5/2017 | Bowne et al. | |
| 2017/0263061 A1 | 9/2017 | Mann et al. | |
| 2017/0270615 A1 | 9/2017 | Fernandes et al. | |
| 2017/0270617 A1 | 9/2017 | Fernandes et al. | |
| 2017/0287076 A1 | 10/2017 | Bowne et al. | |
| 2017/0366945 A1 | 12/2017 | Uliyar et al. | |
| 2018/0003516 A1 * | 1/2018 | Khasis | G08G 1/20 |
| 2018/0068392 A1 | 3/2018 | Bowes et al. | |
| 2018/0077538 A1 | 3/2018 | Matus et al. | |
| 2018/0268695 A1 * | 9/2018 | Agnew | B60K 28/066 |
| 2018/0270241 A1 * | 9/2018 | Herrmann | B62D 15/021 |
| 2018/0345981 A1 * | 12/2018 | Ferguson | B60W 40/09 |

* cited by examiner

| VEHICLE IDENTIFIER 2902 | CUSTOMER NAME (POLICY NO.) 2904 | DATE/TIME 2906 | SMARTPHONE IDENTIFIER 2908 | ... | VEHICLE SPEED 2910 |
|---|---|---|---|---|---|
| V_10001 | JANE DOE | 08/23/2020 (11:20) | 555-123-4567 | ... | 85 MPH |
| V_10002 | JOHN WEST | 9/23/2020 (29:25) | 555-111-2222 | ... | 40 MPH |
| V_10003 | SHIRLEY GREENE | 9/27/2020 (08:30) | 555-987-6543 | ... | 70 MPH |
| V_10004 | LAWRENCE JONES | 09/30/2020 (13:35) | 555-555-5555 | ... | 30 MPH |

| VEHICLE IDENTIFIER 3002 | CUSTOMER NAME (POLICY NO.) 3004 | MANUFACTURER (MODEL) 3006 | SAFETY FEATURE 1 3008 | ... | SAFETY FEATURE N 3010 |
|---|---|---|---|---|---|
| V_10001 | JANE DOE (P_123456789) | HONDA (ACCORD) | ANTI-LOCK BRAKES | ... | BRAKE WARNING |
| V_10002 | JOHN WEST (P_987654321) | TOYOTA (PRIUS) | ADAPTIVE HEADLIGHTS | ... | LANE DEPARTURE WARNING |
| V_10003 | SHIRLEY GREENE (P_100000001) | FORD (TRUCK) | TIRE SENSORS | ... | CAMERA |
| V_10004 | LAWRENCE JONES (P_567894321) | CADILLAC (SUV) | ADAPTIVE HEADLIGHTS | ... | AUTONOMOUS PARKING |

ELECTRONICS TO REMOTELY MONITOR AND CONTROL A MACHINE VIA A MOBILE PERSONAL COMMUNICATION DEVICE

BACKGROUND

Machines, such as motor vehicles and the like, are often used in a non-complaint manner. That is, machines are used beyond the rules and laws that define their use. Often operators of machines misrepresent or underrepresent how they use their machines. Sometimes such misrepresentations are intentional to enable the user to obtain certain benefits and to be able to use the machines outside the rules and laws. Other times, operators do not even realize how they operate the machine. As such, a need exists for electronics for remotely monitoring and/or controlling the use of a machine. Moreover, it may be desirable to provide systems and methods for remotely monitoring and/or controlling the use of a machine that provides faster, more accurate results.

SUMMARY OF THE INVENTION

According to some embodiments, systems, methods, apparatus, computer program code and means are provided for remotely monitoring and/or controlling the use of a machine that provides faster, more accurate results and that allow for flexibility and effectiveness when responding to those results. Some embodiments may monitor operation of a machine and provide feedback to maintain use within certain parameters. Mobile personal communication device sensors are each configured to monitor at least one machine parameter (speed, acceleration, location, etc.), generate a signal encapsulating the monitored machine parameter, and transmit the generated sensor signals to a control unit of the communication device. The control unit may receive the generated sensor signals, store the received signals, and selectively combine the received signals. The communication device also includes a transmitter coupled to the control unit capable of transmitting the combined signal. A transceiver remote from the machine may determine a current machine condition and compare that condition to received conditions from other machines. Feedback may then be provided to adjust operation of the machine based on the comparison. For example, an operator interface may provide audio and/or visual feedback to the operator of a vehicle.

Some embodiments comprise: means for accessing a risk relationship data store containing electronic records, each electronic record including a risk relationship identifier along with at least one operator identifier and at least one machine identifier; means for receiving, at a back-end application computer server, machine information representing operation of the machine, from an application executing on the mobile personal communication device, including at least one of geo-position information and machine kinematics data, via a distributed communication network; means for determining a risk relationship identifier associated with the received machine information; based on the received machine information, means for automatically predicting an operator identifier associated with the received machine information, wherein said prediction utilizes a prediction algorithm based on a pattern detected via a machine learning analysis of past operator usage of the machine; means for calculating a risk score for the risk relationship based on the at least one of the geo-position information and machine kinematics data along with the predicted operator identifier; and means for updating the appropriate electronic record in the risk relationship data store with the calculated risk score.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way for remotely monitoring and/or controlling the use of a machine that provides faster, more accurate results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 29 is a portion of a smartphone data database according to some embodiments.

FIG. 30 is a portion of a tabular vehicle database in accordance with some embodiments.

DETAILED DESCRIPTION

Figure 1:
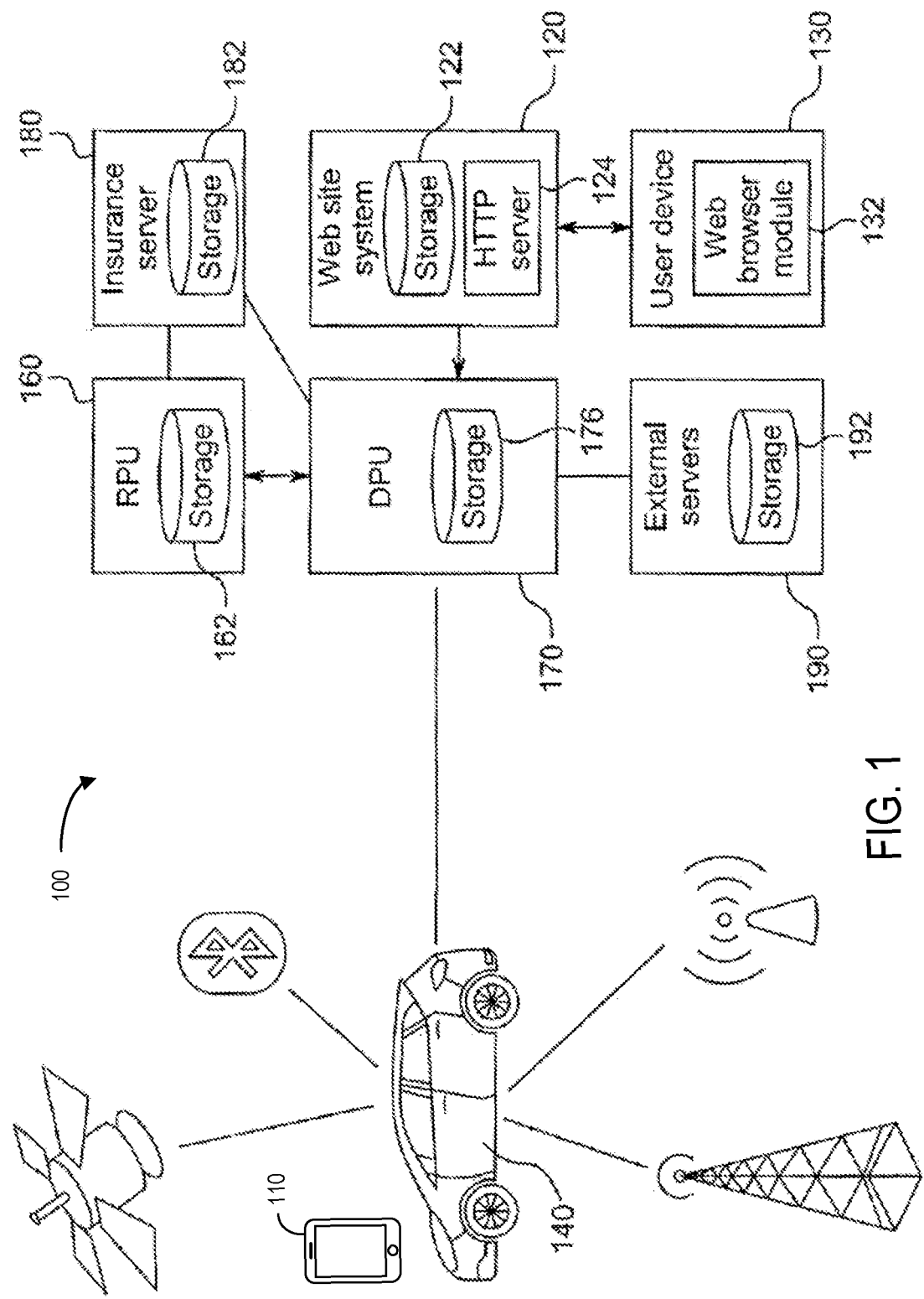
FIG. 1 shows an example system architecture that may be used for remotely monitoring the use of a vehicle.

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of machine monitoring, control, and/or analysis by providing benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, updated, and analyzed via a back-end-end application server to accurately improve machine learning algorithms and the exchange of information, thus improving the overall efficiency of the system associated with message storage requirements and/or bandwidth considerations (e.g., by reducing the number of messages that need to be transmitted via a network). Moreover, embodiments associated with collecting accurate information might further improve risk values, predictions of risk values, allocations of resources, risk relationship decisions, etc.

A system and method configured to monitor use conditions of a vehicle and provide feedback to a user of the vehicle to maintain use within certain parameters is described. The description includes a plurality of sensors located proximate to the vehicle, each sensor configured to monitor at least one vehicle parameter, the plurality of sensors selected from an accelerometer, speed, temperature, mileage, oil level, oil pressure, run-time and location sensors, each sensor generating a signal encapsulating the monitored vehicle parameter and transmitting the generated signal to a control unit. The description includes a control unit that receives the generated signal from each of a plurality of sensors, the control unit including a memory that stores the received signal and selectively combines the received signal with other signals received from others of the plurality of sensors. The description includes a first transmitter coupled to the control unit capable of transmitting the combined signal. The description includes a second transceiver remote from the vehicle that receives a transmitted condition, and compares that condition to received conditions from other vehicles and provides feedback to adjust the use of the vehicle based on the comparison, and a user interface for providing feedback to a user including at least one of visual indication, audible indication, and physically altering the use of the vehicle. The description includes coupling of the plurality of sensors to the control unit with a controller area bus (CAN). The first transmitter may transmit over an RF network.

FIG. 1 shows an example system 100 that may be used for monitoring a vehicle. The example system 100 includes a vehicle 140 having an operator with a smartphone 110 executing a telematics application such as a TrueLane® application. The telematics devices may further include tablets, laptops, OEM connectivity devices and/or similar devices. The vehicle 140 may be in communication with multiple devices over different networks, including a satellite, a cellular station, a Wi-Fi hotspot, BLUETOOTH devices, and/or a smartphone 110 (which might instead communicate directly with cellular stations and/or Wi-Fi hotspots and not the vehicle 140). The smartphone 110 may be operated by a third-party vendor that collects telematics data. The smartphone 110 may include storage. The smartphone 110 may sense and collect the telematics data and then transmit the telematics data to a Data Processing Unit ("DPU") 170. The telematics data may be communicated to the DPU 170 in any number of formats. The telematics data may be transmitted as raw data, it may be transmitted as summary data, or it may be transmitted in a format requested by the DPU 170. For example, the DPU 170 may transmit a customized summary of the telematics data to the DPU 170, in a format usable by the DPU 170. The DPU 170 may also be configured to communicate with a Risk and Pricing Unit ("RPU") 160 including storage 162, internal servers 180, including storage 182, and external servers 190 (e.g. social media networks, official/government networks), which are all connected by one or more networks.

The one or more telematics devices associated with the vehicle 140 may communicate with a satellite, Wi-Fi hotspot, BLUETOOTH devices and even other vehicles. The telematics devices associated with the vehicle 140 report this information to the smartphone 110 which may also directly detect telematics data. As will be described in greater detail hereafter, the smartphone 110 may transmit this telematics data to the DPU 170 which may be configured to consolidate biographic and telematics data to monitor the use of the vehicle 140.

The web site system 120 provides a web site that may be accessed by a user device 130. The web site system 120 includes a Hypertext Transfer Protocol ("HTTP") server module 124 and a database 122. The HTTP server module 124 may implement the HTTP protocol, and may communicate Hypertext Markup Language ("HTML") pages and related data from the web site to/from the user device 130 using HTTP. The web site system 120 may be connected to one or more private or public networks (such as the Internet), via which the web site system 120 communicates with devices such as the user device 130. The web site system 120 may generate one or more web pages that provide communication setting information, may communicate the web pages to the user device 130, and may receive responsive information from the user device 130.

The HTTP server module 124 in the web site system 120 may be, for example, an APACHE HTTP server, a SUN-ONE Web Server, a MICROSOFT Internet Information Services ("ITS") server, and/or may be based on any other appropriate HTTP server technology. The web site system 120 may also include one or more additional components or modules (not depicted), such as one or more load balancers, firewall devices, routers, switches, and devices that handle power backup and data redundancy.

The user device 130 may be, for example, a cellular phone (including the smartphone 110), a desktop computer, a laptop computer, a tablet computer, or any other appropriate computing device. The user device 130 may further be configured to operate as a telematics device. The user device 130 includes a web browser module 132, which may communicate data related to the web site to/from the HTTP server module 124 in the web site system 120. The web browser module 132 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 132 may implement Rich Internet Application ("RIA") and/or multimedia technologies such as ADOBE FLASH, MICROSOFT SILVERLIGHT, and/or other technologies. The web browser module 132 may implement RIA and/or multimedia technologies using one or more web browser plug-in modules (such as, for example, an ADOBE FLASH or MICROSOFT SILVERLIGHT plug-in), and/or using one or more sub-modules within the web browser module 132 itself. The web browser module 132 may display data on one or more display devices (not depicted) that are included in or connected to the user device 130, such as a liquid crystal display (LCD) display or monitor. The user device 130 may receive input from the user of the user device 130 from input devices (not depicted) that are included in or connected to the user device 130, such as a keyboard, a mouse, or a touch screen, and provide data that indicates the input to the web browser module 132.

The example system 100 of FIG. 1 may also include one or more wired and/or wireless networks (not depicted), via which communications between the elements in the example system 100 may take place. The networks may be private or public networks, and/or may include the Internet.

Each or any combination of the modules shown in FIG. 1 may be implemented as one or more software modules, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules may perform any of the functionality described herein.

The smartphone 110 may include one or more sensors, such as an accelerometer, speed and location sensors, for example. By way of non-limiting example only, these sensors may include temperature as well as systems that provide other types of vehicle data. Other types of sensors including impact sensors, chemical sensors and pressure sensors may be utilized in the present system.

Figure 2A:
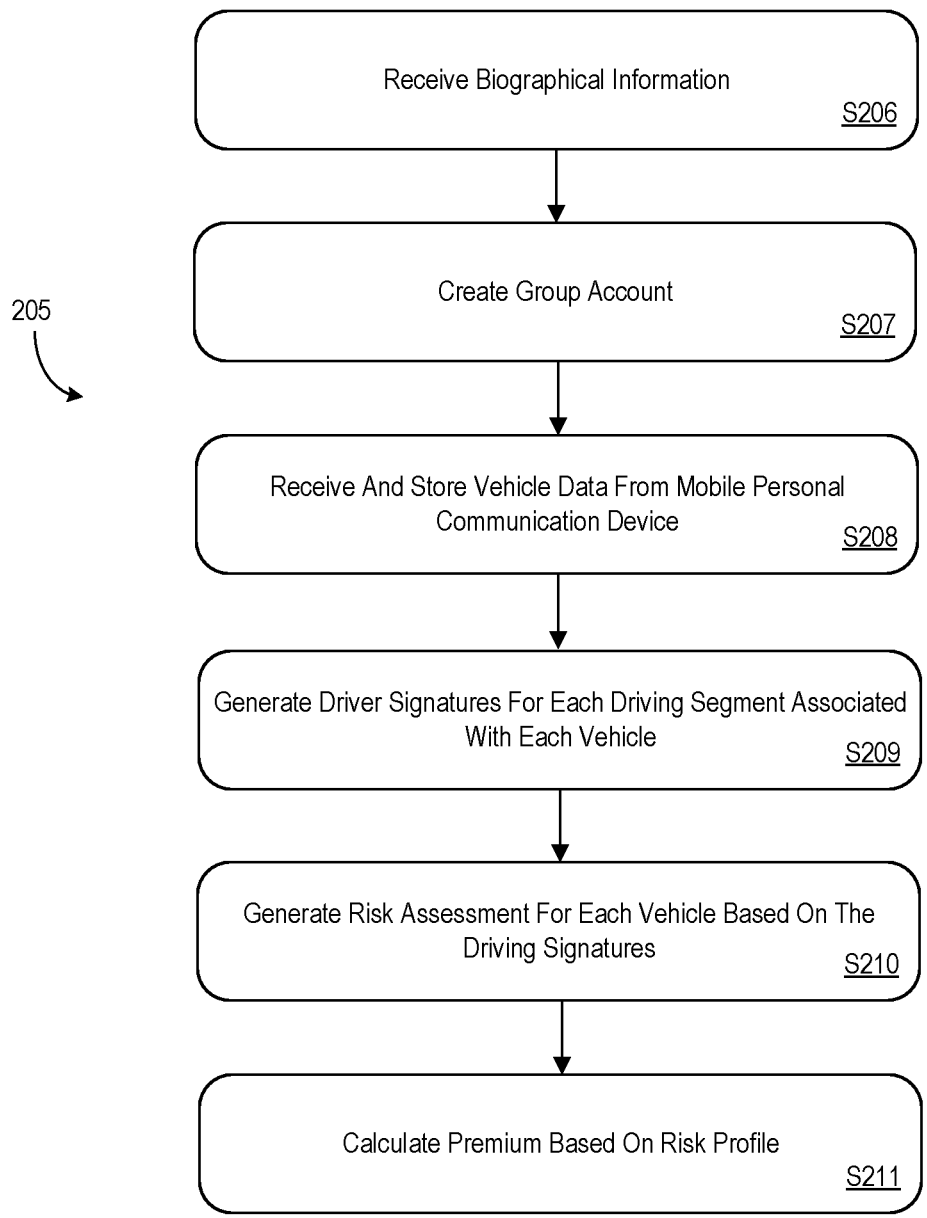
FIG. 2A shows a flow diagram for a method for determining pricing based on driver signatures associated with a vehicle.

FIG. 2A shows an example for a method 205 for determining driver signatures. The system 100 receives biographical information regarding the user (S206). This information may include information (such as the number of family members, age, marital status, education, address information, number and type of vehicles). Based on this information, the system 100 may create a group account (S207). The group account may include subaccounts for each vehicle, wherein each vehicle may have multiple drivers. For each vehicle, the system 100 may create a use profile. The use profile is based on the indicated amount of use of each vehicle, by each driver. The system 100 may use correlative data based on stored information (including historic driver data associated with each driver, statistical/demographic information, and biographical data) and other actuarial factors to determine a risk assessment associated with insuring each vehicle. This risk assessment may include expected claims and/or losses associated with the vehicle. The system 100 may use this risk assessment to determine pricing information for the account. This initial risk assessment may be based on correlative data (i.e. using the biographic/demographic data as a proxy for actual driving behavior.) This may include driver risk assessment, vehicle risk assessment, policy risk assessment or any appropriate risk assessment. The risk assessment may be represented as a profile, a score (or set of scores) or similar information stored in a database. Once the system 100 has generated the group account, it may begin to receive and store the vehicles' telematics data received from a "mobile personal communication device," such as a smartphone or smartwatch (S208). As used herein, the phrase "mobile personal communication device" may refer to any dive having a primary purpose other than detecting and/or collecting telematics data. In this, and insurance enterprise may leverage hardware already owned by consumers to appropriately administer insurance policies. The system 100 may use software based algorithms to analyze received telematics data. For example, the system 100 may be configured to cluster certain driver characteristics in the telematics data to identify discrete segments of use associated with a particular driver signature. The system 100 may be configured to associate each of these driver signatures with a driver (known or unknown) (S209). The system 100 may then categorize the usage of each vehicle based on these driver signatures. In one example, the system 100 may determine the amount of time each vehicle is used by driver signatures associated with known and unknown drivers. The system 100 may adjust the risk assessment associated with the vehicle based on the number of driver signatures identified as well as an analysis of the type of driving the driver signature indicates (e.g. aggressive, distracted, cautious, etc.) (S210). The risk assessment, generated by the system 100, may be a risk profile associated with the vehicle or the driver.

Once the driver signature is determined, the telematics data may be stored as data using attributes of the driver. This database storage of the captured telematics signals may reduce the data and identify the driver based on the attributes of the driver signature. The database storing by identified driver, as an attribute of the driver, improves the efficiency and power usage of the processor in accessing and using the signals from the telematics data.

Alternatively, the system 100 may be configured to generate an aggregate risk profile for the group of vehicles, without individually assessing each driver or vehicle. Based on these driver signatures, the system 100 may be configured to assess the risks associated with coverage based on causal data in addition to or instead of correlative data. The system 100 may use these risks to adjust the pricing information (S211). The pricing information may be adjusted by adjusting the assessed rate, or providing the customer with a discount, a credit or a penalty. In another example, the pricing information may be adjusted by placing the vehicle or driver in a different rate category.

Figure 2B:
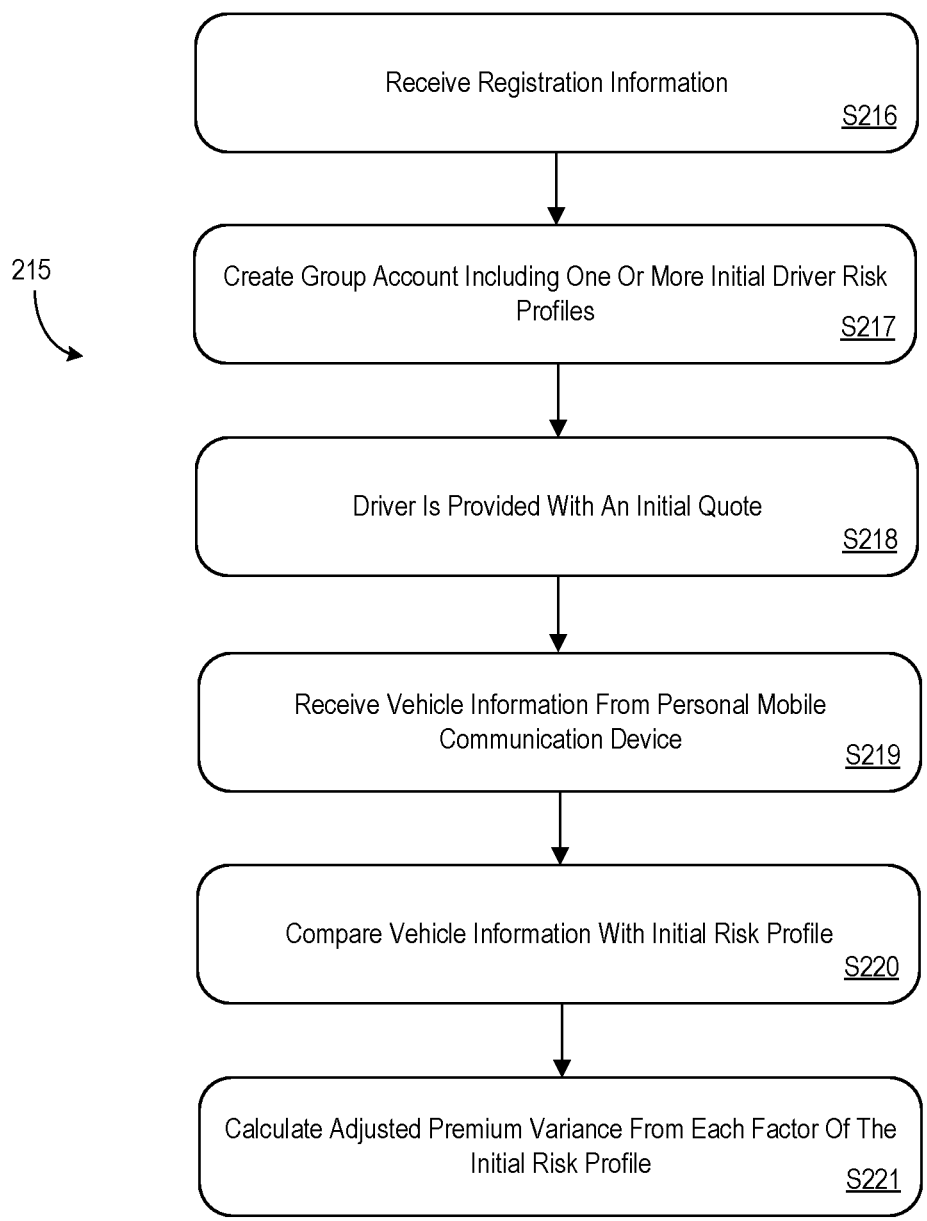
FIG. 2B shows a flow diagram for a method for expectation based processing.

FIG. 2B shows an example for a method 215 for expectation based processing. The system 100 receives registration information regarding the user (S216). This information may include biographical information (such as the numbers of family members, age, marital status, education, address information, number and type of vehicles). Based on this information, the system 100 creates a group account (S217). The group account may include subaccounts for each individual driver (in the case of multiple insured). The system 100 uses a software based algorithm to generate initial driver risk profiles, based on stored loss statistics. The system 100 may then generate pricing information based on this initial risk profile (S218). If the user accepts the pricing, the account is activated and the system 100 begins receiving and stores driver telematics data (associated with the account) that is received from a smartphone (S219). At predetermined or requested intervals, the system compares the received telematics data and compares each measured value with the expected value in the initial driver risk profile (S220). Using software based algorithms, the system 100 may credit or penalize each driver based on variances from the initial driver expectation profile and determine pricing information, including adjusting a rate, providing a credit or penalty, deny coverage, or recommend a different insurance product (S221). As opposed to previous systems which merely adjusted rates on a whole premium basis. The system 100 is configured to adjust the pricing based on multiple factors determined by the telematics data. The system 100 may be able to adjust the pricing in multiple ways, for example by adjusting the rate, or providing a credit, or a penalty, based on the telematics data. Alternatively, the system 100 may be configured to generate an initial risk profile on a group basis. For example, for a family of four with two cars and four drivers, an aggregate initial risk profile may be generated. Based on this aggregate initial risk profile, the group is assessed a premium based on driver averaging. Accordingly, if the aggregate telematics data varies from the aggregate initial driver risk profile, the pricing may be adjusted by adjusting the rate, crediting or penalizing the account, denying continuing coverage, or recommending a different insurance product for the user. The updated pricing information may be presented to the user of a user device 130. The techniques described herein may be used to compare various methods of determining the pricing of vehicle insurance. For example, some companies may use a blended rate to determine premiums; others may determine this based on attributing the worst driver on a policy to the highest risk vehicle. Using the methods described herein, the insurance company can adjust the pricing information from either scheme.

Figure 2C:
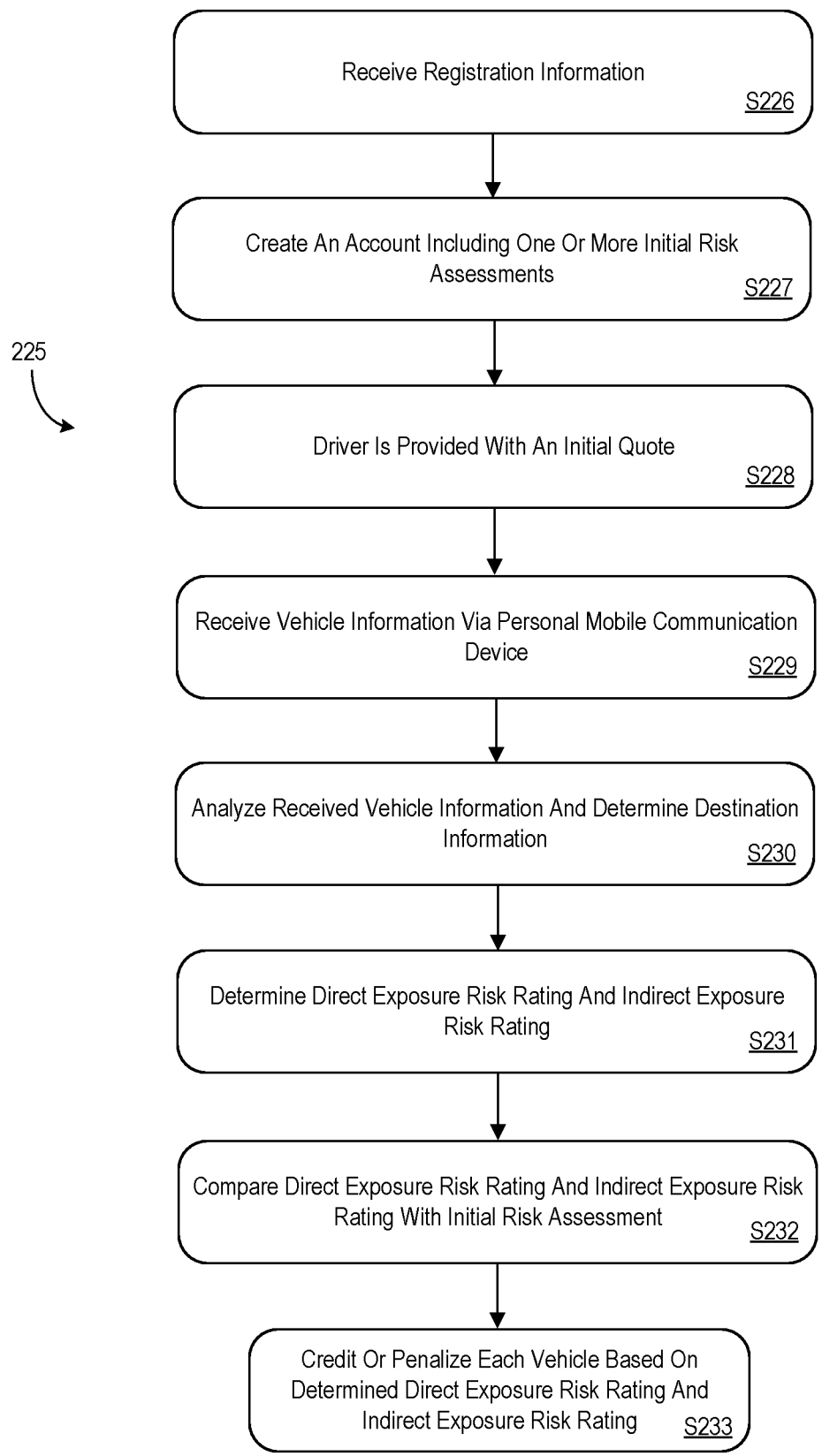
FIG. 2C shows a flow diagram for a method for destination based underwriting.

FIG. 2C shows an example for a method 225 for destination based underwriting. The system 100 receives registration information regarding the user (S226). This information may include biographical information (such as the numbers of family members, age, marital status, education, address information, number and type of vehicles). In one embodiment, this information may be received via a website. Based on this information, the system 100 creates a group account (S227). The group account may include subaccounts for each individual driver (in the case of multiple insured). The system 100 uses a software based algorithm to generate initial risk assessments, based on stored statistical data and loss data. For example, if there are two drivers and two vehicles, and each vehicle is driven by only one driver, the system 100 generates a vehicle risk assessment which incorporates the likelihood of a claim being made related to the vehicle 140 and the expected severity of such a claim. The initial risk assessment may be based on the expected locations in which the vehicle 140 is to be stored and the expected risk behavior of the operator of the vehicle 140. The system 100 may then generate pricing information based on this initial risk assessment (S228). For example, the pricing information may include a quote or a premium for the user. If the user accepts the premium, the account is activated and the system 100 begins receiving and storing telematics data (associated with the account) from a personal mobile communication device (S229). At predetermined intervals or based on triggering events, the telematics device may push telematics data to the system 100, or the system 100 may pull telematics data from the device and store the information in a database. The system 100 receives the telematics data, and categorizes information as destination information (S230). For example, the system 100 may receive location updates every 10 seconds. If the vehicle 140 is stopped, for more than a predetermined time period (e.g. 15 minutes) it may register a location as a destination location. The system 100 may further be configured to access external real-time data, such as traffic data to refine its information. For example, if a vehicle 140 is stopped for more than 15 minutes, and the location is determined to be a high traffic location, the system 100 may determine that the stoppage is not a destination, but a traffic related stoppage. The system 100 may then use the determined destination information and perform a software based statistical analysis and determine a direct exposure risk rating and an indirect exposure risk rating for each stoppage. The direct exposure risk rating and an indirect exposure risk rating are inputs to a unified Telematics Destination Score (TDS) that is calculated at some unit of location such as a zip code or a census block (S231). The TDS, which may be comprised of a direct exposure risk rating and indirect exposure risk rating, may be compared with the initial risk assessment (S232). Using software based algorithms, the system 100 may credit or penalize each vehicle 140 based on variances from the initial risk assessment and adjust the pricing information, wherein the adjusted pricing information may comprise a premium based on adjusted rates, credits, debits, or changes in a class plan. Additionally, the system 100 may deny coverage, or recommend a different insurance product (S233).

Figure 2D:
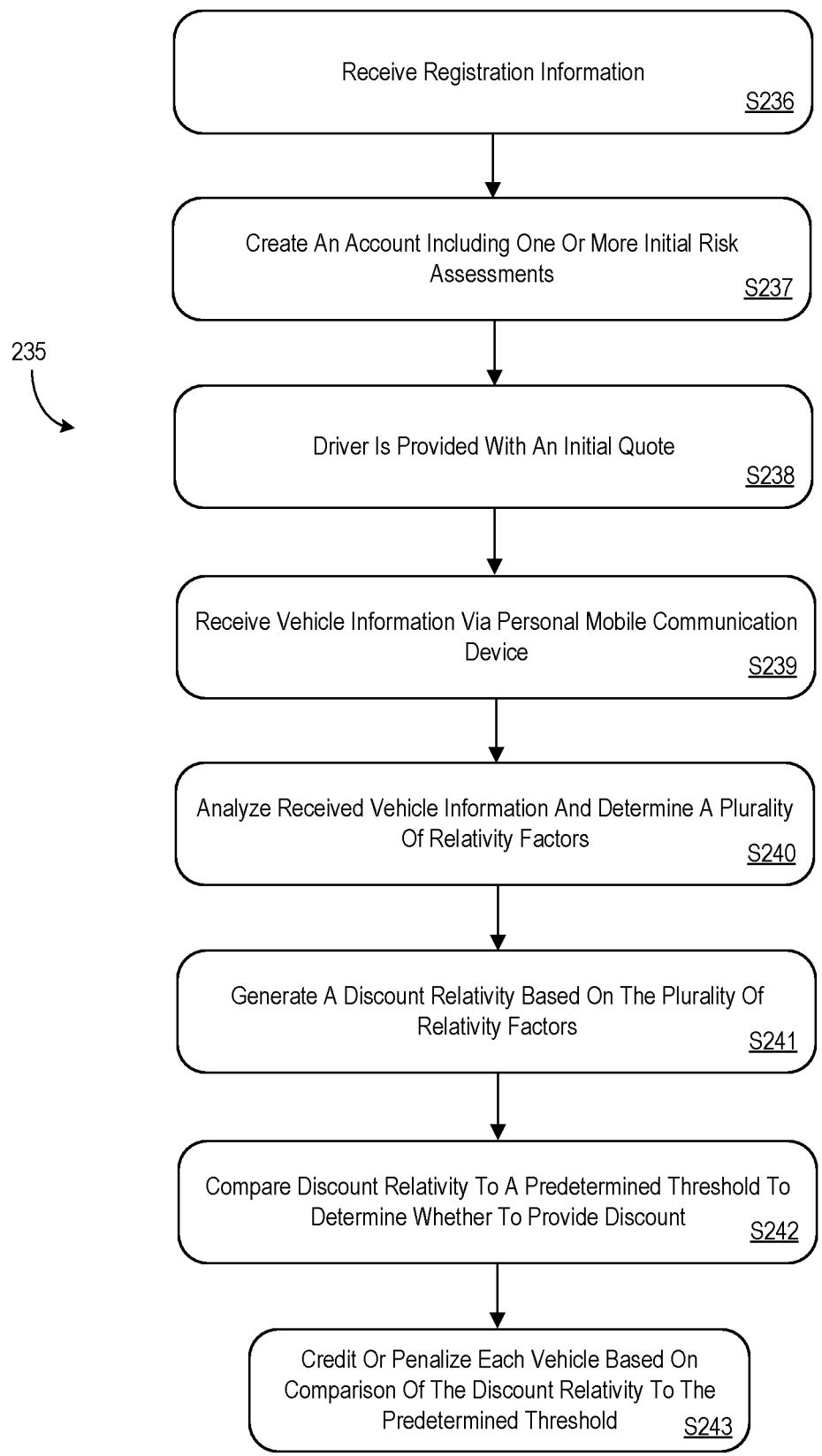
FIG. 2D shows a flow diagram for a method for telematics based underwriting.

FIG. 2D shows an example for a method 235 for telematics based underwriting. The system 100 receives registration information regarding the user (S236). This information may include biographical information (such as the numbers of family members, age, marital status, education, address information, number and type of vehicles). In one embodiment, this information may be received via a web site. Based on this information, the system 100 creates a group account (S237). The group account may include subaccounts for each individual driver (in the case of multiple insured). The system 100 uses a software based algorithm to generate initial risk assessments, based on stored demographic data and loss data. For example, if there are two drivers and two vehicles, and each vehicle is driven by only one driver, the system 100 generates a vehicle risk assessment which incorporates the likelihood of a claim being made related to the vehicle and the expected severity of such a claim. The initial risk assessment may be based on the expected locations in which the vehicle is to be stored and the expected risk behavior of the operator of the vehicle. The system 100 may then generate pricing information based on this initial risk assessment (S238). For example, the pricing information may include quote/premium information. If the user accepts the premium, the account is activated and the system 100 begins receiving and stores telematics data (associated with the account) from a personal mobile communication device (S239). At predetermined intervals or based on triggering events, the telematics device may push telematics data to the system 100 or the system 100 may pull telematics data from the device and store the information in a database. The system 100 receives the telematics data, and determines a plurality of relativity factors (S240). The system 100 may then use the determined relativity factors to determine a discount relativity (S241). The system 100 may compare the determined discount relativity to a predetermined threshold to determine whether to provide a discount (S242). Using software based algorithms, the system 100 may credit or penalize each vehicle based on the comparison of the discount relativity to the predetermined threshold and determine an adjusted rate, an adjusted risk score, provide a credit or surcharge, deny coverage, or recommend a different insurance product (S243).

Figure 3:
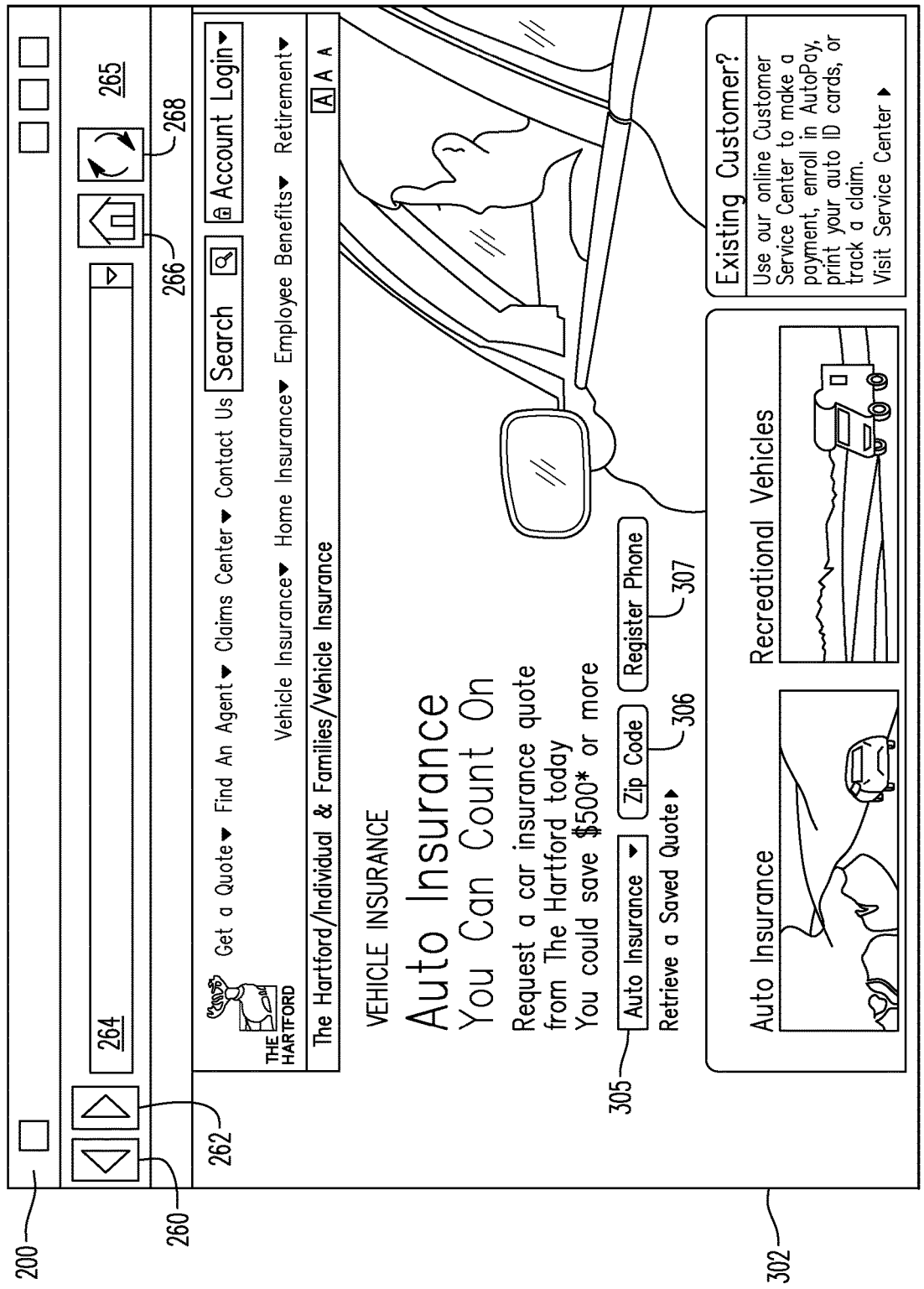
FIG. 3 is an example web page for initiating a request for a vehicle insurance quote.

FIG. 3 shows an example web page that may be displayed by the web browser module 132. The web pages may include display elements which allow the user of the user device 130 (or smartphone 110) to interface with the system 100 and register or receive a quote for vehicle insurance. The web pages may be included in a web browser window 200 that is displayed and managed by the web browser module 132. The web pages may include data received by the web browser module 132 from the web site system 120. The web pages may include vehicle insurance information.

The web browser window 200 may include a control area 265 that includes a back button 260, forward button 262, address field 264, home button 266, and refresh button 268. The control area 265 may also include one or more additional control elements (not depicted). The user of the user device 130 may select the control elements 260, 262, 264, 266, 268 in the control area 265. The selection may be performed, for example, by the user clicking a mouse or providing input via keyboard, touch screen, and/or other type of input device. When one of the control elements 260, 262, 264, 266, 268 is selected, the web browser module 132 may perform an action that corresponds to the selected element. For example, when the refresh button 268 is selected, the web browser module 132 may refresh the page currently viewed in the web browser window 200.

FIG. 3 is an example web page 302 for initiating a request for a vehicle insurance quote. As shown in FIG. 3, the web page 302 may include questions accompanied by multiple input fields 305, 306 in the form of drop down lists, text fields, and radio buttons. As the user provides input into the input fields 305, 306, the web browser module 132 may store one or more data structures ("response data") that reflect the selections made in the input fields 305, 306. Further, as the selections are updated, the web browser module 132 may update the web page 302 to indicate additional or more specific questions that may be associated with the selections. If there are no errors in the transmission, the web browser module 132 is directed to a subsequent web page. While the example shown is for auto insurance, the methods and apparatus disclosed herein may be applied to any vehicle insurance, e.g. boats, planes, motorcycles etc. Also, while the examples are directed to family auto insurance, the methods and apparatus disclosed herein may be applicable to corporate insurance plans, or any policies covering vehicles. The web page 302 may further include an option of registering a phone 307 with the insurance program. For example, the phone registration 307 may send a telephone number to a central server, install a telematics application on a smartphone, etc.

Figure 4:
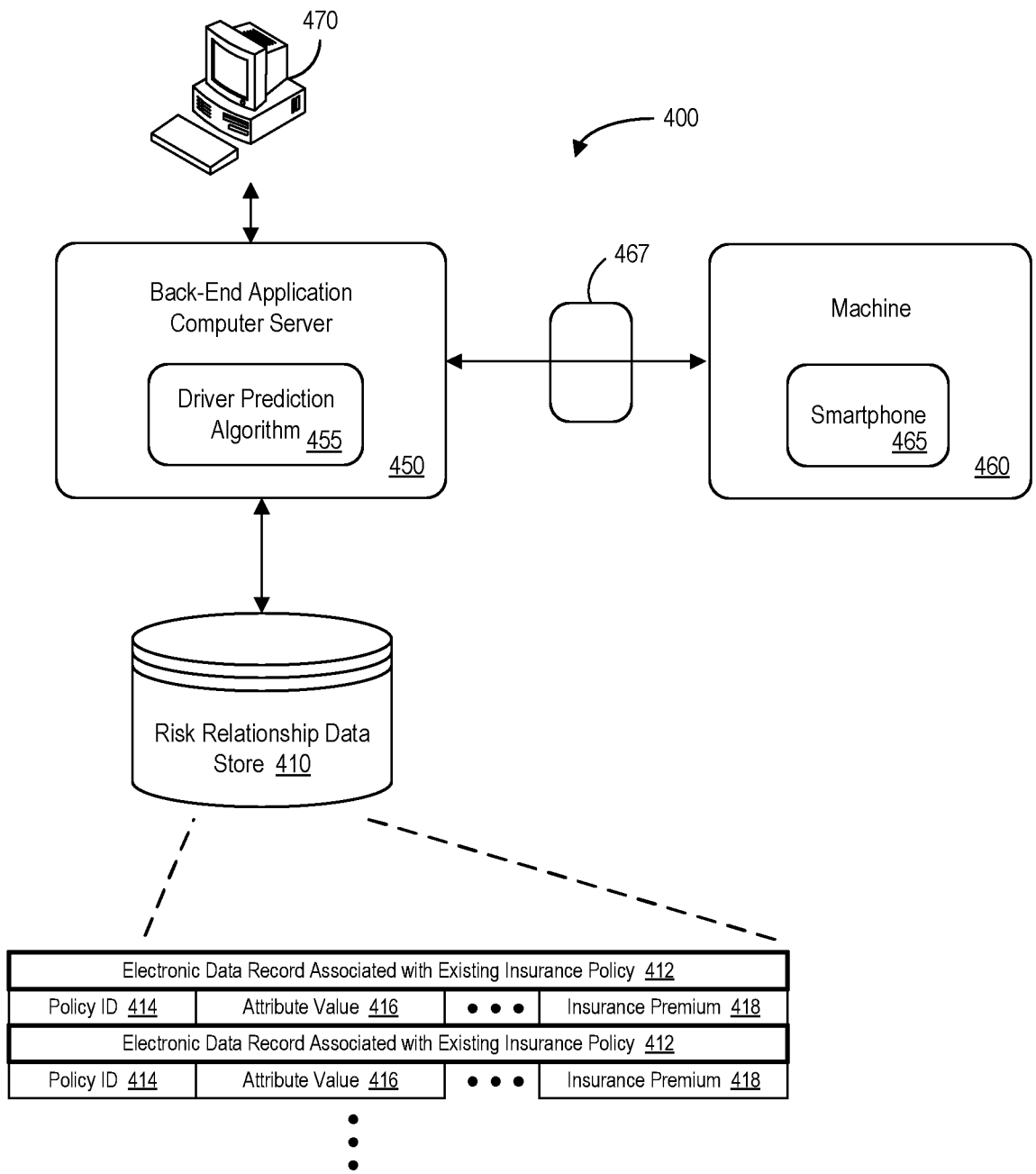
FIG. 4 is a high-level block diagram of a system in accordance with some embodiments.

FIG. 4 is a high-level block diagram of a system 400 according to some embodiments of the present invention. In particular, the system 400 includes a back-end application computer 450 server that may access information in a risk relationship data store 410 (e.g., storing a set of electronic records 412 representing risk associations, each record including, for example, one or more risk relationship identifiers 414, attribute variables 416, insurance premiums 418, etc.). The back-end application computer server 450 may also retrieve information from other data stores or sources in connection with a driver prediction algorithm 455 (e.g., trained via machine learning) to update the electronic records based on a likely driver of a vehicle. The back-end application computer server 450 may also exchange information with a remote machine 460 or smartphone 465 associated with the machine 460 (e.g., via a firewall 467). According to some embodiments, an interactive graphical user interface platform of the back-end application computer server 450 (and, in some cases, third-party data) may facilitate forecasts, decisions, predictions, and/or the display of results via one or more remote administrator computers (e.g., to gather additional information about an existing association) and/or the remote user device 460. Note that the back-end application computer server 450 and/or any of the other devices and methods described herein might be associated with a third-party, such as a vendor that performs a service for an enterprise.

The back-end application computer server 450 and/or the other elements of the system 400 might be, for example, associated with a Personal Computer ("PC"), laptop computer, smartphone, an enterprise server, a server farm, and/or a database or similar storage devices. According to some embodiments, an "automated" back-end application computer server 450 (and/or other elements of the system 400) may facilitate updates of electronic records in the risk relationship data store 410. As used herein, the term "automated" may refer to, for example, actions that can be performed with little (or no) intervention by a human.

As used herein, devices, including those associated with the back-end application computer server 450 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 450 may store information into and/or retrieve information from the risk relationship data store 410. The risk relationship data store 410 might, for example, store electronic records representing a plurality of existing risk associations, each electronic record having a set of attribute values including an insurance premium. The risk relationship data store 410 may also contain information about prior and current interactions with parties, including those associated with the remote user devices 460. The risk relationship data store 410 may be locally stored or reside remote from the back-end application computer server 450. As will be described further below, the risk relationship data store 410 may be used by the back-end application computer server 450 in connection with smartphone 465 to improve the operation or performance of the machine 460. Although a single back-end application computer server 450 is shown in FIG. 4, any number of such devices may be included. Moreover, various devices described herein might be combined according to embodiments of the present invention. For example, in some embodiments, the back-end application computer server 450 and a payroll server might be co-located and/or may comprise a single apparatus.

Figure 5:
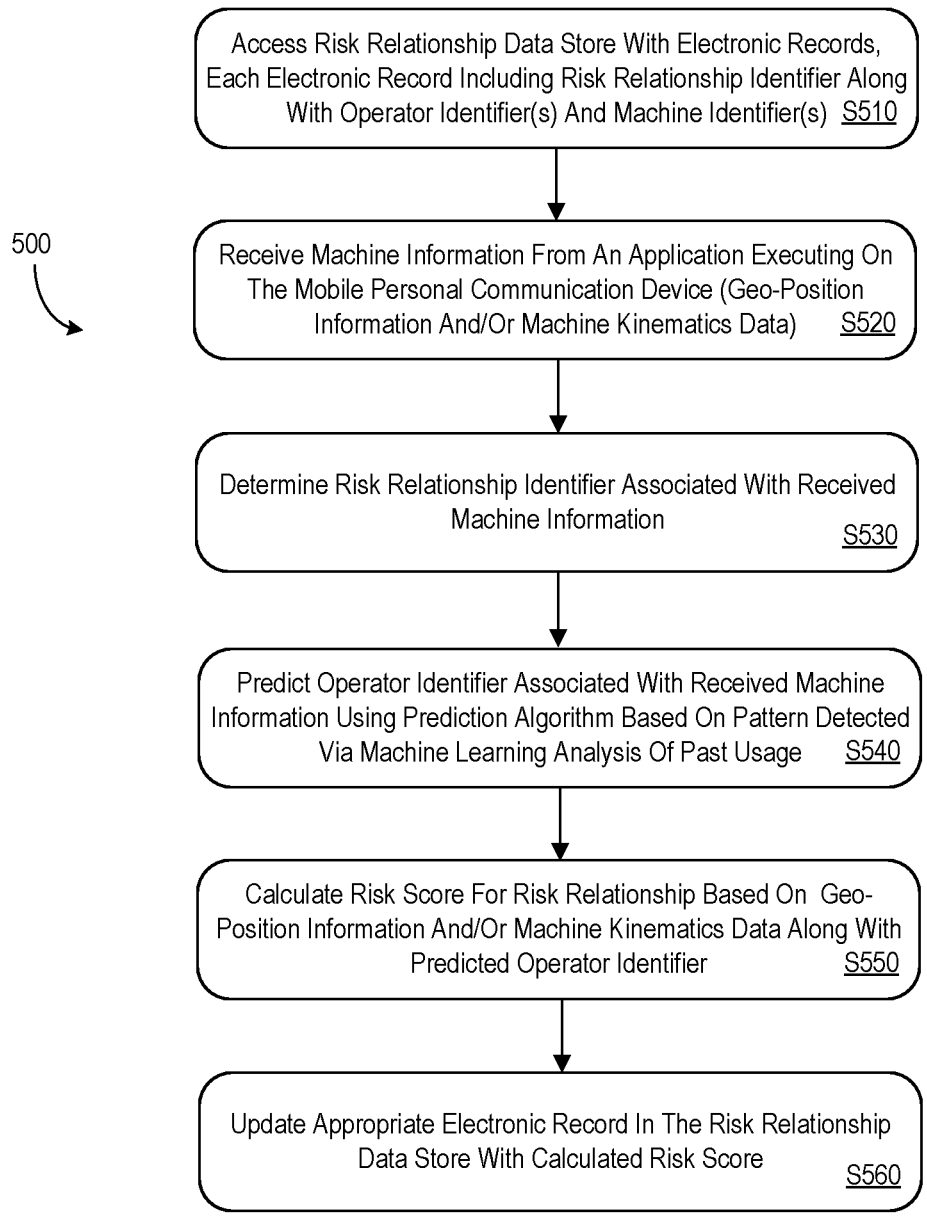
FIG. 5 illustrates a method according to some embodiments of the present invention.

Note that the system 400 of FIG. 4 is provided only as an example, and embodiments may be associated with additional elements or components. According to some embodiments, the elements of the system 400 automatically transmit information associated with an interactive user interface display over a distributed communication network. FIG. 5 illustrates a method 500 that might be performed by some or all of the elements of the system 400 described with respect to FIG. 4, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S510, the system may access a risk relationship data store containing electronic records, each electronic record including a risk relationship identifier along with at least one operator identifier and at least one machine identifier. At S520, a back-end application computer server may receive machine information, representing operation of the machine, from an application executing on the mobile personal communication device (e.g., a smartphone). The received machine information might include, for example, at least one of geo-position information and machine kinematics data, via a distributed communication network. At S530, the system may determine a risk relationship identifier associated with the received machine information.

Based on the received machine information, the system may automatically predict at S540 an operator identifier associated with the received machine information. According to some embodiments, the prediction utilizes a prediction algorithm based on a pattern detected via a machine learning analysis of past operator usage of the machine. The machine learning analysis might be associated with, for example, a location of operation, a time-of-day of operation, a day-of-week of operation, a time-of-year of operation, etc. According to some embodiments, the machine is a vehicle that exchanges information with the mobile personal communication device. In this case, the driver prediction may be based at least in part on the exchanged information, such as a manual driver selection, a location of the mobile personal communication device within the vehicle, a command to start the vehicle, telematics information associated with the vehicle, etc.

At S550, the system may calculate a risk score for the risk relationship based on the at least one of the geo-position information and machine kinematics data along with the predicted operator identifier. At S560, the system may then update the appropriate electronic record in the risk relationship data store with the calculated risk score. According to some embodiments, the application executing on the mobile personal communication device is further to identify distracted operation of the machine and the calculated risk score is further based on distracted operation. Examples of distracted operation may include accessing a text message, creating a text message, participating in a telephone call, accessing an email message, accessing streaming video, a chat application, etc.

According to some embodiments, the calculated risk score is further based on at least one machine safety feature associated with the machine identifier. For example, when the machine is a vehicle the safety feature might be associated with adaptive headlights, an autonomous operation feature, a camera, a sensor, an automatic braking feature, a brake warning feature, a parking feature, a lane departure warning, etc. According to some embodiments, the machine identifier is a vehicle identifier and a determination that a safety feature is associated with the vehicle identifier is based on a safety feature database containing indications of safety features in connection with vehicle identifiers. The safety feature database might be maintained by, for example, a vehicle manufacturer, vehicle dealerships, a governmental department of motor vehicles, a third-party service, etc.

According to some embodiments, the machine is a vehicle, the risk relationship is an automobile insurance policy, the operator is a driver, the enterprise is an insurance company, and the mobile personal communication device is a smartphone. In such cases, the risk score might be used to adjust an insurance premium percentage discount, an insurance premium monetary discount, an insurance coverage amount, a deductible amount, etc. Moreover, the automobile insurance policy might be associated with a potential automobile insurance policy, a newly issued automobile insurance policy, an automobile insurance policy renewal, etc.

Figure 6:
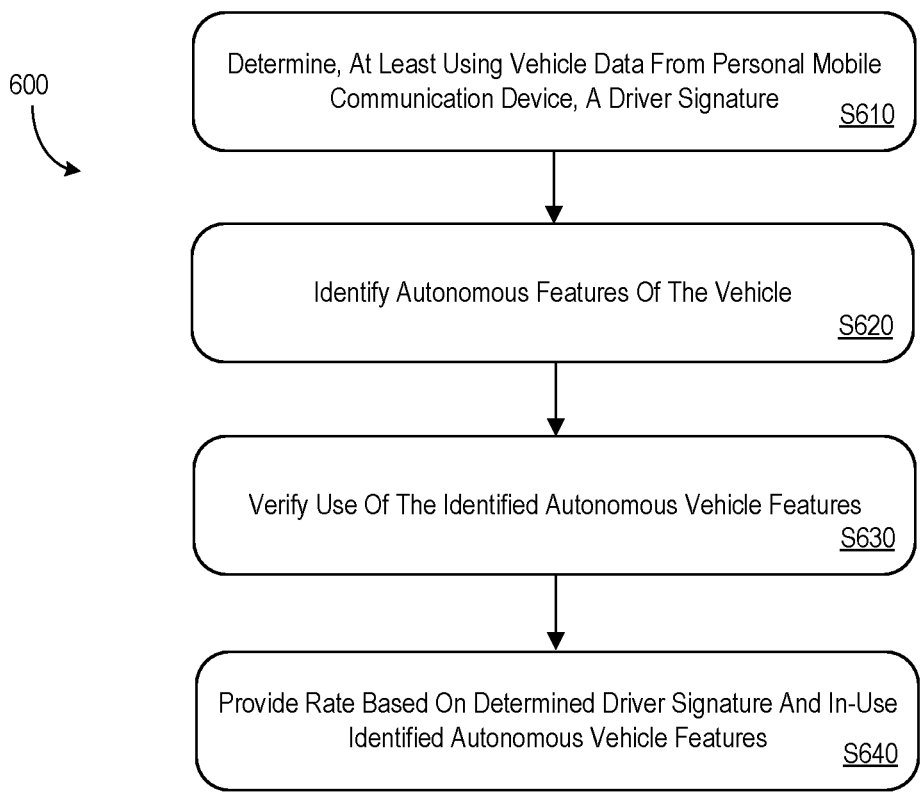
FIG. 6 illustrates a method to account for the various autonomous vehicle systems that may be included within a vehicle in pricing an insurance policy.

In order to account for the various autonomous vehicle systems that may be included within a vehicle in pricing an insurance policy for the vehicle, the method 600 illustrated in FIG. 6 may be used. In step S610, a determination may be made, as described herein, of a driver signature.

In step S620, the autonomous features or systems of the vehicle may be identified. As described herein, this information may be collected via webpages or otherwise collected, such as manually entered or received via a third-party like an after-market installation company or a tracking company such as CarFax®. Importantly, in step S620, a determination is made regarding the features of the vehicle. That is, if the vehicle has autonomous features and if so which ones. If the features are present, where the features installed as stock features or added features installed by the dealer, or where the features added after market by an after-market retailer or the owner of the vehicle.

Method 600 may include a verification that the identified autonomous vehicle features are being used at S630. In step S630, a determination is made regarding the use of the feature, i.e., was the feature on/off during use of the vehicle. A feature may be configured to be always "on." Alternatively, a feature's use value may be determined from the telematics information as described herein. A proxy may be used for representing how much a feature may be "on." For example, if an anti-locking breaking is installed on the car, verification of the fact that the anti-lock braking system is operational (turned on) may be the initiator of the reduced insurance premium. For example, if the system is installed in the vehicle, but the driver (or other operator such as an owner) of the vehicle disables the system or otherwise turns the system off, the vehicle may not qualify for that respective discount while configured in this way. However, the fact that the autonomous features are included on the vehicle may still provide some discount, because for example owners of vehicles with autonomous features may be known to be safer, for example.

Method 600 may provide a rate based on the driver signature (as discussed herein) and the in-use (including discount for having a vehicle with certain safety features even if the feature(s) are off) identified autonomous vehicle features at S640. This rate may be based on which types of autonomous features are used, how frequently the features are used, which driver the features displace, the combinations of features being used, and the like.

By way of example, a certain combination of autonomous features that are in use, such as forward collision breaking and backup braking, may be known to reduce accidents and may be combined to provide a larger rate reduction for the vehicle than potential other combinations of autonomous features. Each autonomous feature may have its use weighted in the ultimate calculation of premiums. The weight provided for a feature may be based on the amount of safety that the feature provides relative to the risk associated with the driving that is being performed. Some, or all, of the features may have the same weight when performing rate reduction calculations.

Further, autonomous features that take the place of drivers who are known to be particularly prone to accidents provide a further rate reduction with respect to those features that are replacing relatively safer drivers, for example. The statistics show that 92% of accidents are a result of driver error, and the use of autonomous features to replace as great a percentage of the human driver (particularly those where there is driver error) the greater the reduction in accidents.

Use of autonomous features during certain times of the day, and/or during certain types of driving may also increase the rate reduction. For example, use of features during lazy Sunday drives may provide one reduction level, while the use of the same features during rush hour on main roads may provide a higher rate reduction.

In modeling the use of autonomous features in a vehicle for providing insurance premiums, a multi-variate algorithm may be used. This algorithm may provide an exposure base and or a separate base rate, such as one base rate with the autonomous features and another base rate without the features. Liability may be credited as between the two rates based on use of the autonomous features. The autonomous algorithm may account for the environments that the vehicle is used in, as described herein, and the various configurations of the vehicle. Snapshots of claims based on accidents may be used to hone the algorithm, including those claims for a single crash.

In either of the two base rate scenarios or the algorithm, a weighted mileage may be deducted from the metric to arrive at the appropriate premium. By way of non-limiting example only, a vehicle having two autonomous features may be used. A first feature of the two is activated 66% of the time the vehicle is in use and provides a reduction of premium of 10%. The second of the two features is always on and is activated when the vehicle is being operated at less than 20 miles per hour. The second feature provides a 25% rate reduction for any miles meeting the speed criteria. For this particular example, the vehicle is operated at less than 20 miles per hour for 10% of the miles driven. In this case, the two features may operate cumulatively. The first feature provides a 6.6% rate reduction (66% of the time for a premium of 10%) and the second feature provides a 2.5% reduction (25% reduction 10% of the time). This vehicle may be eligible for a 9.1% discount on the premium of the vehicle.

While the present discussion has generally focused on vehicles, such as cars, for example, the concepts may be equally applicable to automobiles, boats, motorcycles, ships, commercial fleets, truck vehicles, and other insured items that may include autonomous features and other signatures associated with the insured items.

Additionally, the present system may be configured to cover a driver in a ride-share network. This may occur when a user of a vehicle drives the car of another person and/or may occur when there is a central car service, such as a Zipcar, for example. This may affect the pricing of premiums and coverage, and may be assessed using the tracking described herein. For example, the vehicle may be tracked to determine whether the vehicle owner is driving, the borrower driver is driving, and the amount of autonomous driving that is occurring. Specifically, during a given day, say the vehicle owner drives 75% of the miles and a borrower driver drives the other 25%. Of those miles, there is a calculated 20% autonomous driving ratio distributed equally between the two drivers. In this situation, the rating for the vehicle is the perfect autonomous driving score of 1 times the 20% that the autonomous driving occurs plus the owner's driving score times 60% (75% driving for 80% of the time) plus the borrower's score times 20 (25% driving for 80% of the time).

Further, the vehicle may provide autonomous features where the vehicle is connected to weather data and based on the weather data moves into the garage, for example. Alternatively, the vehicle may move to a safer location based on the weather data, for example. In either situation, the vehicle may monitor the weather information, and upon receipt of information that requires movement, may turn itself on and move as appropriate to aid in protecting the vehicle. Such a feature may reduce premiums on comprehensive by avoiding hail damage and other types of damage that occur as a result of weather accidents.

Some examples described herein are associated with a scenario wherein a new customer registers for insurance and then the system 100 adjusts the pricing information based on telematics data. The systems and methods described herein may also be applied to current and former customers who are looking to renew their coverage. In this scenario, the biographical information and historical driver information may already be stored on the insurance server 180, and the DPU 170 may access this information directly.

In addition to the example information above, additional information may be determined during or after the registration phase. For example, Table 1 shows biographical information that may be used in generating driver risk profiles.

TABLE 1

| Additional Driver Information |
|---|
| Primary Metric |
| Household Composition |
| Presence of Married or Domestic Partners/Total Number of Drivers |
| Youthful Policy Composition |
| Driver Age/Gender-Marital Status |
| Driver Age/Annual Mileage |
| Limited Driving |
| Driver Age/Driver Training |
| Driver Age/Good Student |
| Driver Age/Principal/Occasional Operator |
| Driver Age/Years Licensed |
| Vehicle Age*/Driver Age |
| Driver Age/Prior BI Limit |

TABLE 1-continued

Additional Driver Information

Driver Age/Number of Drivers
Driver Age/Number of Vehicles
Driver Age - Household Composition
Primary Insured Age
Primary Insured Gender
Secondary Insured Age
Primary and Secondary Driver Age
Difference
Secondary Metric
Vehicle Age*/Number of Vehicles
Annual Mileage
Vehicle Use
Number of Renewal Years
Safe Driver Insurance Plan
Chargeable at-fault accidents - First
Year/Subsequent Years
Safe Driver Insurance Plan
Minor violations excluding speeding -
First Year/Subsequent Years
Safe Driver Insurance Plan
Major violations excluding Driving While Intoxicated ("DWI") - First
Year/Subsequent Years
Safe Driver Insurance Plan
Minor violations - speeding only - First
Year/Subsequent Years
Safe Driver Insurance Plan
Major violations - DWI only - First
Year/Subsequent Years Usage Based Insurance Score The system 100 may be configured to weight each factor based on actuarial date. For example, in the example above, there are two categories, primary and secondary wherein each factor within a particular category may be weighted equally. However, each factor may be assigned a unique weight.

The registration phase is used to generate an initial risk profile, as shown in Table 1, above. During the registration phase, the system 100 receives biographical information about each of the drivers that may be associated with the user's account as well information about the vehicles for which coverage is requested. With millions of accidents each year, a large amount of data is available on factors that may affect the likelihood of an accident as well as the severity of the accident. The database 176 associated with the DPU 170 contains information regarding accident information. The DPU 170, using a multivariate analysis, generates the initial driver profile based on the provided biographic information verses the factors stored in the database 176. Where allowable by law, one factor that may be used in generating the initial risk assessment is based on the zip code of the insured's home/garaging address. For example, initial risk assessment may be based on a territory risk score assigned using the home/garaging zip code. The territory risk score is based on data such crime data, accident data, weather data etc. that might be considered as direct exposure variables. An example of a low-resolution risk assessment is shown in Table 2.

TABLE 2

Initial Risk Assessment

| Location | Percentage Time Stored in Location | Location Risk |
|---|---|---|
| Home | 25 | 1 |
| Office | 40 | 1.5 |
| Low Risk Locations | 7.5 | 0-3.3 |
| Medium Risk Locations | 20 | 3.4-6.6 |
| High Risk Locations | 7.5 | 6.7-10 |

As shown in Table 2, based on the entered biographical information, the initial risk assessment is generated predicting the amount of time the vehicle 140 may be stored in various locations. The DPU 170 may be configured to determine the specific risk associated with the home and office locations entered by the user. Additionally, if a student is listed as a driver, the school may be added as an expected location. The list above is by no means exhaustive. Based on the entered biographical information, the DPU 170 may also be configured to generate an expectation on time spent in low risk, medium risk, and high risk locations (other than the specific expected locations). This information may be used to generate rate pricing information.

During the registration phase, the system 100 receives biographical information about each of the vehicles and the expected drivers for each vehicle and the percentage each driver is expected to use each vehicle. This may be used as a baseline to create vehicle profiles.

The inside of vehicle 140 may include a plurality of electronics devices and sensors that may communicate information to the smartphone 110. The vehicle 140 may include a microprocessor and memory that may operatively connect to each individual electronic device. For example, there may be electronic devices associated with the seats, A/C units, Global Positioning Satellite ("GPS")/stereo system, DVD unit, and BLUETOOTH equipment. The microprocessor may also be in communication with the headlights, engine, traffic signals, rear view mirror, rearview cameras, cruise control, braking system and inner workings of a vehicle. There may also be additional devices such as multiple user devices 130 brought by passengers into a vehicle. The smartphone 110 may be configured to receive information from the electronics in the vehicle 140. For example, the smartphone 110 may be configured to receive or sense data concerning, speed, braking, location, seat settings, lane changes, radio volume, window controls, vehicle servicing, number of cellular devices in a vehicle, proximity to other vehicle's and their devices, etc. The telematics device may be configured to transmit the telematics data directly to the smartphone 110. The smartphone 110 may then format the telematics data and transmit it to the DPU 170. The DPU 170 may use a software based algorithm to analyze the telematics data to identify driving segments wherein each driving segment is associated with a driver signature. The DPU 170 may then categorize each signature as a known or unknown driver. Wherein the DPU 170, a signature with drivers listed on the insurance, may associate. The DPU 170 may further be configured to categorize unknown driver signatures as potentially impaired/distracted driving. The DPU 170 may compare the driver signatures with the expected drivers to determine the driver of a vehicle for each determined driving segment.

The smartphone 110 may be configured to format the telematics data (e.g. provide a summary) to the DPU 170. Once the account has been activated, the DPU 170 may be configured to use this information to determine the destination information associated with each vehicle.

The smartphone 110 may be configured to provide telematics data periodically as well as based on a trigger. In one embodiment, if the vehicle 140 is stopped for a predetermined period of time, or the vehicle 140 is turned off, idled, or otherwise stationary, the smartphone 110 may be configured to transmit a signal identifying the location as a stopping point.

As shown below in Table 3, the DPU 170 may be configured to receive and store location information associated with the vehicle 140 and determines destination information. Based on the reported locations, the system 100 may generate a database with information including stoppage times, the duration of the stoppage, the location of the stoppage, and other factors (e.g. phone in use.) The DPU 170 may be configured to store map information, including nearby businesses and points of interest for each location. Alternatively, the DPU 170 may be configured to communicate with third-party applications, such as GOOGLE® Maps, which contain location information about nearby businesses etc. The DPU 170 may determine nearby locations (which may be possible destinations for the driver). The DPU 170 may also be configured to account for other factors, such as stopping for a phone call.

TABLE 3

Measured Destination Information

| Time Stopped | Duration | Phone in Use | Location | Nearby Location | Location Risk | Behavior Risk |
|---|---|---|---|---|---|---|
| 1:05 am | 1:00 | N | 32606 | Moe's Tavern | 104 | 183 |
| 2:35 am | 5:02 | N | 32605 | Home | 100 | 100 |
| 9:07 am | 10:13 | N | 32611 | Office | 107 | 154 |
| 8:50 pm | 0:14 | Y | 32951 | Highway | 155 | 75 |
| 1:09 am | 75:12 | N | 32605 | Home | 100 | 121 |
| 4:43 pm | 142:19 | N | 32601 | Airport | 179 | 103 |

The DPU 170 may be configured to analyze the data using a multivariate analysis. Based on the received destination information, the DPU 170 may calculate a direct exposure risk rating and indirect exposure risk rating, where the direct exposure risk rating may comprise physical risks to the vehicle 140 based on the location and indirect exposure risk rating may incorporate behavioral risks.

According to some embodiments, the direct risk exposure may comprise information based on the location risk, which may be affected by vehicle density, lighting, outdoor/indoor parking, storing a vehicle in a neighborhood with a high number of break-ins or thefts, storing a vehicle in areas with high numbers of uninsured drivers. The DPU 170 may be configured to communicate with external servers 190 that may provide detailed crime information for predetermined areas (e.g. 1 meter). Additionally, the DPU 170 may communicate with external servers to determine weather information and real-time traffic density and pedestrian density.

The DPU 170 may be configured using a multivariate analysis to compare the destination information with the initial risk assessment. The RPU 160 may access the database 176 associated with the DPU 170 to determine adjusted pricing information based on the destination information.

The direct exposure rating may be determined based on loss data associated with a location. The DPU 170 may generate a risk location map, wherein each location is assigned a score. At a macro level, this score may be assigned based on a zip code; however, the risk location map may be generated with more or less granularity. The duration and time of day during which a vehicle is parked at a destination may be accounted for in determining the direct exposure rating. Additional factors may also be accounted for, for example, whether the vehicle is in a garage or the weather associated with each location.

The system may use a multivariate analysis to generate the value of the risk. For example, parking a vehicle 140 in a location known for hail storms may present a high risk of damage; however, if the vehicle 140 is inside a garage, the risk might be mitigated. Based on the home or garaging location, cited by the user, a risk location map may be weighted to set the home location as a value of 100. An example of a risk location map is shown in Table 4:

TABLE 4

Risk Location Map

| Zip | Score | % of time parked |
|---|---|---|
| 32605 | 100 | 0.3 |
| 32606 | 104 | 0.1 |
| 32611 | 107 | 0.1 |
| 32951 | 155 | 0.1 |
| 32601 | 179 | 0.5 |

Each location in the risk location map is then compared with the home/garaging location. During the registration phase, the system 100 may only have received information regarding the home or garaging address; accordingly, the initial rate may have been based on that single variable analysis. The DPU 170 may use the telematics data from the smartphone 110 to determine the time spent at each location, as shown in Table 4.

The DPU 170 may then calculate a direct exposure relativity according to: Direct exposure relativity=rates weighted by time spent in the location/rate of home location. The direct exposure relativity, calculated by the DPU 170, may also account for the time of day in which the vehicle is stored at a location. For example, parking in a high traffic parking lot may be safe with respect to thefts during the day but more likely to be involved in an accident. But at night, the location may be a high theft area. Accordingly, the direct exposure relativity may further comprise weighting factors for the time of day and duration for which a vehicle is stopped at a destination.

The system 100 may further access additional data to assess the risk of a location for the vehicle 140; for example, the number of accidents or thefts in an area. As the amount of data increases, the system may identify a gradient of vehicle values in an area. Accordingly, a high value vehicle commuting to an area with predominantly low value vehicles may be considered an additional risk.

The indirect exposure rating accounts for behavioral patterns that may be correlated with destinations. Studies have shown correlations between risk appraisal and risky behaviors and the numbers of traffic offenses. Personality traits have been associated with the type of sensation seeking behavior that may result in accidents and therefore the filing of a claim.

Currently, speeding tickets are used to identify a propensity for driver speeding. And propensity for speeding is used to calculate the expectation of an accident or some event for which a claim is filed. However, the number of speeding tickets may not be indicative of the amount of risky behavior exhibited by a driver. For example, one driver may travel at speeds a few mph over the limit on a heavily monitored road, whereas a second driver may speed 30 mph over the speed limit on an unmonitored road. In this scenario, the first driver may receive more tickets, while representing a lower insurance risk. The indirect exposure rating provides the insurance company with additional risk assessment data to further refine insurance rates.

The DPU 170 may be configured to compile information, regarding high risk behaviors, based on the location to which a vehicle is driven. For example, a vehicle that is stopped at a sports stadium, during a big game, the vehicle is more likely to be surrounded with a high number of vehicles that are expected to start moving at approximately the same time. The DPU 170 may contain statistical information that a person at a sporting event is less likely to speed but more susceptible to a low speed fender bender. The DPU 170 may further contain statistical information regarding whether a person attending sporting events is more or less likely to be involved in reckless driving, or more or less likely to be involved in an incident in which a claim is filed.

The indirect exposure rating may further provide granularity and detail to the direct exposure rating. For example, a police impound lot may be determined to be a very safe location, based on the direct exposure rating. There may be a low chance of theft or other damage. However, the indirect exposure rating may account for this as being a risky behavior, since an impounded vehicle may be an indicator that the vehicle is not being properly monitored by the owner.

Accordingly, in addition to the risk location map, the DPU 170 may be configured with a behavior risk map that similarly charts out potential behavior risks associated with each location. An example of a behavior risk map is shown below in Table 5:

TABLE 5

Behavior Risk Map

| Location | Nearby Location | Behavior Risk |
|---|---|---|
| 32606 | Moe's Tavern | 183 |
| 32605 | Home | 100 |
| 32611 | Office | 154 |
| 32951 | Highway | 75 |
| 32601 | Airport | 103 |

Using the behavior risk information and the time and duration a vehicle 140 is stopped at a location, the DPU 170 may generate an indirect exposure score. For example, if the DPU 170 detects that a vehicle is parked near a Fenway Park 81 times a year, DPU 170 may indicate this pattern as an increased risk for dangerous behaviors.

The DPU 170 may further be configured to correlate this information with other bibliographical information. For example, biographical information indicates that one of the insured individuals on the account works at said Fenway Park, and then the DPU 170 may determine that the behavior is not a high risk behavior.

To avoid "false positives" that indicate risky behavior, additional measures may be put into place. For example, in the case someone frequently visits a sporting venue, the system may contain measures that avoid the chance of penalizing good Samaritans who may serve as designated drivers for their friends. Accordingly, if the risk factor associated with the location is associated with poor driving afterwards, the system may be configured to monitor driving immediately after leaving the class of location to determine impairment or noticeable changes in driving signature.

The system 100 may further be configured to determine whether the vehicle 140 is a self-driving vehicle, in which an on-board computer operates the vehicle. In this case, the effect of the indirect exposure may be reduced when determining the pricing information.

The system 100 may use biographical information provided in web pages as a baseline for generating the initial pricing information. However, the telematics data provided by the smartphone 110 may be used to refine this information. The RPU 160 may access the information stored in the DPU 170, and use a software based algorithm to determine whether to adjust the rate or to assess a credit or penalty/surcharge.

In a first example, the system 100 may offer the user a predetermined discount to sign up for a telematics program. The system 100 may be configured to generate a discount factor, for example according to Discount relativity=starting discount $*\beta_1\rho_1*\beta_2\rho_2*\beta_3\rho_3 \ldots \beta_n\beta_n$, where $\beta$ is a weighting factor and p represents direct and indirect exposure ratings. For example, the starting discount may be 10%, and if the product of the direct and indirect exposure ratings with the weighting factors >1, the system 100 may determine the driver is not eligible for a discount.

The system 100 may identify the driver based on the seat and/or mirror settings of the vehicle. The DPU 170 may also identify the driver based on the route or destination in which the vehicle 140 is travelling (for example, based on the employment information, if the vehicle drives and parks for an extended time at an office, it may identify the driver). Alternatively or additionally, if a user device 130 is connected with the vehicle 140 via BLUETOOTH, it may identify a phone number associated with the smartphone 110 or user device 130 and identify the driver based on that information. To further enhance this data, if the user device 130 is used for a phone call over the speaker phone, based on the location of the microphone that picks up the speech, the identification of the driver may be determined more accurately using voice recognition techniques.

Some vehicles 140 may automatically adjust the driving position based on an electronic key that is used for entry into the vehicle or to start the vehicle. The smartphone 110 may be configured to identify the key used to activate the vehicle 140. Then, if the seat/vehicle setting remains the same, for example, the smartphone 110 may transmit this information to the DPU 170 which is able to determine that the driver is the same as the registered or expected key owner. If the seat/vehicle settings are adjusted, then a DPU 170 may determine that a different driver is driving the vehicle 140.

In one embodiment, the DPU 170 may use the implicit driver identification, based on telematics data, to identify the number of unique driver signatures operating each vehicle and the amount of time each of the unique driving signatures are operating each vehicle including the vehicle driving or partially driving itself. The DPU 170 may use this information to determine the number and identity of drivers for each vehicle on the policy. The DPU 170 may communicate this information to the RPU 160, which may be configured to adjust the pricing information associated with the account. The pricing information may be adjusted, for example, by modifying the rate or rate category associated with the account or by providing a discount or penalty to the previous rate.

In another embodiment, the DPU 170 may be configured to access social media information associated with the drivers, and this information may be stored, for example on storage 192 associated with external servers 190. For example, the DPU 170 may receive data from an external server 190 associated with GOOGLE or FOURSQUARE or other similar application, which tracks an individual's location. The DPU 170 may be configured to compare the checked in location with the location of the vehicle 140 indicated by the smartphone 110 and thereby identify the driver.

In another example of implicit driver identification, the DPU 170 may be configured to determine the driver based on the location of the vehicle 140. For example, if the vehicle 140 is driving to or parked at one of the insured's offices, the DPU 170 may identify the driver as a particular person.

A telematics device might be configured to transmit explicit driver identification information to the smartphone 110. The vehicle 140 may be equipped, for example, with biometric readers that explicitly identify the driver. For example, to activate the vehicle 140, the driver may submit a fingerprint, retina sample, a voice sample or other similar biometric data. The telematics device may be configured to transmit this explicit identification information to the smartphone 110.

The smartphone 110 is configured to sense and/or receive telematics data which is then formatted and sent to the DPU 170. The DPU 170 analyzes the information and clusters the time into segments. The segments may include time during which the vehicle 140 is being driven and time the vehicle 140 is parked. The DPU 170 may use telematics data and associate a driver or a driver signature with each driving segment. The RPU 160 may use the driver signature information in a number of ways to adjust the pricing information. The RPU 160 may be configured to assess risk associated with coverage without identifying the driver, and only the driving behavior. In this embodiment, the RPU 160 generates a risk assessment or profile, which may be based on the risk associated with insuring the vehicle based on the vehicle and the driver signatures.

An example of the telematics data, stored and transmitted by a smartphone 110 is shown in Table 6, below. The smartphone 110 may be configured to include an event/status monitor of the vehicle's 140 activities. An example of the event/status log, which may be stored in a database operatively coupled to the smartphone 110.

TABLE 6

Telematics Information Recorded

| Time | Speed | Accel | Radio Volume | Phone | Lo-cation | Brakes | Turning | Turn Signal |
|---|---|---|---|---|---|---|---|---|
| 1:05 am | 76 | 4 | 8 | | 32605 | | | |
| 1:06 am | 86 | −6 | 8 | Y | 32605 | Y | | |
| 1:07 am | 54 | 30 | 8 | | 32606 | | | |
| 1:08 am | 86 | −2 | 9 | N | 32606 | Y | Y | N |
| 1:09 am | 52 | −30 | 9 | | 32606 | | | |

The smartphone 110 may be configured to take periodic measurements regarding the vehicle, as well as event triggered measurements. For example, the smartphone 110 may be configured to take readings every 1 second. The smartphone 110 may be configured with different intervals for each measurement, for example, while speed may be reported every second, the radio volume may be reported each minute. The smartphone 110 may be configured to receive this information and format the information to the specifications required by the DPU 170. Additionally, the smartphone 110 may be configured to take readings based on event triggers, such as a detected turn, brake event, and phone activation, etc. The example above is not exhaustive; the metrics are shown as example only.

In another embodiment, the smartphone 110 or DPU 170 may be configured to determine when a braking event occurs. In this example, the smartphone 110 or DPU 170 may be configured to analyze speed and acceleration information to determine whether a braking event occurred. For example, if the acceleration data is below a threshold, a braking event may be declared. Similarly, if the positioning of the vehicle 140, relative to a determined center line of a road veers, the smartphone 110 or DPU 170 may determine a turn event, a lane change event, or impaired driving. This information is received, by the DPU 170, which may then perform analysis to determine driver signatures (or this function might instead be performed by the smartphone 110).

Based on the type of plan, the RPU 160 may access the database 176 associated with the DPU 170 to determine risk and pricing information. The RPU 160 may determine the pricing based on the percentage of time each vehicle is driven by a particular driver. The DPU 170 may associate each driving segment, based on the driver signature of that segment, with a driver. After associating each driving segment for a vehicle 140 with a driver, the DPU 170 then calculates percentages of vehicle driving time to apportion to each driver.

The system 100 may use the information provided via a web page to generate an initial vehicle usage profile for each of the listed drivers including the vehicle itself. However, the telematics data, such as information provided by the smartphone 110, may also be used to refine, replace, or adjust this information including replacing a proxy for autonomous feature usage with actual feature usage. The DPU 170 may use the information received from the smartphone 110 to estimate the total use time for a vehicle 140. The system 100 may, for example, categorize each segment as being driven by a known driver (i.e. listed on the insurance) or an unknown driver (i.e. third-party or impaired driver). Table 7 shows an example of a usage chart generated by the system 100.

TABLE 7

| | Vehicle 1 | Vehicle 2 |
|---|---|---|
| John Doe | 80% | 10% |
| Jim Doe | 19% | 40% |
| Unknown Driver 1 | 0.5% | 50% |
| Unknown Driver 2 | 0.5% | 0% |

As shown in Table 7, the system 100 may be able to identify individual drivers. The unknown drivers may indicate that the vehicle 140 is being operated by an impaired driver, a distracted driver or unregistered driver. Additionally, it may indicate that the vehicle is being moved via a tow truck. Based on the received information, the DPU 170 may identify unique driver signatures and categorize the use of each vehicle. The DPU 170 may identify these driver signatures by clustering driving characteristics into segments using a multivariate analysis. The DPU 170 is configured to weight the information, based on the source (e.g. implicit driver identification, explicit driver identification). For example, if biometric readings provide explicit driver identification information, the likelihood of accurate driver identification is higher; it may therefore be weighted higher in the algorithm that determines the likely driver at each time. Implicit identification of a driver may be less accurate; accordingly each implicit identification may be weighted lower. For example, if Jim Doe is 6'8 and John Doe is 5'5, and the smartphone 110 or DPU 170 has access to seat adjustment information, it may compare the seat placement versus the height of the drivers. In this case the driver settings may provide a reliable indicator of the driver. However, braking, driver speed may be less likely an indicator in certain circumstances.

The RPU 160 may determine pricing information for the account, for example, based on an adjusted rate or a credit or penalty based on this information. For example, if the amount of driving segments that are identified as impaired, distracted or unregistered are above a predetermined threshold, the RPU 160 may determine that the pricing information should be adjusted.

The system 100 may further be configured to proactively adjust pricing information based on detected high risk behavior. For example, if the DPU 170 determines that the amount of impaired, distracted or unregistered driving is below a predetermined threshold, or if the signature associated with a high risk driver improves or is reduced relative to one or more vehicles.

In another embodiment, the RPU 160 may assign risk, agnostic of the driver, based on the driving signatures. In this example, the RPU 160 requests data from the DPU 170 regarding the driving characteristics. Each use of the vehicle is categorized. For example, see Table 8:

TABLE 8

Categorization of Use

|  | Vehicle 1 | Vehicle 2 |
| --- | --- | --- |
| High Risk Use | 25% | 55% |
| Medium Risk Use | 25% | 35% |
| Low Risk Use | 50% | 10% |

Based on the amount of time the vehicle is driven in each risk category, the RPU 160 may determine pricing information without needing to identify the number of drivers or the identity of those drivers.

A registration phase may be used to generate an initial risk assessment. During the registration phase, the system 100 receives biographical information about each of the drivers that may be associated with the user's account as well as information about the vehicles for which coverage is requested. With millions of accidents each year, a large amount of data is available on factors that may affect the likelihood of an accident as well as the severity of the accident. The database 176 associated with the DPU 170 contains information regarding accident information. The DPU 170, using a multivariate analysis, generates the initial driver assessment based on the provided biographic information verses the factors stored in the database 176.

The DPU 170 may perform a correlative analysis on the entered biographical information to develop the initial risk assessment which may be based in part on the expected speeding, the expected acceleration, the expected turns, the expected braking, the expected mileage driven, the times of day driven, etc. The list above is by no means exhaustive. Based on the entered biographical information, the DPU 170 may also be configured to generate an expectation on time spent in low risk, medium risk, and high risk locations (other than the specific expected locations). The RPU 160 may use this information to generate pricing information. For example, the RPU 160 may adjust the rate associated with an account, it may credit or debit a rate and/or to determine adjusted pricing information.

The inside of vehicle 140 may include a plurality of electronics devices that may communicate information to the smartphone 110. Most vehicles include at least one microprocessor and memory that connects to each individual electronic device. For example, there may be electronic devices associated with the seats, A/C units, GPS/stereo system, DVD unit, and BLUETOOTH equipment. The microprocessor may also be in communication with the headlights, engine, traffic signals, rear view mirror, rearview cameras, cruise control, braking system and inner workings of the vehicle 140. The smartphone 110 may, according to some embodiments, be configured to receive information from the electronics in the vehicle 140. For example, the smartphone 110 may be configured to sense or receive data concerning, speed, acceleration, turns, braking, location, seat settings, lane changes, radio volume, window controls, vehicle servicing, number of cellular devices in a vehicle, proximity to other vehicles, etc.

The smartphone 110 may format this information and transmit it to the DPU 170. Once the account has been activated, the DPU 170 may be configured to use this information to determine the relativity factors associated with each vehicle.

The smartphone 110 may be configured to record telematics data periodically as well as based on a trigger. Based on this information, the DPU 170 may be configured to determine a plurality of relativity factors for the measured data categories. In one embodiment, the relativity factors may be based on predetermined road segments.

For example, the DPU 170 may also be configured to categorize portions of road as road segments, wherein road segments may be predetermined lengths of road. As a preliminary basis, the DPU 170 may label a first category of roads "highways," including: interstates, U.S. highways, limited-access highways as "highways" or "primary roads." The DPU 170 may label a second category of roads as "urban," including: secondary roads, and local roads of high importance. The DPU 170 may label a third category of roads as "other," including: local roads of minor importance, alleys, other unpaved roads or footpath. Alternatively or additionally, the DPU 170 may be configured to determine the relativity factors in relation to nearby drivers or drivers on similar roads under similar conditions.

In a first example, the DPU 170 may be configured to determine a driving location relativity factor. For example, the driving location relativity factor may credit or penalize a driver for driving in locations more or less risky than their home address. The database 176 of the DPU 170 may generate a Driving Location Risk Index ("DLRI"), wherein the DLRI comprises rankings of each driving location, a vehicle may encounter. The DLRI may be based on a predetermined area. This granularity may be adjusted based on the available telematics and loss data. As one example, where allowable by law, the DLRI may be categorized by zip code. After receiving telematics data from the smartphone 110 of vehicle 140, the DPU 170 may be configured to compare the driving location, with the DLRI to determine the relative risk of the locations.

For example, the DPU 170 may calculate the relative risk of the reported locations actually driven compared to the expected home location according to the procedure described below. The DPU 170 may determine the total number of miles driven by zip code. Next, the DPU 170 may calculate a state adjustment factor. The state adjustment factor may be calculated, e.g. according to State adjustment factor=State Avg. Premium/State Avg. Base Rate wherein the state adjustment factor is based on bodily injury, property damage, comprehensive and collision coverage factors. The DPU 170 may use the state adjustment factor to calculate adjusted base rates by zip code, based on Adjusted Base Rates by Zip Code=State Adjustment Factor x Base Rate. The DPU 170 may use this information to generate adjusted base rates for each of the locations. An example of weighted average rates, based on the driving location, is shown in Table 9.

TABLE 9

Weighted Average Rates

| ZIP | Miles | Rate |
|---|---|---|
| 10001 | 30% | 100 |
| 10002 | 10% | 130 |
| 10003 | 5% | 150 |
| 10004 (home) | 25% | 125 |
| 10005 | 30% | 240 |

Based on the percentage of miles driven in each zip code, a rate is determined. The driving location relativity is determined according to Driving location relativity=Sqrt (wtd avg of rates/rate of home zip, where a DLRI>1 indicates that the vehicle is driven in riskier areas than the home location. A DLRI<1 indicates that the vehicle is driven in less risky areas than the home location.

The DPU 170 may further be configured to generate a braking relativity factor. To generate a braking relativity factor, the DPU 170 must determine if a predetermined condition is satisfied such that a braking event is declared. For example, the DPU 170 may declare a braking event based on a rate deceleration or the amount of pressure applied to a brake. The database 176 of the DPU 170 may further be configured to store braking benchmarks for each type of road segment. An example of the braking benchmarks is shown in Table 10.

TABLE 10

Benchmark Braking Threshold

| Road Segment | Benchmark Braking Threshold (*Based on Median, **Based on 75th Percentile) |
|---|---|
| Highway | 0.01 brakes/mile* |
| Urban | 0.07 brakes/mile** |
| Other | 0.03 brakes/mile** |

Based on received telematics data, the DPU 170 determines the frequency and location of each braking event. This information is compiled in the database 176, and the DPU 170 then determines the amount of braking events per mile for each type of road segment and the overall proportion of braking for each road segment. Table 11 shows an example of compiled braking data.

TABLE 11

Compiled Braking Data

| Road Segment | Braking Events | Miles | Proportion |
|---|---|---|---|
| Highway | 0.12 brakes/mile | 2640 | 0.46 |
| Urban | 0.29 brakes/mile | 1650 | 0.29 |
| Other | 0.32 brakes/mile | 1430 | 0.25 |

For each type of road segment, an index is determined, wherein the index=measured/benchmark. For the example above, HW_Index=0.12/0.01, UR_Index=0.29/0.07=4.1, and OT_Index=0.32/0.03.

The DPU 170 may be configured to calculate an overall breaking index by averaging each of the braking indices weighted by the proportion of miles driven on each road. In the example above, the overall braking index may be calculated as Overall_Braking_Index=HW_Index*prop_miles_driven_HW+UR_index* prop_miles_driven_UR+OT_Index*prop_miles_driven_Other. The DPU 170 may be configured to rescale the overall braking index and center it on 1. This overall braking index may be scaled according to the following equation: Scaled Braking Index=(Overall_Braking_Index_mean—of the distribution)/(standard deviation of the distribution)+1 wherein the mean and standard deviation of the distribution come from a lookup table.

The system 100 may be able to adjust pricing data with or without loss data. For example, in absence of enough credible loss data from telematics devices, (enough losses in the data to have desired statistical power), the system 100 may determine an expected loss value, also known as Expected Pure Premium ("EPP") to calculate a braking relativity factor, wherein the EPP is calculated based on conventional class plan variables. The EPP may then be regressed on the telematics variables like braking, speeding etc. in a multivariate scenario to derive coefficients for these telematics variables. In another embodiment, the system 100 may use a univariate analysis and the EPP may be used to calculate the slope for the telematics variable. Using a look up table, stored in database 176, the DPU 170 may map the scaled braking index to a braking relativity factor. An example of mapping a scaled braking index to a braking relativity factor is shown in Table 12. According to the Table 12, an expected pure premium may be used.

TABLE 12

Braking Relativity

| Scaled Braking Index | EPP Based Braking Relativity (Square root of Raw EPP Relativity) **From EPP Relativity Look Up Table |
|---|---|
| 0.9 | 0.97 |
| 1.0 | 1.0 |
| 2.0 | 1.3 |

The DPU 170 or smartphone 110 may further be configured to determine a speeding relativity factor. The database 176 of the DPU 170 may be preconfigured to store a speed benchmark for each road segment. Table 13, below shows an example of a speed benchmark, using the same segments determined for the braking benchmark. This is used as an illustrative example only. In another embodiment, the road segments for speed may be determined based on posted speed limits, or measured clustered driving patterns.

TABLE 13

Benchmark Speeding Threshold

| Road Segment | Benchmark |
|---|---|
| Highway | 75 mph |
| Urban | 25 mph |
| Other | 45 mph |

After receiving the telematics data, the DPU 170 may be configured to calculate the proportion of miles driven 20 mph over the speed benchmark, 10 to 20 mph over the speed benchmark, 1 to 10 mph over the speed benchmark and 0 mph over the speed benchmark for each of the types of road segment. Further, the DPU 170 may be configured to assign weights based on the variance from the speed benchmark. An example for highway segments is shown in Table 14, below. While the table below only shows weights for speed above the speed benchmark, it may also include weights for speeds below the speed benchmark.

TABLE 14

Compiled Speed Data for Highway Segments

| Segment | Miles | Proportion | Risk Weight |
|---|---|---|---|
| HW 20 mph over | 39 | 0.01 | 100 |
| HW 10 to 20 mph over | 280 | 0.11 | 85 |
| HW 0 to 10 mph over | 768 | 0.29 | 65 |
| HW 0 over | 1552 | .59 | 35 |

The DPU 170 calculates a speeding index for each road segment by multiplying the risk weight of each speed grouping (e.g. HW_20 mph over) by the proportion of miles within that bucket. For example, based on the three equations given below:

HW_Index=Highway_20_mph_over_prop*wt+
Highway_10to20_mph_over_prop*wt+
Highway_0to10_mph_over_prop*wt+
Highway_0_over*wt UR_Index=UR_20_mph_over_prop*wt+
UR_10to20_mph_over_prop*wt+
UR_0to10_mph_over_prop*wt+UR_0_over*wt OT_Index=OT_20_mph_over_prop*wt+
OT_10to20_mph_over_prop*wt+
OT_0to10_mph_over_prop*wt+OT_0_over*wt The DPU 170 may further generate an average of the speeding indices weighted by proportion of miles driven on each road segment to determine an overall speeding index, wherein Overall_Speeding_Index=HW_Index*prop_miles_driven_HW+UR_Index* prop_miles_driven_Urban+OT_Index*prop_miles_driven_Other. The DPU 170 may further be configured to determine an overall speeding index that is used to determine the speeding relativity factor. Table 15 shows an overall speeding index mapped to a speeding relativity factor.

TABLE 15

Speeding Relativity Factor Mapping

| Overall Speeding Index | EPP Based Speeding Relativity (Square root of Raw EPP Relativity) * From EPP Relativity Look Up Table |
|---|---|
| 80 | 100 |
| 100 | 106 |
| 115 | 113 |

The DPU 170 may further be configured to determine a mileage relativity factor. The mileage relativity factor may be based on an expected mileage value entered by the user during the registration phase. The expected mileage is compared with the measured mileage. The DPU 170 may mitigate the effect of the relativity factor, for example by operating on the result with a function. As an example, the mileage relativity may be calculated as follows, using a square root function to mitigate the effect: Mileage relativity=SQRT(mileage factor based on actual miles driven/mileage factor based on reported miles).

The DPU 170 may further be configured to determine a time of day relativity factor. Based on loss data, the DPU 170 may categorize time segments as high risk, low risk and moderate risk. The DPU 170 may measure the relative risk of driving at certain times of day. The DPU 170 may weight each of the times of day, wherein the weighting rewards low risk miles while incrementally penalizing moderate and high risk miles. Based on the received telematics data, the DPU 170 may further calculate the proportion of miles driven within each time of day segment. Table 16 shows an example of time of day weighting.

TABLE 16

Showing Risks and Weights used for TOD Relativity

| Time of Day | Proportion of Miles | Risk Weight |
|---|---|---|
| High Risk | 0.1 | 130 |
| Moderate Risk | 0.6 | 100 |
| Low Risk | 0.3 | 75 |

The DPU 170 may then calculate a Time Of Day ("TOD") risk index based on the mileage weighted average of TOD risk. The TOD risk index is mapped to a TOD relativity factor, using a lookup table. Table 17 shows a TOD risk index and TOD relativity factor based on the example above.

TABLE 17

Time of Day Relativity Factors

| TOD Risk Index | EPP Based TOD Relativity (Square root of Raw EPP Relativity) * From EPP Relativity Look Up Table |
|---|---|
| 80 | 0.90 |
| 110 | 1.1 |
| 140 | 1.3 |

The DPU 170 may transmit the relativity factors to the RPU 160. The RPU 160 may be configured to adjust the rate, or provide a discount or surcharge based on the relativity factors according to, for example: Discount relativity=starting discount* driving location relativity*braking relativity*speeding relativity*mileage relativity*time of day relativity. The system 100 may further be configured to determine whether the vehicle 140 is a self-driving vehicle, in which an on-board computer operates the vehicle 140. In this case, the effect of the driving time of day or any other factor may be mitigated when determining the pricing information.

The system 100 may use biographical information provided in web pages as a baseline for generating the initial pricing information. However, using the methods described above and the received telematics data, provided by the smartphone 110, the system 100 may refine the pricing information by adjusting the rate, providing a credit or surcharge, or rejecting a renewal. In one embodiment, the RPU 160 may access the information stored in the DPU 170 and the determined discount relativity, and use a software based algorithm to determine a discount.

For example, the starting discount may be 10%, and if the product of the direct and indirect exposure ratings with the weighting factors >1, the system 100 may determine the driver is not eligible for a discount.

In one scenario, the system 100 may receive telematics data for a fixed time period. In this scenario, the RPU 160 may be configured to compensate for the limited duration of the telematics data using a seasonality factor. For example, if the telematics data is received from September through December, and the biographical information indicates one of the insured drivers attends college away from home, RPU 160 may be configured to use the seasonality factor to adjust the pricing information to account for the lack of information transmitted regarding that driver. Conversely, under the same scenario, if the readings were taken during the summer, when the student was home, the telematics data may be skewed the other way. Accordingly, the RPU 160 may use the seasonality factor to account for those differences.

The system 100 may further be configured to provide discounts outside typical renewal periods. For example, if an account includes a student driver and that student driver is associated with a high risk driver signature. If that student goes away to college, and the absence of high risk driver signature is measured for a predetermined period of time, then the system 100 may be configured to confirm that a driver has moved out and may offer an immediate discount.

In another embodiment, the system 100 may be configured to transmit the driver signature information to the customer. This may allow a customer to identify high risk driving behaviors and adjust the behaviors to lower their premium. This information may be accessible, for example, through web site system 120, or through an app loaded onto a user device 130.

Figure 7:
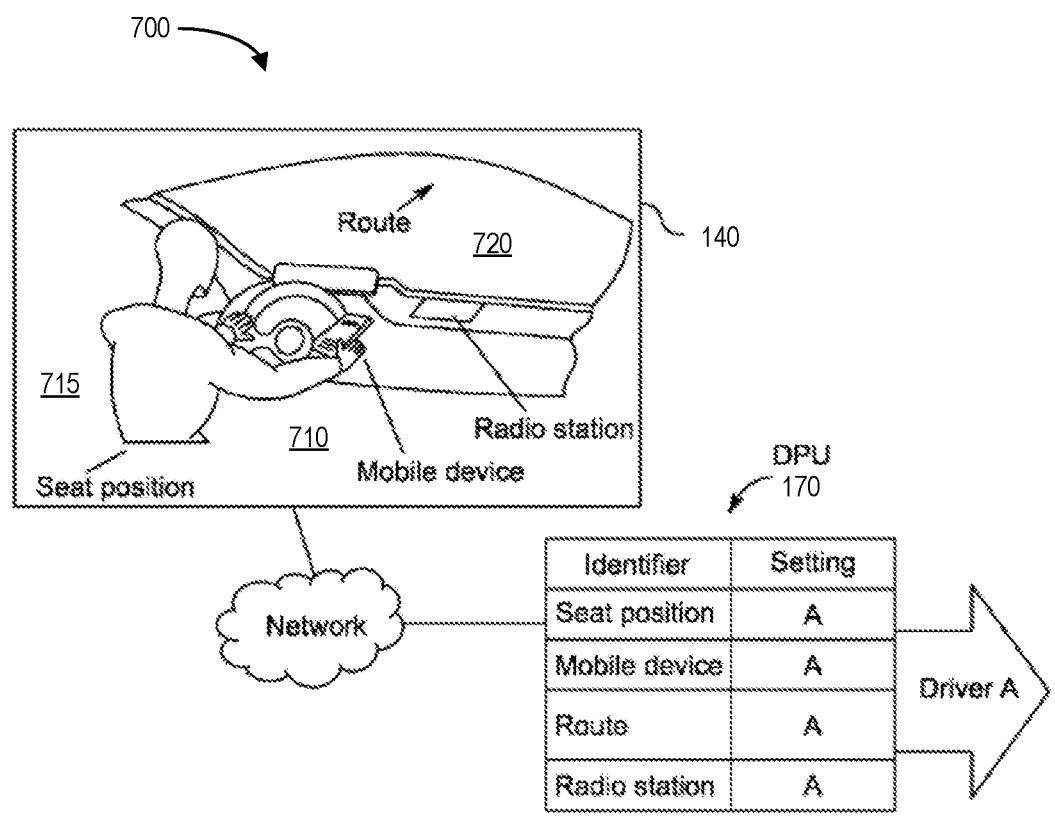
FIG. 7 shows an example configuration for determining a driver signature based on telematics data.

FIG. 7 shows an example 700 configuration for determining a driver signature based on telematics data. As shown in FIG. 7, a driver is situated in the vehicle 140. The vehicle 140 includes an electronic seat adjustment unit 715 and a radio 720. The driver of the vehicle 140 also has a mobile device 710. In this embodiment, the mobile device 710 includes an app that enables it to operate as the telematics device. The mobile device 710 may be connected to the vehicle 140 using a BLUETOOTH communications link. The mobile device 710 senses or receives seat position information, route information, radio station information, and other telematics data from the vehicle 140. The mobile device 710 may communicate this information to a telematics collection server. This information may be communicated continuously during the vehicle's 140 operation, or in another embodiment the mobile device 710 may be configured to transmit the information at scheduled times, for example, when the mobile device 710 is connected to a Wi-Fi network. The telematics collection server receives this information and may format the telematics data and send it to the DPU 170. The DPU 170 compares the received telematics data with preconfigured expected telematics values. As shown in FIG. 7, the seat position information is compared with the expected seat position and it is determined that this is indicative of Driver A. The mobile device 710 recording the information is determined to be indicative of Driver A. The route driven by vehicle 140 is indicative of Driver A. The use of radio 720 is determined to be indicative of driver A. While in this example, each factor is indicative of Driver A, in other examples, the seat position may be indicative of a Driver C and radio station may be indicative of a Driver B, by way of example. The DPU 170 may use a multivariate analysis to identify the driver of the vehicle 140 for a particular trip based on this received telematics information. Additionally, if all of the insured drivers are registered with the system 100, and if vehicle usage shows extended driving periods, not accounted for by the data transmitted by the mobile devices (e.g., 710), the system 100 may determine the use is by an unregistered driver. In the example shown in FIG. 7, the DPU 170 determines the driver to be driver A.

If the user is a potential customer, the user may provide or upload information from past experiences to the system 100. Or they may enroll to receive a trial telematics smartphone application prior to receiving an initial quote.

Figure 8:
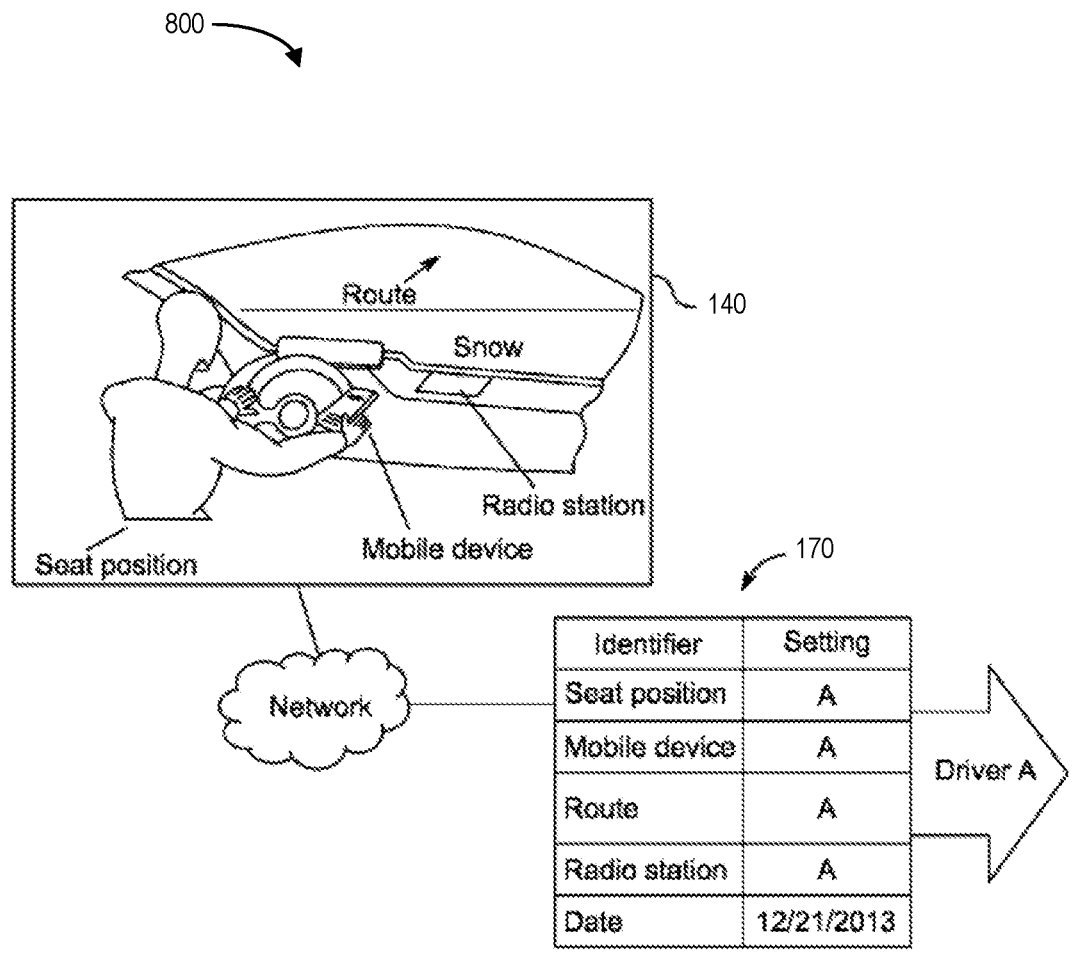
FIG. 8 shows an example configuration for determining a driver signature based on telematics data that accounts for a seasonality factor.

FIG. 8 shows an example 800 configuration for determining a driver signature based on telematics data that accounts for a seasonality factor. As shown in FIG. 8, a mobile device may be configured to communicate the telematics data as discussed in reference to FIG. 7. In this example, telematics collection server may further be configured to communicate the date during which the vehicle was driven. This may be important, for example, if a student driver only drives 5% of the time, but that 5% of the time is during a snowy season. Additionally, as discussed above, the RPU 160 may incorporate a seasonality factor to compensate for expected changes in driving patterns during different times of year (e.g. different schedules during the school year). The system 100 may be configured to use additional telematics data, for example, received from third-party systems that may include weather data, traffic data, and other relevant data in compensating for seasonality.

Illustrative examples of the system 100 implementing driver signatures are shown below. In a first scenario, the number of vehicles covered by the policy may include the number of listed drivers. Table 18 shows a driver proxy score below:

TABLE 18

| Driver Proxy Score | | |
| --- | --- | --- |
| Assigned by Insurance rating | Assignment | Driver Proxy Score (1-50) |
| Vehicle 1 | Driver 1 | 30 |
| Vehicle 2 | Driver 2 | 45 |

In the example shown in Table 18, based on the information received from the customer, the assigned score is based on the expectation that vehicle 1 will be driven 100% by driver 1 and vehicle 2 will be driven 100% by driver 2.

However, the DPU 170 may receive telematics data to determine the actual miles driven by each driver. Table 19 below shows the determined actual miles driven.

TABLE 19

| Actual Miles Driven, as determined by telematics data | | | |
| --- | --- | --- | --- |
| | Driver 1 | Driver 2 | |
| Vehicle 1 | 80% | 20% | 100% |
| Vehicle 2 | 20% | 80% | 100% |

The DPU 170 may be configured to generate a weighted average of driver score for vehicle 1 using driver signature=(percentage of time driven by driver 1)(driver proxy score)+(percentage of time driven by driver 2)(driver proxy score). The DPU 170 may further generate a weighted average of driver score for vehicle 2, for example, using as driver signature=(percentage of time driven by driver 1)(driver proxy score)+(percentage of time driven by driver 2)(driver proxy score). Based on this information, the DPU 170 determines a driver signature relativity for each vehicle=actual/expected. The RPU 160 may use the driver signature relativity to determine pricing information. In one embodiment, the RPU 160 may generate a blended rate, based on the driver signature relativity. Additionally or alternatively, the RPU 160 may be configured to adjust the rate or provide a credit or penalty to the account. In another scenario, the number of vehicles may be greater than the number of drivers.

Based on the customer provided biographical information, the DPU 170 may determine a driver proxy score for each vehicle. Table 20 shows an example of driver proxy scores in the scenario where there are more vehicles than drivers.

TABLE 20

| Driver Proxy Scores when Vehicles > Drivers | | |
| --- | --- | --- |
| Assigned by conventional rating | Assignment | Driver Proxy Score (1-50) |
| Vehicle 1 | Driver 1 | 30 |
| Vehicle 2 | Driver 2 | 40 |
| Vehicle 3 | Driver 2 | 40 |

Based on the information received during the registration phase (or alternatively on past experience), in the More Cars Than Drivers ("MCTD") scenario DPU 170 assigns a score based on an assumption that vehicle 3 will be driven 100% by driver 2, the worse of the two drivers. Table 21 shows the determined actual miles for each vehicle by each driver.

TABLE 21

| Actual Miles Driven when Vehicles > Drivers | | |
| --- | --- | --- |
| | Driver 1 Miles Driven | Driver 2 Miles Driven | |
| Vehicle 1 | 80% | 20% | 100% |
| Vehicle 2 | 30% | 70% | 100% |
| Vehicle 3 | 50% | 50% | 100% |

Based on this information, the DPU 170 may determine the weighted average of driver score for vehicle 1 using driver signature=0.80*30+0.20*40. The DPU 170 may determine the weighted average of driver score for Vehicle 2 using driver signature=0.30*30+0.70* 40. The DPU 170 may determine the weighted average of driver score for Vehicle 3 using driver signature=0.50*30+0.50*40. The DPU 170 uses this information to determine a driver signature relativity adjustment for each vehicle=actual/expected. The RPU 160 may use the driver signature relativity to determine pricing information. In one embodiment, the RPU 160 may generate a blended rate, based on the driver signature relativity. Additionally or alternatively, the RPU 160 may be configured to adjust the rate or provide a credit or penalty to the account.

The system 100 may further be configured to account for technologies such as "driverless car technology," which may allow for autonomous operation of a vehicle, or aspects of a vehicle. The autonomous driver may be controlled by the vehicle's 140 control system. In one embodiment, the system 100 may be configured with a predetermined score for a driverless system. This may include scoring route selection patterns, braking patterns, accelerating patterns, and the speed, proportionality and accuracy of the vehicle's response to the environment, such as obstacles and changing conditions. The automated system would be treated as a unique driver with a particular signature attached. The system 100 may then be configured to account for the time a vehicle 140 is driven by a driverless vehicle system.

TABLE 22

| Autonomous Vehicles | | |
| --- | --- | --- |
| Assigned by conventional rating | Assignment | Driver Proxy Score (1-30) |
| Vehicle 1 | Autonomous | 1 (Perfect Driver Score) |
| Vehicle 1 | Driver 1 | 5 (Good Driver Score) |
| Vehicle 1 | Driver 2 | 20 (Bad Driver Score) |

An assigned score in the example of Table 22 assumes a vehicle 1 will autonomously operate itself, thereby earning a perfect driver proxy score (no accidents). However, driver 1 and driver 2 can assume operation of the vehicle. This would override autonomous capability and therefore the pricing calculation could be modified by a relativity factor. This factor would be calculated as follows for 80% autonomous driving, driver 1 a 15% driving, and driver 2 a 5% driving. Weighted average driver score for vehicle 1 using driver signature=0.80*1.0+0.15*5.0+0.05*20=2.55. Therefore, the driver signature relativity for vehicle 1 equals the actual/expected which is 2.55/1=2.55. This relativity factor can then be used in the calculation of the premium for vehicle 1.

Figure 9:
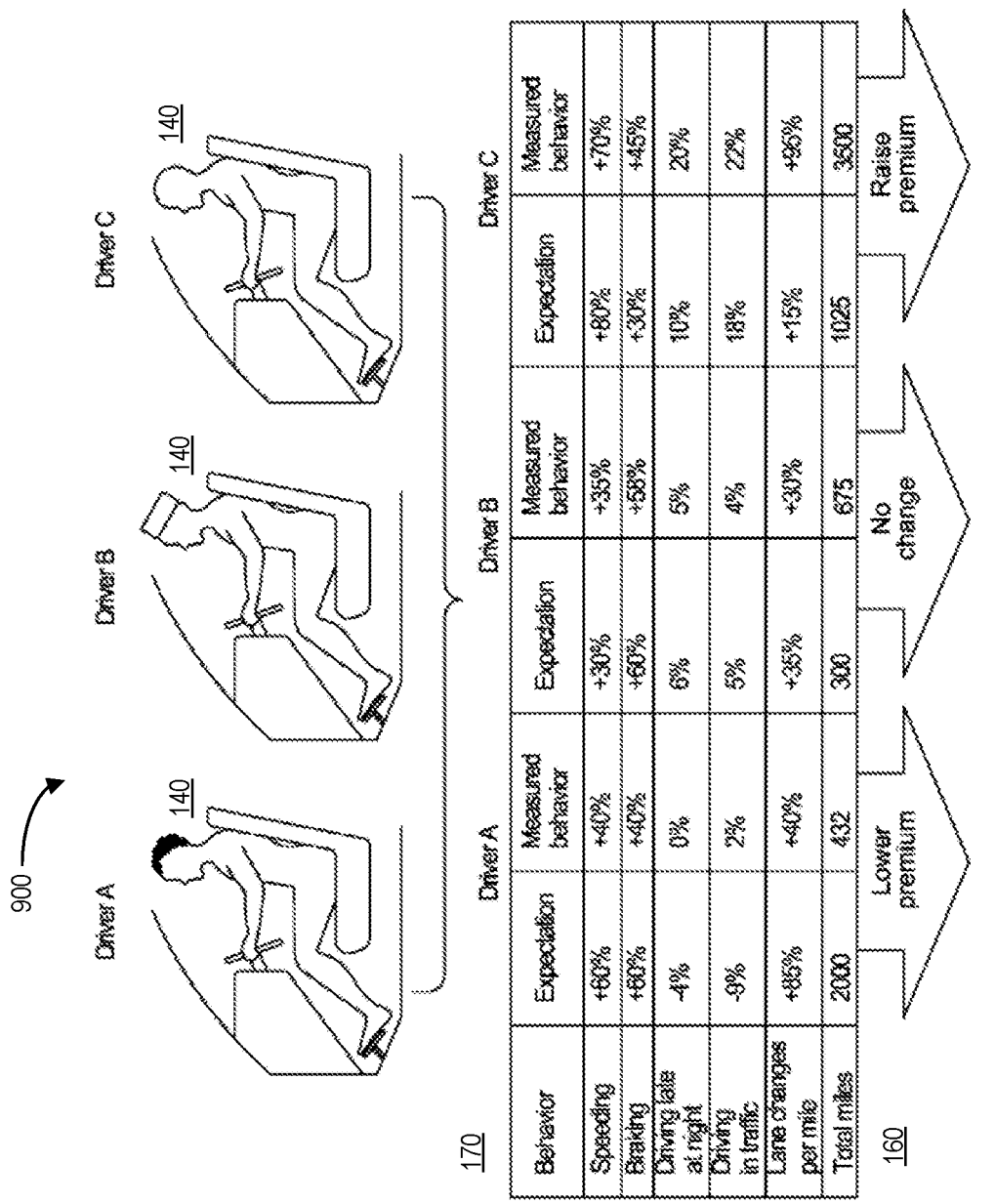
FIG. 9 shows three examples of assessing a driver's risk based on telematics data collected on actual driving behavior relative to the expected driving behavior.

FIG. 9 shows three examples 900 of expectation based processing. As shown in FIG. 9, the three drivers may all be drivers of the same vehicle 140. The drivers include different genders, ages, credit rating, etc. Based on the initial biographic information, the DPU 170 determined an expectation of driver behavior. In the example shown, the DPU 170 determined expected values for speeding, braking, driving late at night, driving in traffic, lane changes and total mileage. The speeding, braking, driving late at night, driving in traffic and lane changes per mile are all represented in relative terms. The driver is evaluated against a hypothetical baseline driver. The expected values are determined based on the differences of a driver in a risk class versus that baseline driver. The DPU 170 receives telematics information, either directly from a telematics device, or indirectly through a third-party operated system. In the examples shown in FIG. 9, the received telematics data is summary data for the factors shown in the table. The DPU 170 compares the measured behavior to the expectation. As shown in FIG. 9, Driver A is expected to brake, speed and change lanes far more often than the hypothetical baseline driver. The actual values show that while Driver A is in fact worse than the hypothetical baseline driver, the difference is not nearly as much as expected. The RPU 160 receives the comparison information related to Driver A, and determines that Driver A is in line for a lower premium. The RPU 160 may be configured to determine a new rate for the driver or it may keep the same rate, but provide the driver with a credit. Driver B is expected to be a better driver than Driver A. Driver B's measured behavior is similar to Driver A, but Driver B does not get a discount. This is because Driver B was expected to be better than Driver A. As shown in FIG. 9, the measured behavior of Driver B is very close to the expectation. The RPU 160 may be configured with a threshold wherein if the measured driving behavior is within a predetermined value of the expectation, it may not change the premium. In the example shown in FIG. 9, the variance of Driver B from the expectation for Driver B, that the pricing information is not changed. The measured behavior associated with Driver C is worse than the expectation; accordingly, the RPU 160 determines a new premium that is higher, which reflects the higher risk associated with that driver's driving behavior.

In another example of expectation based rating, a Driver Proxy Score ("DPS") may be derived from a combination of rating variables in a conventional class plan. Table 23, below, shows an example of a driver proxy score.

TABLE 23

Driver Proxy Score

|  | Age | Sex | Marital | Credit | Driver Proxy Score (DPS) |
|---|---|---|---|---|---|
| Driver 1 | 16 | M | U | Good | 25 |
| Driver 2 | 45 | F | M | Excellent | 10 |

The DPU 170 may receive the telematics data and generate a Driver Telematics Score ("DTS"). Table 24 shows an example of a driver telematics score.

TABLE 24

Driver Telematics Score

|  | Speeding | Braking | Miles Driven | Driver Telematics Score (DTS) |
|---|---|---|---|---|
| Driver 1 | Average | Average | Low | 12 |
| Driver 2 | Average | Average | Low | 12 |

The DPU 170 may standardize the risk scores in Tables 23 and 24 using multivariate statistical techniques, to make them comparable on the same risk scale. An Expectation Based Rating ("EBR") may be calculated as follows EBR for Driver 1=actual/expected=12/25=0.48 and EBR for Driver 2=actual/expected=12/10=1.2.

As shown, by the scores above, two drivers with the same DTS may receive different EBRs based on their expected behavior from a conventional class plan. Driver 1 may receive a discount as the actual driving behavior is better than expected whereas Driver 2 may receive a surcharge as the actual driving behavior is worse than expectation.

Figure 10:
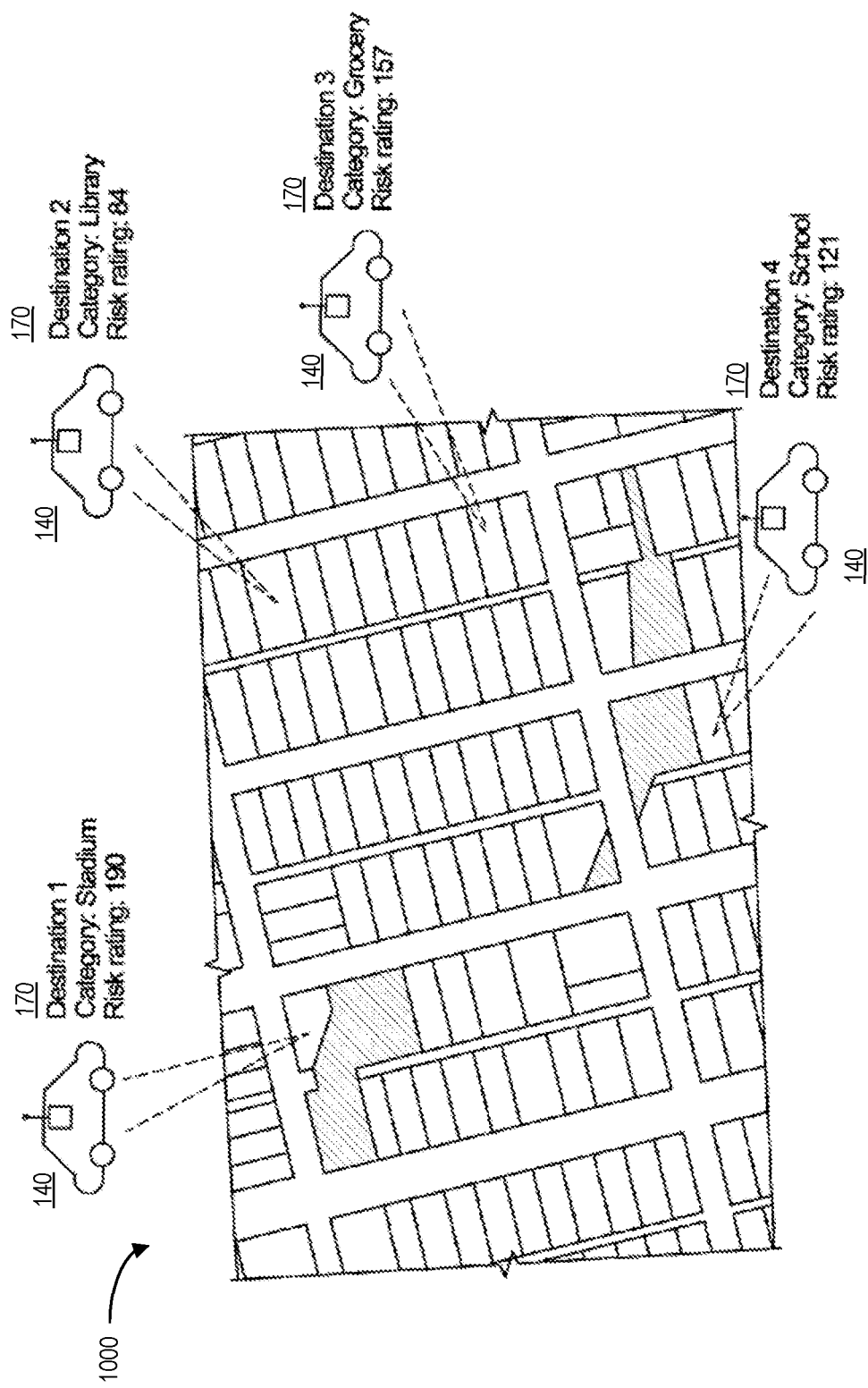
FIG. 10 shows an example of a location risk map used in accordance with one embodiment.

FIG. 10 shows an example 1000 of a location risk map used for destination based underwriting. As shown in FIG. 10, the vehicle 140 is monitored as it visits multiple destinations. In FIG. 10, the vehicle 140 is shown stopped at four destinations. When the DPU 170 determines that a vehicle is stopped for a predetermined duration, the DPU 170 identifies a location as a destination. As shown in FIG. 10, the DPU 170 may include a category for each destination. Each destination may further be assigned a location risk rating. As shown in FIG. 10, the stadium has the highest risk rating (190) and the library has the lowest risk rating (84). The DPU 170 determines a risk score based on the risk rating of destination, the duration of stay at each destination, as well as the time of day during which the vehicle is stopped at each destination. The DPU 170 may then compare this versus the home/garaging location, to determine a risk assessment. This risk assessment is used by the RPU 160 to determine updated pricing information.

In another example of destination based underwriting, the DPU 170 may be configured to determine a Proxy Destination Score ("PDS") based on a territory rating based on the reported home/garaging address reported at the time of sale of the policy. An example of a PDS is shown below in Table 25.

TABLE 25

Proxy Destination Score

| Home/Garaging Zip | Proxy Destination Score (PDS) |
|---|---|
| 32951 | 42 |

The DPU 170 may use the received telematics data to generate a Telematics Destination Score ("TDS"), for example, based on the techniques explained above. The DPU 170 may further calculate the amount of time spent at the destination, in the aggregate, over the total time of a predetermined period (e.g. a month, six months). An example of a TDS is shown in Table 26.

TABLE 26

Telematics destination score (TDS)

| Zip | Telematics Destination Score (TDS) | % of time at a destination within the location |
|---|---|---|
| 32605 | 11 | 0.3 |
| 32606 | 12 | 0.1 |
| 32611 | 19 | 0.1 |
| 32951 | 42 | 0.4 |
| 32601 | 13 | 0.1 |

The DPU 170 may be configured to standardize the risk scores in both Tables 25 and 26 using multivariate statistical techniques to make them comparable on the same risk scale. The DPU 170 may then determine a destination relativity score, as follows: Destination relativity=Weighted avg. of rates by time spent in the location unit/home location rate=11*0.3+12*0.1+19*0.1+42*0.4+13*0.1/42=Destination Relativity. The destination relativity may be compared with the expected value to determine whether to adjust the pricing information or continue coverage. For example, based on the determination relativity, the RPU 160 may increase or decrease the rate and/or provide the account with a credit or penalty.

Figure 11:
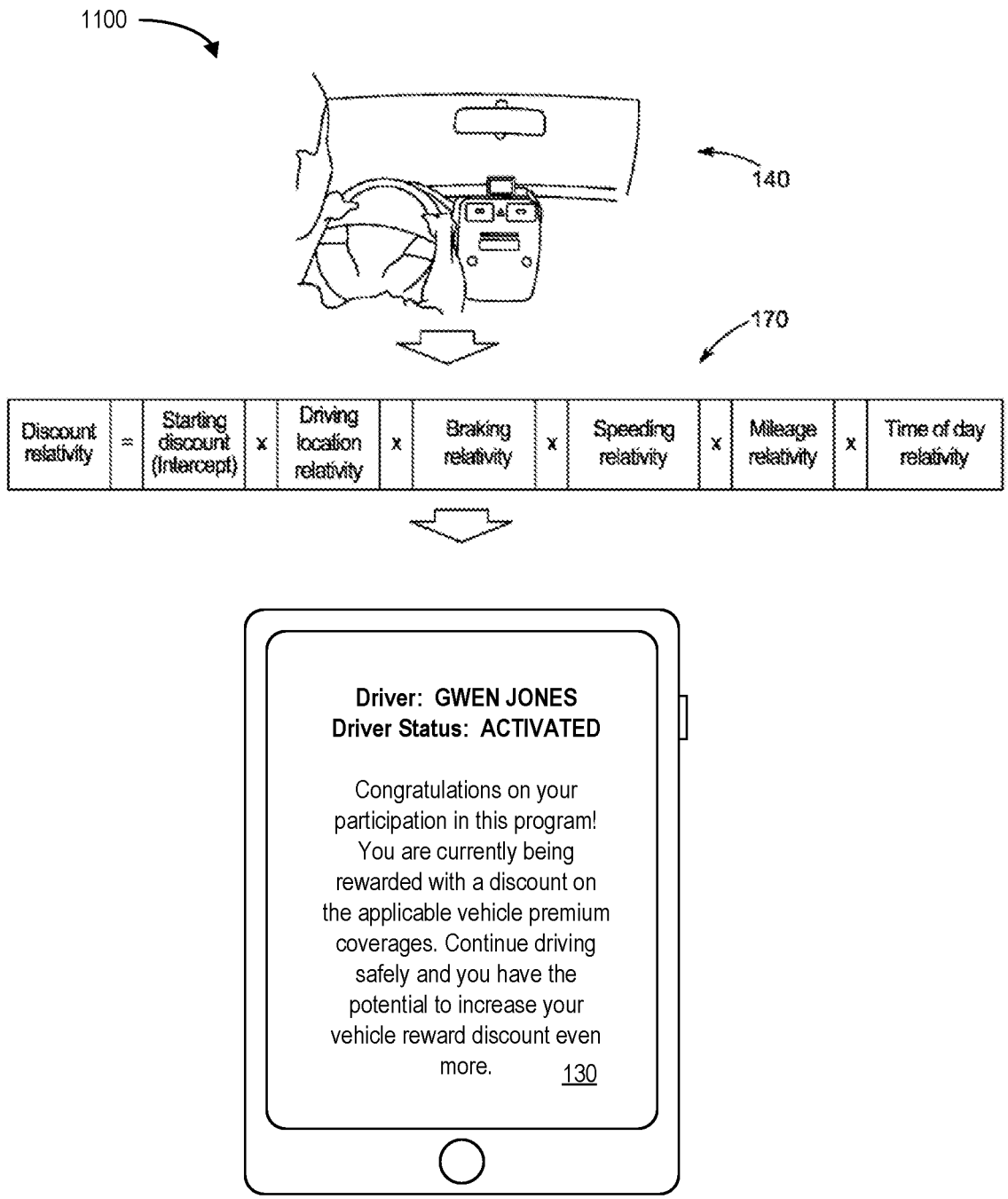
FIG. 11 shows an example diagram of an embodiment of a system for telematics based underwriting.

FIG. 11 shows an example visual flow diagram 1100 of an embodiment of a system for telematics based underwriting. As shown in FIG. 11, a driver is driving vehicle 140. The vehicle 140 may include multiple electronics devices configured to communicate with a smartphone located in the vehicle. The smartphone may sense speed, acceleration, etc. and communicate this information to a third-party operated server. The smartphone 110 may also be configured to receive raw telematics data and convert it into a different format, e.g. summary telematics data. The smartphone 110 may communicate this telematics data in a predetermined format to the DPU 170. FIG. 11 shows an algorithm, implemented in the DPU 170 calculating a plurality of relativity factors. The RPU 160 may use these relativity factors to determine pricing information. A website system may be used to communicate this pricing information to the smartphone 110 or other user device 130, in the form of a web page. As seen in FIG. 11, the user device 130 may include a display that is presenting the user with a discount. In another example, the display may include information that compares the vehicle usage on the policy to other similar vehicles and/or drivers of a similar background. The display may further include suggestion regarding how to improve driving to receive a discount or lower rate.

Figure 12:
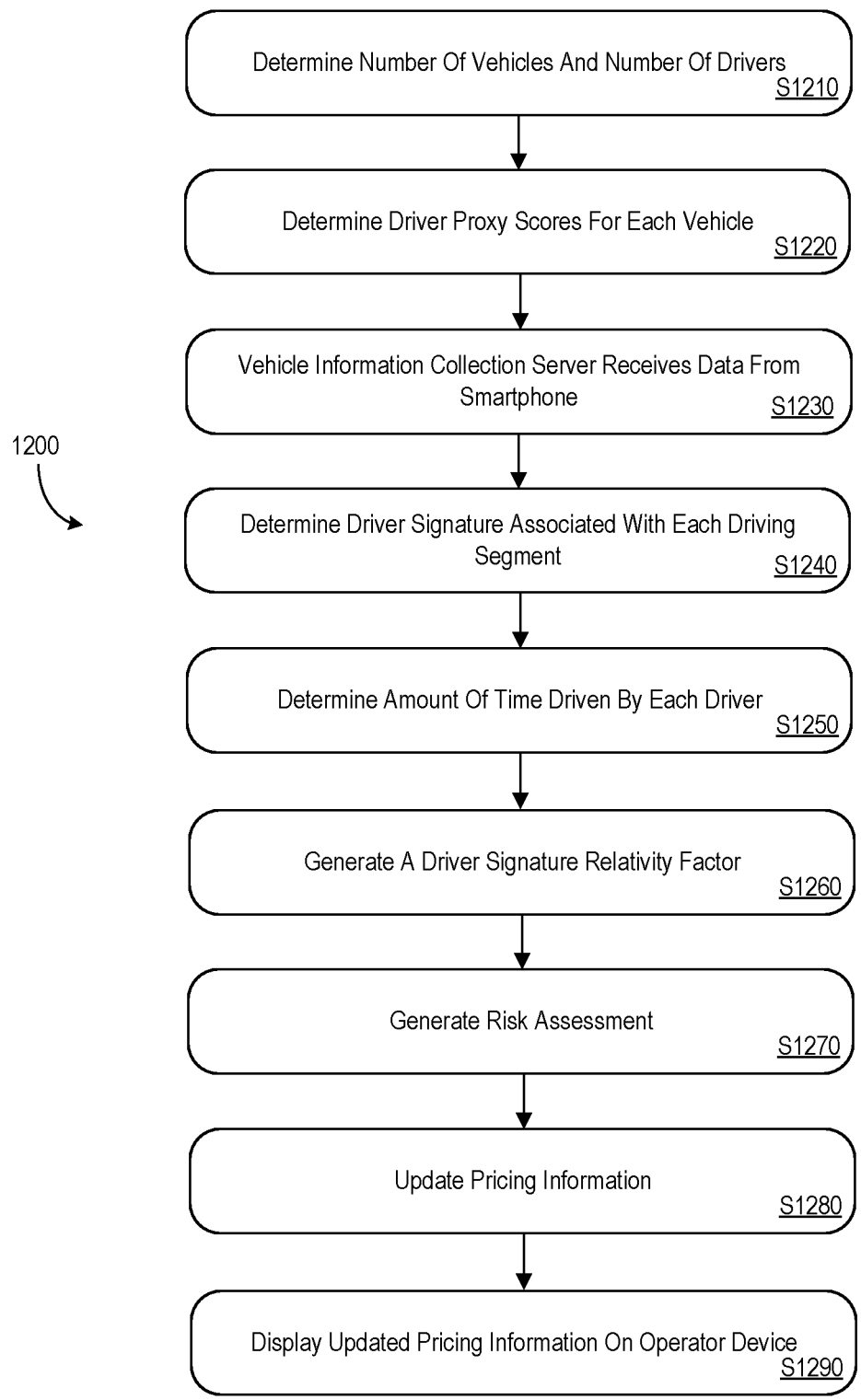
FIG. 12 shows a flow diagram for a method for determining pricing based on driver signatures associated with a vehicle.

FIG. 12 shows a flow diagram for a method 1200 for determining driver signatures associated with vehicle use and updating pricing information based on the determined driver signatures. This application incorporates the entire contents of U.S. patent application Ser. No. 14/518,750, filed Oct. 20, 2014, and U.S. patent application Ser. No. 14/145,142, filed Dec. 31, 2013 by reference as if fully set forth. Because the insurance company may employ a different analysis based on the number of cars relative to the number of drivers, the system 100 may determine the number of vehicles and the number of drivers (S1210). Based on the number of vehicles and the number of drivers and the expected use of each vehicle, the DPU 170 may determine a driver proxy score for each vehicle (S1220). A telematics collection server may then receive telematics data sensed by a smartphone associated with each vehicle (S1230). The telematics collection server may be operated by the insurance company or it may be operated by a third-party service. For each segment during which a vehicle is driven, the DPU 170 may analyze the telematics data to determine a driver signature associated with each segment (S1240). The DPU 170 may determine the amount of time each vehicle was driven by each driver signature (S1250). Based on this information, the DPU 170 may generate a driver signature relativity factor for each vehicle (S1260). The driver signature relativity factor may account for the driver proxy score for each vehicle verses the values determined based on driver signatures. The RPU 160 generates a risk assessment based on the driver signature relativity factor (S1270). In one embodiment, the risk assessment may include vehicle profiles which comprise the total number of drivers and the behavior of each of those drivers. The RPU 160 may then generate updated pricing information based on the risk assessment (S1280). The website system 120 may communicate the updated pricing information to a user device 130 (S1290). The website system 120 may further communicate suggested changes in driving behavior that may be used to receive a discount.

Figure 13:
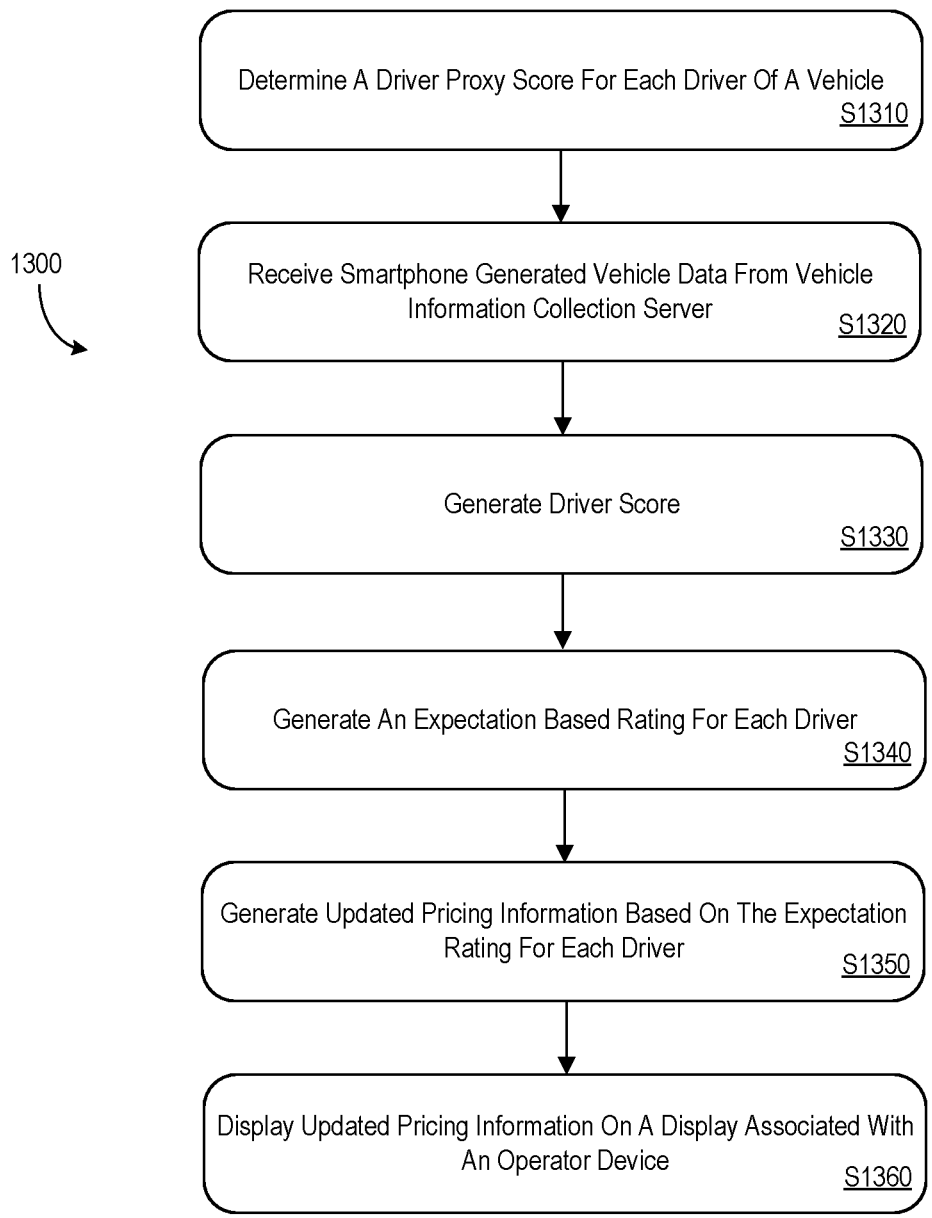
FIG. 13 shows another flow diagram for a method for expectation based processing.

FIG. 13 shows another flow diagram for a method 1300 for expectation based processing. This application incorporates the entire contents of U.S. patent application Ser. No. 14/145,165, filed Dec. 31, 2013 by reference as if fully set forth. In the method 1300 shown in FIG. 13, the system 100 determines a driver proxy score for each driver associated with a vehicle 140 at S1310. The driver proxy score may be based on demographic information provided by the driver or it may be based on previous data regarding the driver (for example, from recorded data the previous year). The system 100 may then receive telematics data from a telematics collection server (S1320). For example, the telematics collection server may receive sensed data from the smartphone 110. This telematics collection server may be operated by a third-party vendor or by the insurance company or any suitable party. This information may be formatted and electronically transmitted to the DPU 170. The DPU 170 may use a software based algorithm to determine a driver telematics score for each driver (S1330). The DPU 170 may then determine an expectation based rating for each driver (S1340). The RPU 160 may be configured to use a multivariate analysis to generate updated pricing information (S1350). This information may be determined on an individual telematics factor basis. The system 100 may format this information and then display it to the display of a user device 130 (S1360). The display may indicate specific factors on which a credit or penalty was assessed and an overall presentation of driving behavior. The display may further provide the user with a graph showing the driver's behavior versus the expectation as well as the hypothetical baseline driver. The system 100 may further be configured to provide the display with information regarding suggested changes to driving behavior which may save the driver money.

The system 100 may provide this information at a predetermined renewal period or based on a triggering event. A triggering event may occur, for example based on the variance of the telematics data to an expected value or any event or observed data that may adjust expected losses.

Figure 14:
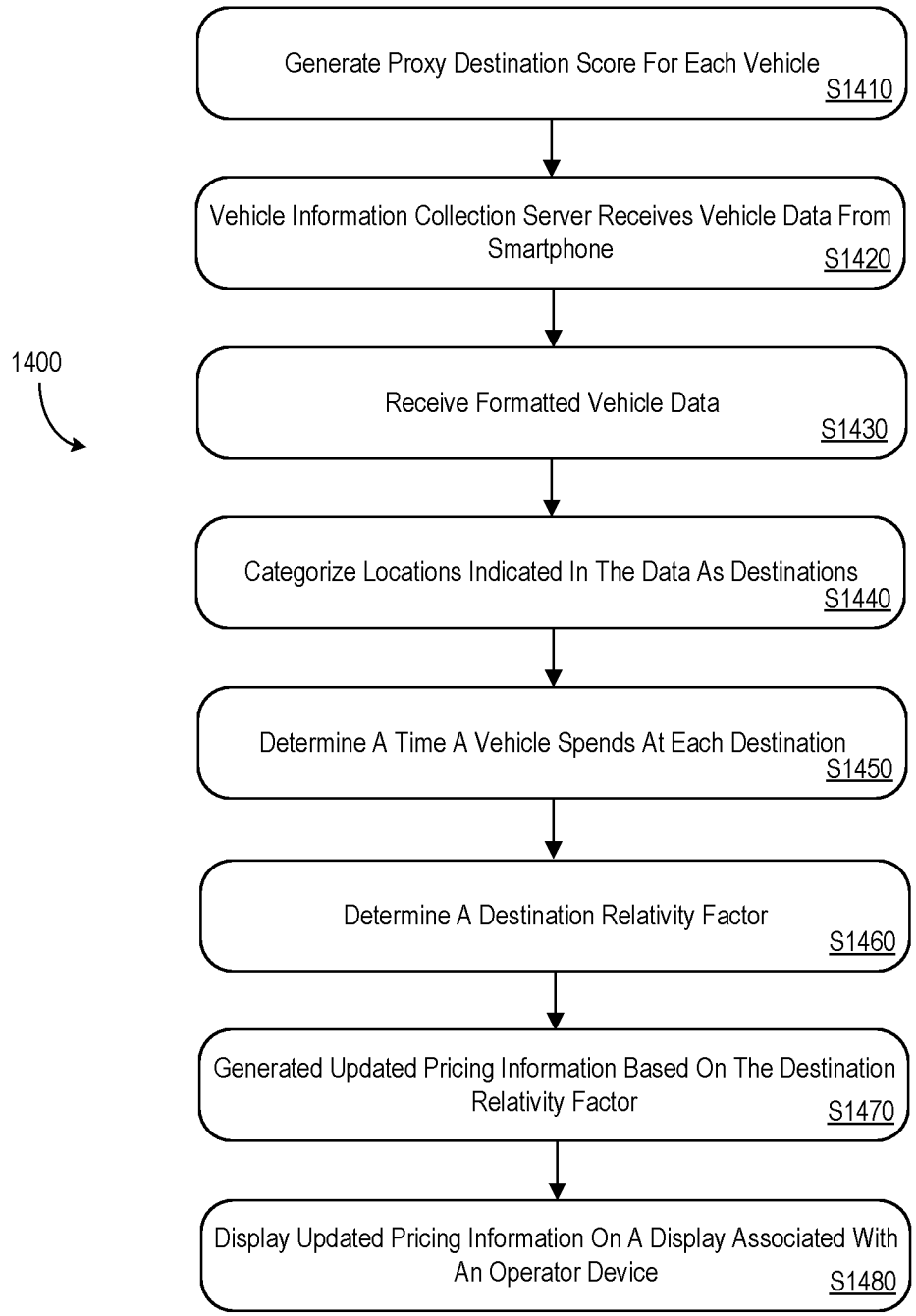
FIG. 14 shows a flow diagram for a method for destination based underwriting.

FIG. 14 shows a flow diagram for a method 1400 for destination based underwriting. This application incorporates the entire contents of U.S. patent application Ser. No. 14/145,181, filed Dec. 31, 2013 by reference as if fully set forth. Based on the received biographical information, the DPU 170 may determine a proxy destination score for each vehicle (S1410). In one example, the proxy destination score may be based on the home/garaging ZIP code. As another example, the proxy destination score may be based on previously measured data associated with the vehicle 140 or vehicle owner. A telematics collection server may receive telematics data from a smartphone associated with the vehicle 140 (S1420). The telematics collection server may format and forward the telematics data to the DPU 170 (S1430). The DPU 170 may then analyze the received telematics data and categorize locations indicated in the telematics data as destinations (S1440). Wherein a destination may be determined based on a minimum duration at a location. Based on the evaluation period (e.g. one month, 2 months, year, or time between renewals), the DPU 170 determines the relative percentage of time the vehicle 140 spends at each destination (S1450). The DPU 170 determines a destination relativity factor based on the percentage of time the vehicle spends at each location, the rating of each location, the home/garaging ZIP, and the rating of the home/garaging zip (S1460). The RPU 160 generates updated pricing information based on the destination relativity factor (S1470). The website 120 may provide the updated pricing information to a user device 130 (S1480). The updated pricing information may include an adjusted rate, or debits or credits determined by the RPU 160. The web site system 120 may also provide the user device 130 with additional information, such as recommendations on where to store the vehicle to receive a discount.

Figure 15:
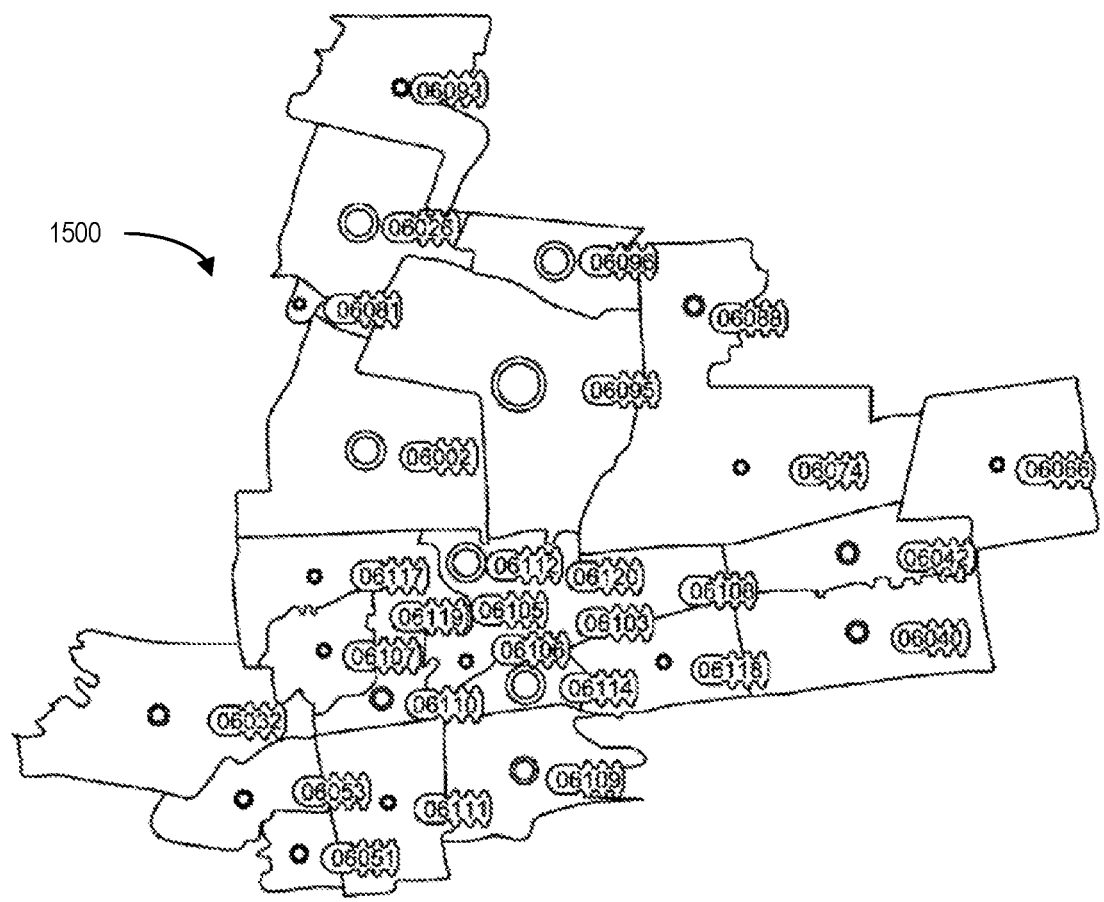
FIG. 15 shows an example graph for a driving location risk index for a location based calculation, wherein the location size is based on the zip code.

FIG. 15 shows an example graph 1500 for a DLRI for a ZIP code based calculation. This application incorporates the entire contents of U.S. patent application Ser. No. 14/145,205, filed Dec. 31, 2013 by reference as if fully set forth. As shown in FIG. 15, a map is comprised with circles of different color/size to indicate the categorization for an area based on ZIP code. The DLRI may be determined by the DPU 170 based on loss data received by the DPU 170. This loss data may be directly measured by the DPU 170, or it may be received from an external server 180. The DPU 170 may determine multiple DLRI maps for each type of coverage. The DPU 170 receives telematics data regarding the location of the vehicle 140. The DPU 170 determines the amount of time spent in each risk category. A driving location relativity factor is determined based on this information. The RPU 160 may use this driving location relativity factor in determining an adjustment to the pricing information. While the example shown in FIG. 15 shows only a limited number categories are assigned for each ZIP code, the system 100 may use more or less categories. Additionally, while the example shown in FIG. 15 shows the unit area of the DLRI calculation as the area represented by a ZIP code, the actual unit of area may be different.

As described above, the relativity factors may be based on different units of area. In another example, the relativity factors may be determined relative to road segments travelled (e.g. braking per road segment).

Figure 16:
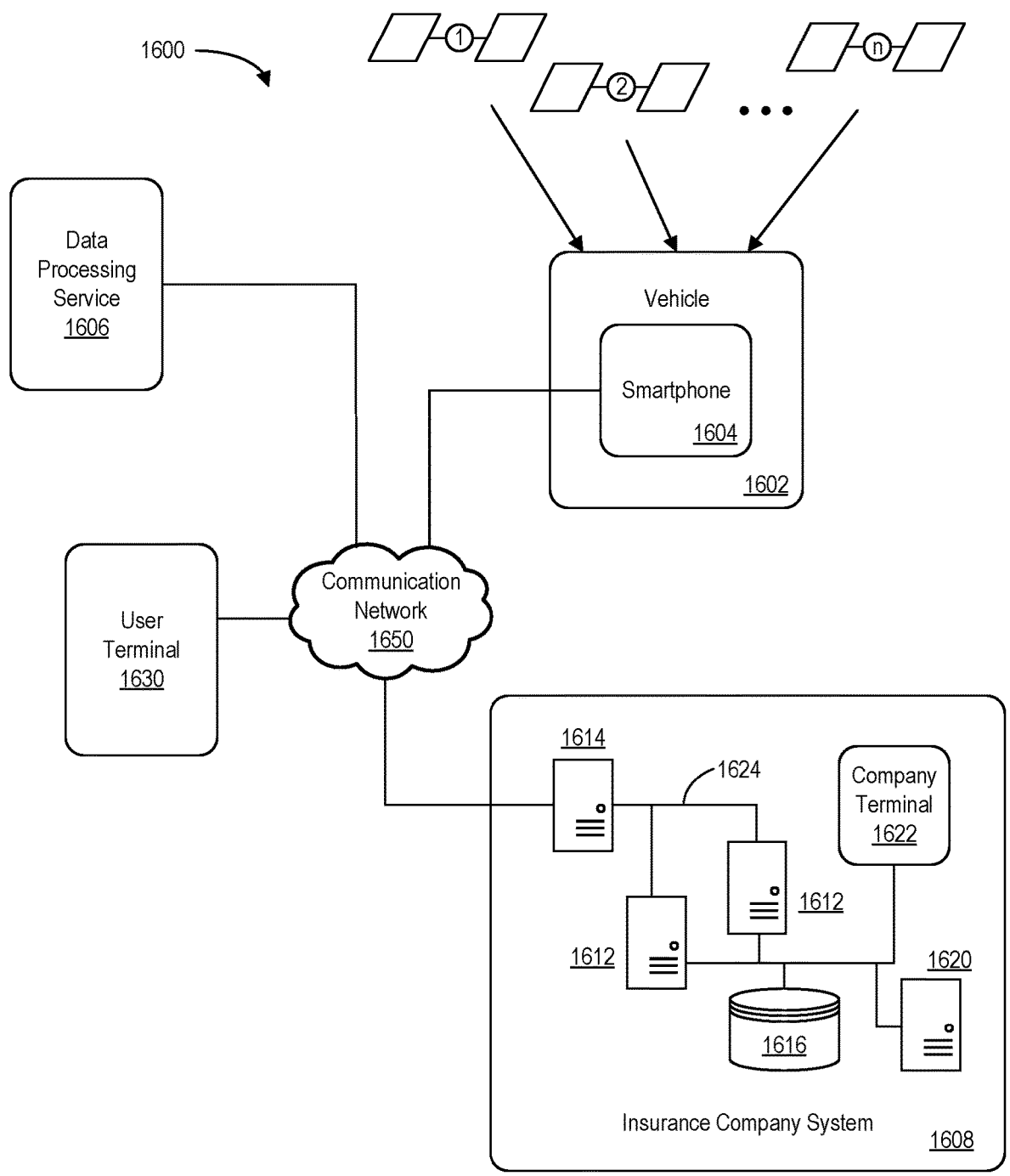
FIG. 16 is an architectural model of a system for determining a discount for an insurance premium based on telematics data, according to an illustrative embodiment of the invention.

FIG. 16 is a block diagram of a system 1600 for determining a discount for an insurance premium based on telematics data according to an illustrative embodiment. The system 1600 uses data collected along multiple trips traveled by a vehicle, including, for example, speeding information, time of day information, and/or safety event information. An insurance company may use route data, such as Global Positioning Satellite ("GPS") latitude and longitude data, acceleration/deceleration data, speed data, and/or vehicle orientation data collected along a route traveled by the vehicle to determine an insurance premium discount to be associated with a driver and/or a vehicle. With a sufficient amount of data, the insurance company can calculate a level of risk score for the driver based on, for example, the driver's driving habits. The insurance company can use the score for setting or adjusting a discount value to be applied to an insurance premium. In some implementations, a score or discount is determined by a third-party data processing service. In addition, the score or discount may be set by an underwriter, which may be a part of the insurance company or otherwise affiliated with or in a third-party arrangement with the insurance company. According to any embodiments described here, a score might be used to determine a premium price, a premium adjustment, and/or any other benefit that may be associated with an insurance policy (e.g., a decreased deductible value or increased overall coverage amount).

The system 1600 includes one or more vehicles 1602, each having a smartphone 1604. The vehicle 1602 may be an automobile, motorcycle, truck, bus, watercraft, aircraft, or any other vehicle operated by a driver. A smartphone 1604 is coupled to a vehicle 1602 for collecting data about the vehicle's location, movements, or other information that can be used to determine risk scores. For vehicles with multiple drivers, the data may be associated with the vehicle itself or with the individual drivers. The smartphone 1604 may be positioned inside the vehicle 1602 or be directly coupled to the vehicle 1602. The smartphone 1604 is in communication with an insurance company system 1608 over a communication network 1650. The smartphone 1604 may communicate with the insurance company system 1608 though a wireless network such as a cellular network or using a wireless Internet connection. In general, the smartphone 1604 can be any computing device or plurality of computing devices in cooperation having a data collection sensor (e.g., an antenna or an accelerometer), a processor, a memory, and a means for transmitting the collected data. The customer vehicle 1602 or smartphone 1604 may include an antenna for receiving signals from Global Navigation Satellite System ("GNSS") satellites, numbered 16 through "n" in FIG. 16. In one implementation, the smartphone 1604 is also configured to process the collected data. In some embodiments, the data processing protects the driver's privacy by encrypting the data, removing location information, producing summary information, or taking other measures to reduce the likelihood that location information, speed information, or other sensitive information are received by the insurance company or third parties.

In some embodiments, rather than sending collected data directly to the insurance company system 1608, the smartphone 1604 sends collected data to a data processing service 1606, which processes the data to determine a risk score and/or an appropriate premium discount for a driver that is then sent to the insurance company system 1608. This can help protect a driver's privacy, since the insurance company does not get detailed data about a driver's location, but only receives summary information. Using a data processing service 1606 is in some implementations also preferable to having the smartphone 1604 process data to output a risk score because it reduces the processing power needed by smartphone 1604 and because using a third-party data processing service 1606 may also make it more difficult for drivers to tamper with the data. The data processing service 1606 can perform additional monitoring functions, such as vehicle security monitoring or providing location-based alerts (e.g., alerting a parent or employer when a vehicle travels an unusual path) and/or speed alerts. Note that an insurance company might receive detailed reports from the third-party data processing service 1606, summary reports (with certain details removed), and/or supplemented information (e.g., including information from one or more public databases).

The insurance company system 1608 includes a plurality of application servers 1612, a plurality of load balancing proxy servers 1614, an insurance company database 1616, a processing unit 1620, and company terminal 1622. These computing devices are connected by a local area network 1624.

The application servers 1612 are responsible for interacting with the smartphone 1604 and/or the data processing service 1606. The data exchange between the insurance company system 1608 and smartphone 1604 and/or data processing service 1606 can utilize push and pull technologies where the application servers 1612 of the insurance company system 1608 can act as both a server and client for pushing data to the data processing service 1606 (e.g., which vehicles to monitor, when to stop data collection, rules for monitoring services requested by the customer) and for pulling data from the data processing service 1606. The application servers 1612 or other servers of the insurance company system 1608 can request to receive periodic data feeds from the smartphone 1604 and/or data processing service 1606. The communication between the application servers 1612 and the data processing service 1606 can follow various known communication protocols, such as TCP/IP. Alternatively, the application servers 1612 and data processing service 1606 can communicate with each other wirelessly, e.g., via cellular communication, Wi-Fi, Wi-Max, or other wireless communications technologies or combination of wired or wireless channels. The load balancing proxy servers 1614 operate to distribute the load among application servers 1612.

The insurance company database 1616 stores information about vehicular insurance policies. For each insurance policy, the database 1616 includes for example and without limitation, the following data fields: policy coverage, a risk rating, policy limits, deductibles, the agent responsible for the sale or renewal, the date of purchase, dates of subsequent renewals, product and price of product sold, applicable automation services (for example, electronic billing, automatic electronic funds transfers, centralized customer service plan selections, etc.), customer information, customer payment history, smartphone 1604 information, or derivations thereof. Note that any of the embodiments described herein might be associated with existing insurance policies, newly issued insurance policies, and/or policies that have not yet been issued (e.g., during a trial phase before a policy is issued). According to some embodiments, information collected during a trial period may influence a discount or other benefit that is eventually associated with an insurance policy.

The processing unit 1620 is configured for determining the price of an insurance premium based on a risk rating for a driver or vehicle. The processing unit 1620 may comprise multiple separate processors, such as a risk or safety processor, which may calculate a safety rating from raw or processed data from the smartphone 1604 or data processing service 1606 over the communications network 1650; and a business logic processor, which determines a premium price for a policyholder based on, among other things, a risk score. In some embodiments, insurance premium prices or information for making insurance pricing determinations may be generated by a third-party underwriter, which is separate from the insurance company system 1608.

The company terminals 1622 provide various user interfaces to insurance company employees to interact with the processing system 1620. The interfaces include, without limitation, interfaces to review telematics data, or risk ratings; to retrieve data related to insurance policies; to manually adjust a risk rating; and to manually adjust premium pricing. In some instances, different users may be given different access privileges. For example, marketing employees may only be able to retrieve information on insurance policies but not make any changes to data. Such interfaces may be integrated into one or more websites for managing the insurance company system 1608 presented by the application servers 1612, or they may be integrated into thin or thick software clients or standalone software. The company terminals 1622 can be any computing devices suitable for carrying out the processes described above, including personal computers, laptop computers, tablet computers, smartphones, servers, and other computing devices.

The user terminal 1630 provides various user interfaces to customers to interact with the insurance company system 1608 over the communications network 1650. Potential customers can use user terminals 1630 to retrieve policy and pricing information for insurance policies offered by the insurance company. Customers can enter information pertaining to changes in their insurance policy, e.g., changes in policy coverage, addition or subtraction of drivers, addition or subtraction of vehicles, relocation, mileage information, etc. Customers can also use the user terminal 1630 for a pay-as-you-go insurance policy in which customers purchase insurance by the trip or mile.

In some embodiments, the smartphone 1604 may not be continually connected to the insurance company system 1608 via the network 1650. For example, the smartphone 1604 may be configured to temporarily store data if the smartphone 1604 becomes disconnected from the network, like when it travels out of range of cellular towers. When the connection is restored, the smartphone 1604 can then transmit the temporarily stored data to the insurance company system 1608. The smartphone 1604 may alternatively be configured to connect to the communications network 1650 through a user's home Wi-Fi network. In this case, the smartphone 1604 stores trip data until it returns to the vicinity of the user's home, connects to the user's wireless network, and sends the data. In some embodiments, the smartphone 1604 is not connected to the network 1650 at all, but rather, data collected is transmitted to the insurance company through other means. For example, a customer can receive a smartphone 1604 from the insurance company, couple the device 1604 to his car for a set period of time or number of miles, and then either mail the device 1604 with the collected data to the insurance company system 1608 or extract and send the collected data to the insurance company system 1608 via mail, email, or through a website.

Figure 17:
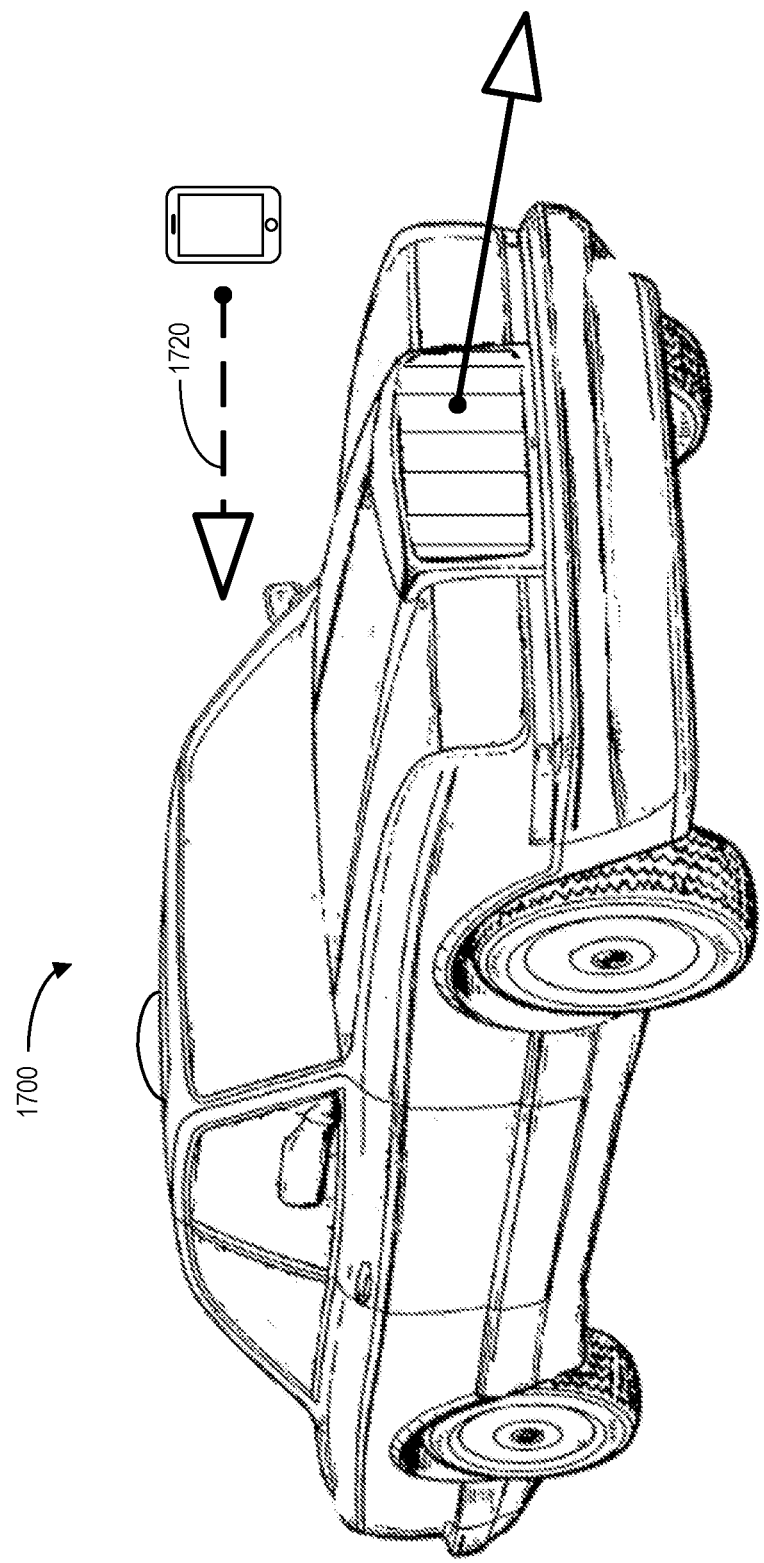
FIG. 17 illustrates an automobile in accordance with some embodiment of the invention.

The vehicle 1602 and smartphone 1604 may be associated with, for example, an automobile. For example, FIG. 17 illustrates an automobile 1700 in accordance with some embodiment of the invention. The automobile 1700 may be associated with a smartphone used to collect telematics information. Note that telematics information might instead be associated with, for example, a motorcycle, a recreational vehicle, a boat, an airplane, etc. According to some embodiments, the automobile (or other machine) is associated with a primary axis of movement (illustrated by a solid arrow in FIG. 17) and a prediction of whether or not a smartphone is associated with a driver or passenger is based at least in part on movement of the mobile personal communication device relative to the primary axis of movement prior to operation of the machine. For example, as illustrated by the dashed arrow in FIG. 17, it might be determined if the smartphone (and presumably the person carrying the smartphone) entered the vehicle via the driver's side car door or the passenger's side car door (e.g., based on the direction of movement of the smartphone immediately before driving began). According to another embodiment, automobile 1700 or machine is associated with a primary direction of movement and the prediction is based at least in part on a location of the mobile personal communication device relative to the primary direction of movement during operation of the machine.

Figure 18:
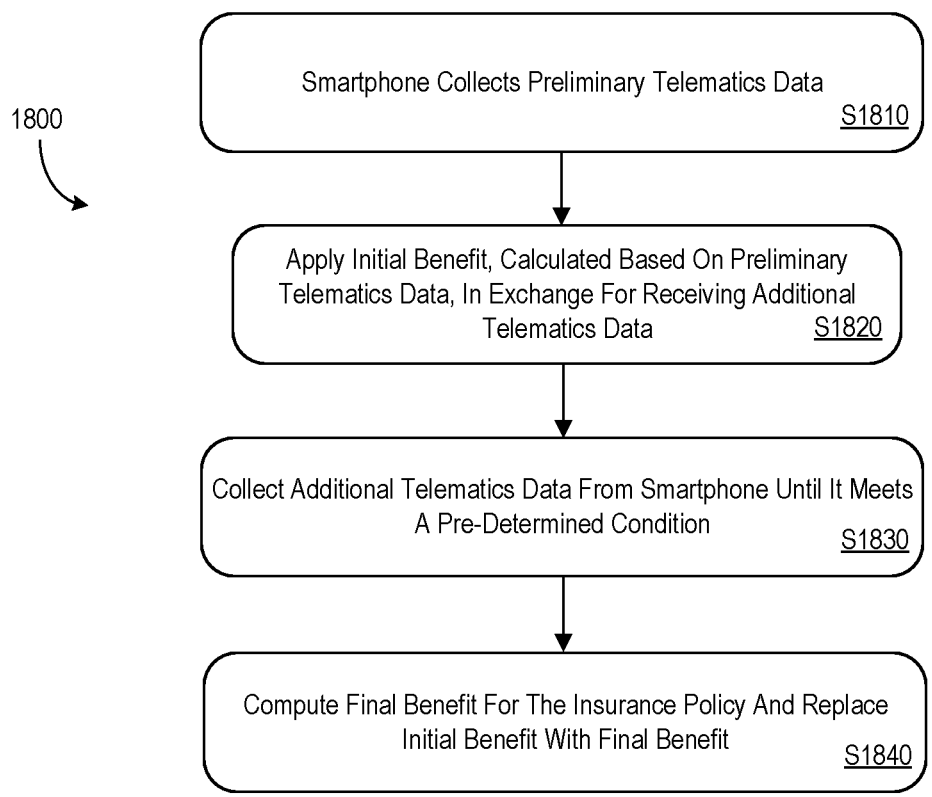
FIG. 18 is a flowchart of a method according to an illustrative embodiment of the invention.

FIG. 18 is a flowchart of a method 1800 for determining an insurance policy benefit for a driver or vehicle based on telematics data. The method 1800 can be performed by the smartphone 1604, the data processing service 1606, the insurance company system 1608, or any combination of these. The method 1800 includes the step of collecting preliminary telematics data via a smartphone associated with a driver of a vehicle (S1810). For example, a smartphone application might determine and/or collect time of day information associated with driving, day of week, location, velocity, and/or mileage information.

An initial benefit is calculated based on the preliminary telematics data and a policy is issued in accordance with that benefit in exchange for receiving data indicative of actual telematics data (S1820). For example, an insurance company may offer a driver a 5% initial discount to his or her insurance premium if he or she agrees to participate in a telematics program. Another driver, associated with preliminary telematics data (collected by a smartphone) indicating a potentially higher level or risk might only be offered a 3% initial premium discount. Other examples of policy benefits include a monetary discount (e.g., 100 dollars), an insurance coverage amount, and/or a deductible amount. If the driver agrees, the insurance company may provide the driver with an application to be installed in his or her smartphone. The calculated initial benefit may, according to some embodiments, encourage drivers to participate in the telematics program. The method 1800 may further include the storage of actual telematics data received from the smartphone. To supplement the telematics data, embodiments might utilize data from receivers and sensors such as a GNSS receiver, an accelerometer, a vehicle computer, and/or vehicle telematics sensors.

It may then be determined that the data indicative of the actual telematics data meets a pre-determined condition (S1830). For example, an insurance company might determine that actual telematics data has been collected from a driver for three consecutive months or 2,000 miles. After the pre-determined condition has been met, a final benefit for the insurance policy may be computed based on the telematics data; and the initial discount may be replaced with the final discount (S1840). For example, based on actual telematics data it may be determined that the driver should actually receive a 16% discount. In this case, the initial 5% discount would be replaced by the 16% discount for the insurance policy. According to some embodiments, an indication of the final benefit for the insurance policy may be output (e.g., shown on a display or included in an email message to the driver).

According to some embodiments, prior to computing the final benefit, a range of potential benefits may be computed based on at least a portion of the actual telematics data. For example, consider a program where a final discount is not calculated until three months of telematics data has been collected. In this case, after two months of telematics data has been collected, a likely range of potential insurance discounts might be predicted and output to the driver. For example, a driver might be told that based on his or her driving habits during those two months, a discount of between 8% and 12% should be expected.

The telematics data used to compute a final discount or other insurance policy benefit might include, for example, times of day associated with driving, velocities associated with driving, distances associated with driving, weather information, and/or traffic information. Moreover, the insurance company might identify safety events within the telematics data (e.g., hard brake events) and/or a severity estimation of the safety events. Moreover, according to some embodiments an insurance platform might output an indication of a suggested driving modification along with a discount or other benefit goal for the insurance premium of the automobile insurance policy. For example, the driving modification might include a suggested route to a destination to achieve a 15% discount for an insurance premium.

Figure 19:
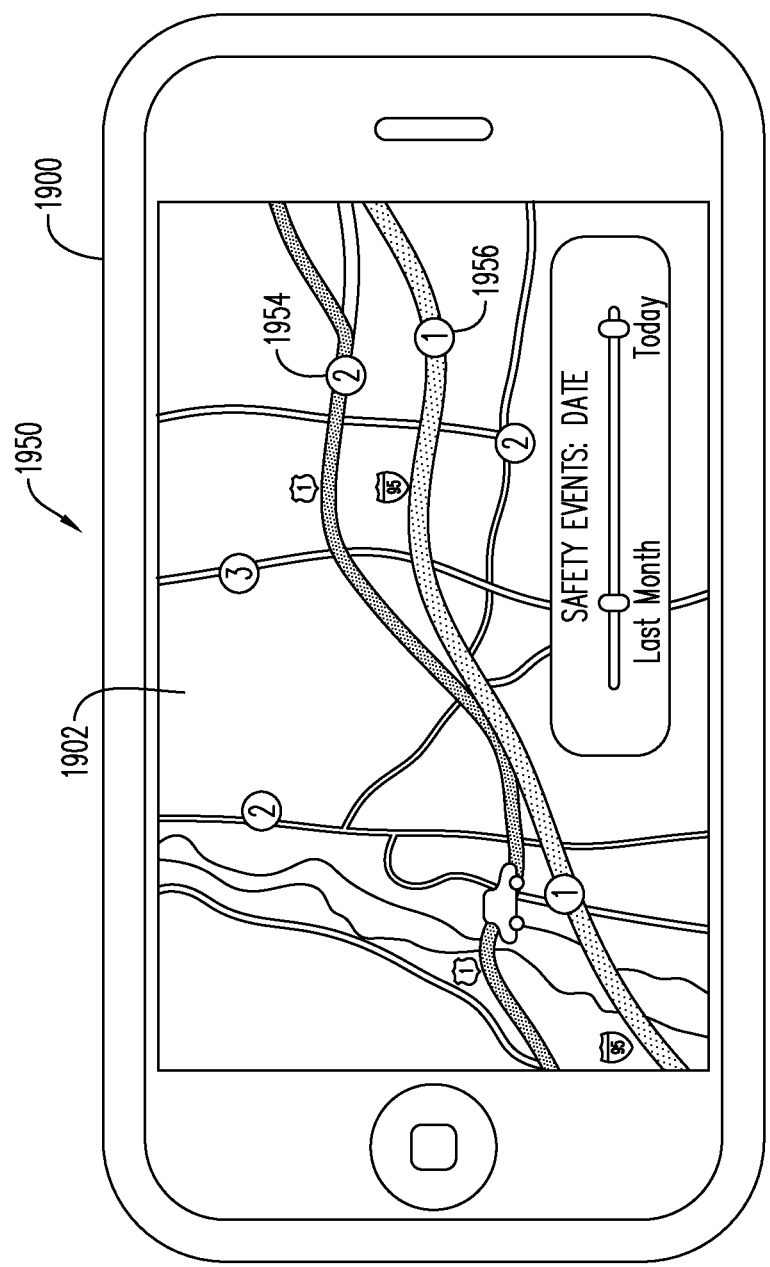
FIGS. 19 and 20 illustrate map displays in accordance with some embodiments described herein.

Note that driving habits and conditions may change over time. Thus, according to some embodiments a driver may interact with a map display to view safety events associated with a selected range of dates and/or times. For example, referring now to FIG. 19, a diagram 1950 depicting another user interface 1902 is shown. The user interface 1902 may be displayed on device 1900 such as a mobile telephone and may depict a portion of a map. The user interface 1902 may display to a driver the location of safety events 1954, 1956 (e.g., locations of rapid de-acceleration) that occurred during a particular period of time (e.g., during the prior 24 hours, the prior week, the prior month, the prior year, etc.). Note that the safety events 1954, 1956 might be associated with the driver's own driving habits or may reflect those of all drivers who have provided telematics data. According to some embodiments, a driver may interact with a "sliding scale" bar to select which period of time should be used to filter the safety events 1954, 1956. Note that the identified safety events 1954, 1956 may associated with a plurality of different event types. For example, safety events 1954, 1956 might be associated with both hard braking events and excessive speeding. In this case, different labels (e.g., reflecting event types "1," "2," or "3" as illustrated in FIG. 19), icons, or colors may be used to differentiate event types. Similarly, the safety events 1954, 1956 may be associated with different levels of risk or severity (e.g., high, medium, and low intensity events) and these may also be differentiated on the user interface 1902.

Figure 20:
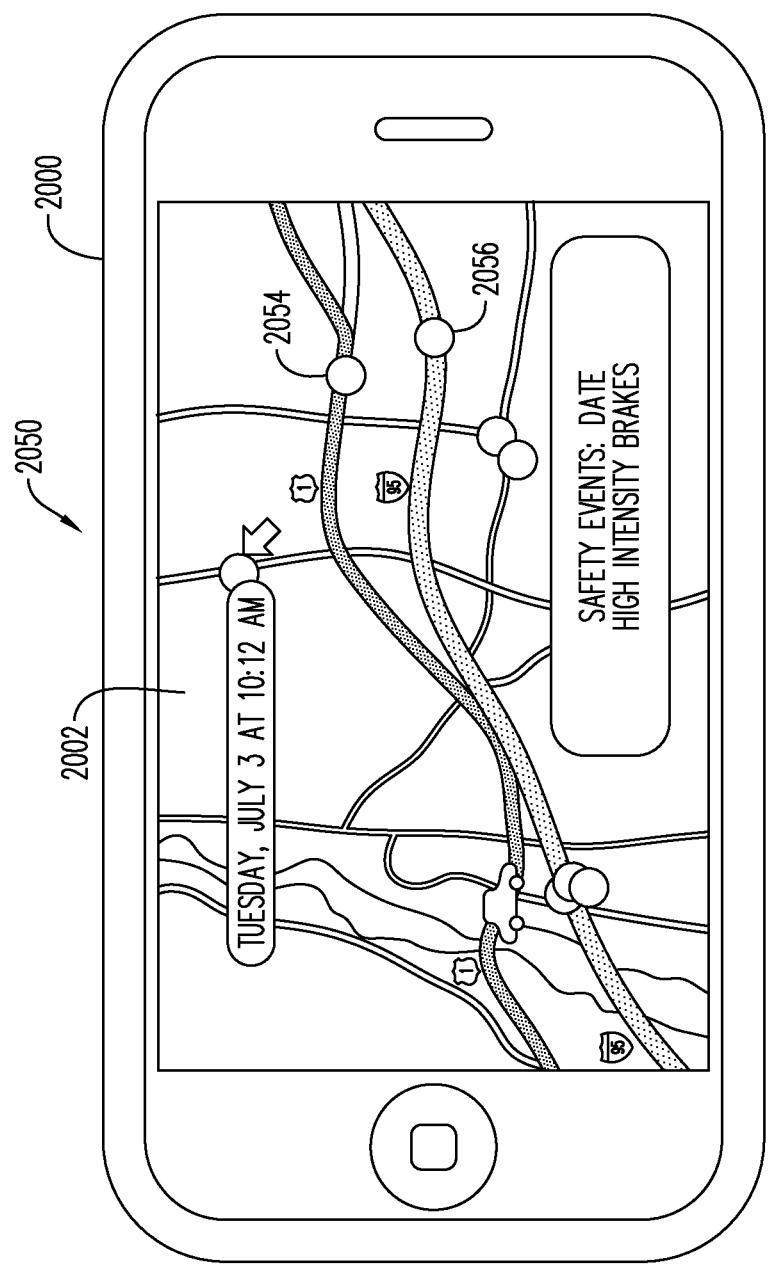

In some cases, a driver might be interested in a particular type of safety event. According to some embodiments, a selection of a particular event type may be received from the driver and only indications of the safety events associated with that particular event type may be displayed to the driver on the map display (e.g., only hard brake events). For example, referring now to FIG. 20, a diagram 2050 depicting another user interface 2002 is shown. As before, the user interface 2002 may be displayed on device 2000 such as a mobile telephone and may depict a portion of a map. The user interface 2002 may display to a driver the location of safety events 2054, 2056 (e.g., locations of rapid de-acceleration) that are of particular interest to the driver. In the example of FIG. 20, the driver has selected to view all high intensity brake events. Note that the safety events 2054, 2056 might be associated with the driver's own driving habits or may reflect those of all drivers who have provided telematics data. Moreover, selection of a particular event icon might result in the display of further details about that particular event (e.g., the date and time the event occurred). In addition to, or instead of, filtering safety events based on event type or severity, a driver might be able to display events associated with a particular type of driver or vehicle (e.g., based on age, driving experience, gender, etc.).

Figure 21:
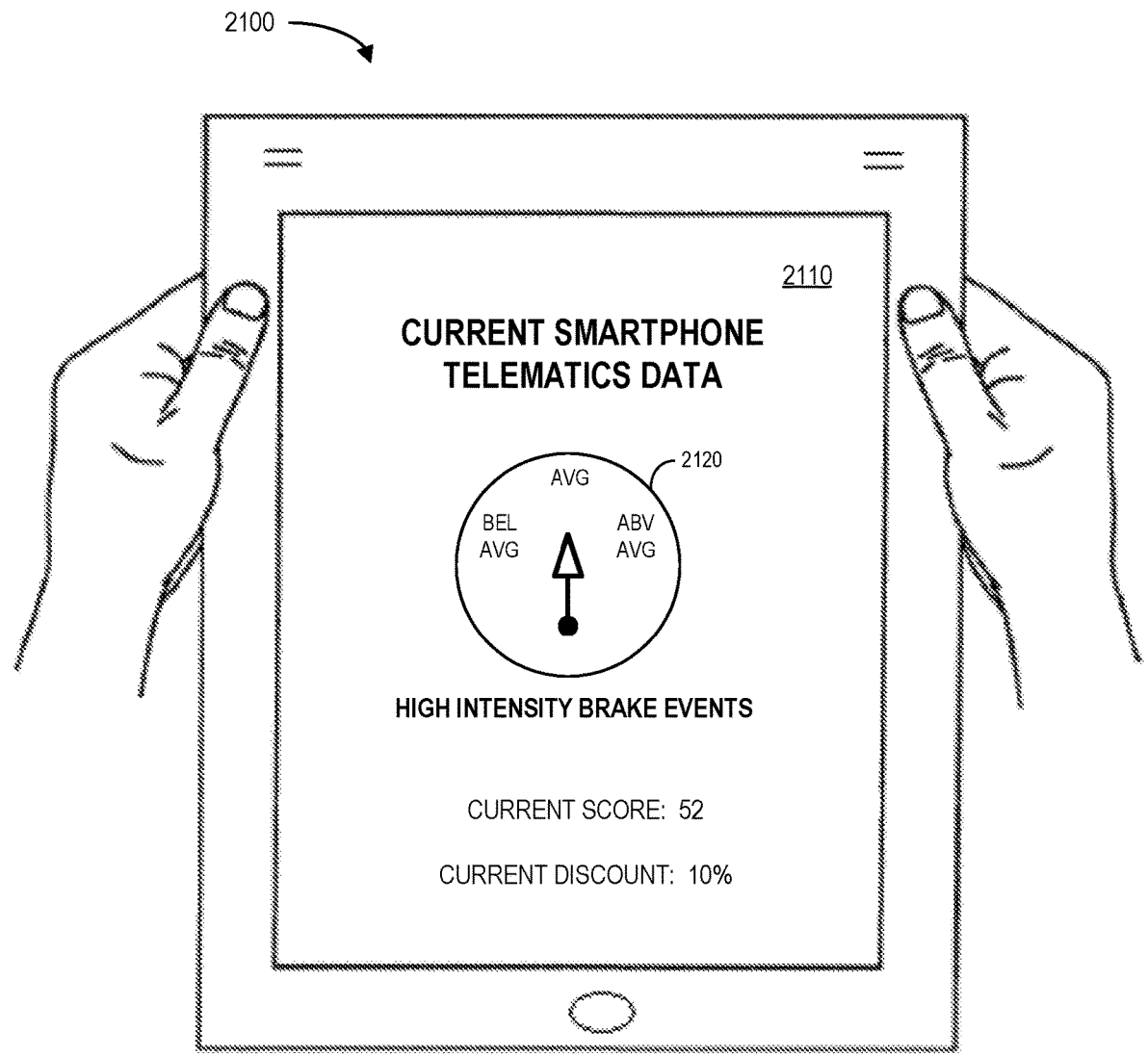
FIGS. 21 and 22 illustrate current telematics displays according to some embodiments.

In addition to the locations where safety events occurred, a driver might be interested in his or her overall performance in connection with one or more types of safety events and/or how that performance compares to others, how that performance is modifying his or her current insurance premium discount, etc. FIG. 21 illustrates a current telematics display 2100 according to some embodiments. In particular, the display 2100 includes a graphical representation 2110 of information about a particular risk variable derived from smartphone telematics data which may be categorized as "below average," "average," or "above average" from a risk perspective. The display 2100 also includes a current score (e.g., calculated at least in part based on the risk variable) and a current discount (e.g., determined based on the current score). Note that the graphical representation 2110 might instead be a sliding scale, letter grade ("B+"), or any other type of indication. In addition to, or instead of, a current number of events per week, a driver might be shown an average number of events for all drivers or for a particular type of driver or vehicle (e.g., based on age, driving experience, gender, etc.).

Figure 22:
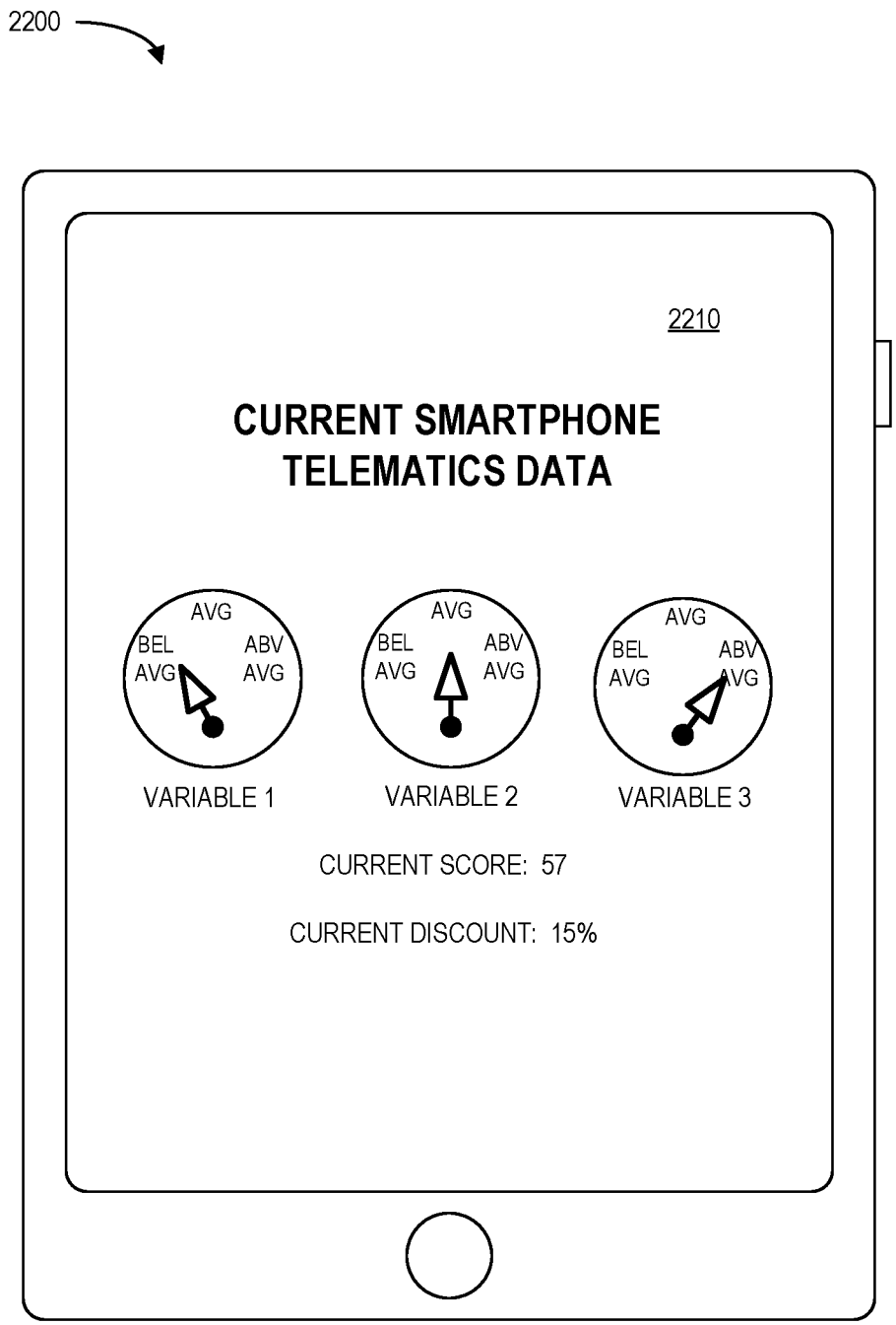

FIG. 22 illustrates another current telematics display 2200 according to some embodiments. In particular, the display 2200 includes a graphical representation 2210 of information about three different risk variables derived from telematics data, a current score (e.g., calculated based on the risk variables) and a current discount or other policy benefit (e.g., determined based on the current score). The current discount might, according to some embodiments, represent the final discount. According to some embodiments, the current discount might be calculated in substantially real time or be recalculated using new data when the driver's safety scores are more likely change, e.g., if the customer moves, changes jobs, has a child, or retires, or at certain time periods, e.g., every year, every two years, every three years, every five years, every ten years, etc. In some embodiments, both prospective pricing and retroactive pricing are used. For example, a customer being continually monitored might receive a premium discount for a time period based on one or more past safety scores, and if the customer's actual score rating for the time period was greater than or less than the expected rating, an adjustment may be applied as appropriate.

By way of example only, a score model might consist of two main elements: (1) a percentage of time speeding over a threshold value (e.g., 75 miles per hour) and (2) an annualized miles value associated with times of day. Each driver's score might, for example, start with fifteen (15)

points then be modified by adding speeding points and/or subtracting time of day mileage by the factors shown below:

For Time of Day:

| Risk Level | Per Mile Subtraction |
|---|---|
| Risky | 0.005 |
| Moderate | 0.0025 |
| Low | 0.00125 |

Where "risky" is defined as driving between midnight and 4:00 am every day of the week, "moderate" is driving from 4:00 am to 6:00 am and 9:00 pm to midnight every day of the week and 6:00 am to 9:00 am and 3:00 pm to 6:00 pm on weekdays. "Low" risk times may comprise all other times of the day.

For Speeding over a Threshold:

| % Time | Speeding Points |
|---|---|
| >0.75% | 0 |
| 0.1-0.75% | 5 |
| <0.1% | 10 |

In such an example, consider a driver who drives 5,000 annualized miles. Moreover, 4,000 of these miles are driven during moderate risk times of the day and 1,000 of these miles are driven during low risk times of the day. Moreover, the driver speeds over the threshold 0.05% of the time. In this case, a safety score might be determined as follows: Safety Score=15+10−(4,000*0.0025+1,000*0.00125)= 13.75. Rounding this to the nearest whole number and looking it up in a risk/discount table, the driver might receive a 14% discount for his or her insurance premium.

As another example, aggressive driving/hard braking events might be classified into different intensity or severity levels. For example, a type 1 event might have a threshold of from 340 to 500 milli-g (~change in speed or velocity (Δ) of greater than +/−7.5 mph/sec$^2$) (e.g., from 14 mph to 25 mph in 1 second). A type 2 event might have a threshold of from 501 to 750 milli-g (~change in speed or velocity (Δ) of greater than +/−11 mph/sec$^2$) (e.g., from 65 mph to 45 mph in 1 second). A type 3 event might have a threshold of 750 milli-g (~change in speed or velocity (Δ) of greater than +/−16.5 mph/sec$^2$) (e.g., from 65 mph to 35 mph in 1 second). The severity of the event may then be used when determining an insurance premium discount of the driver.

Figure 23:
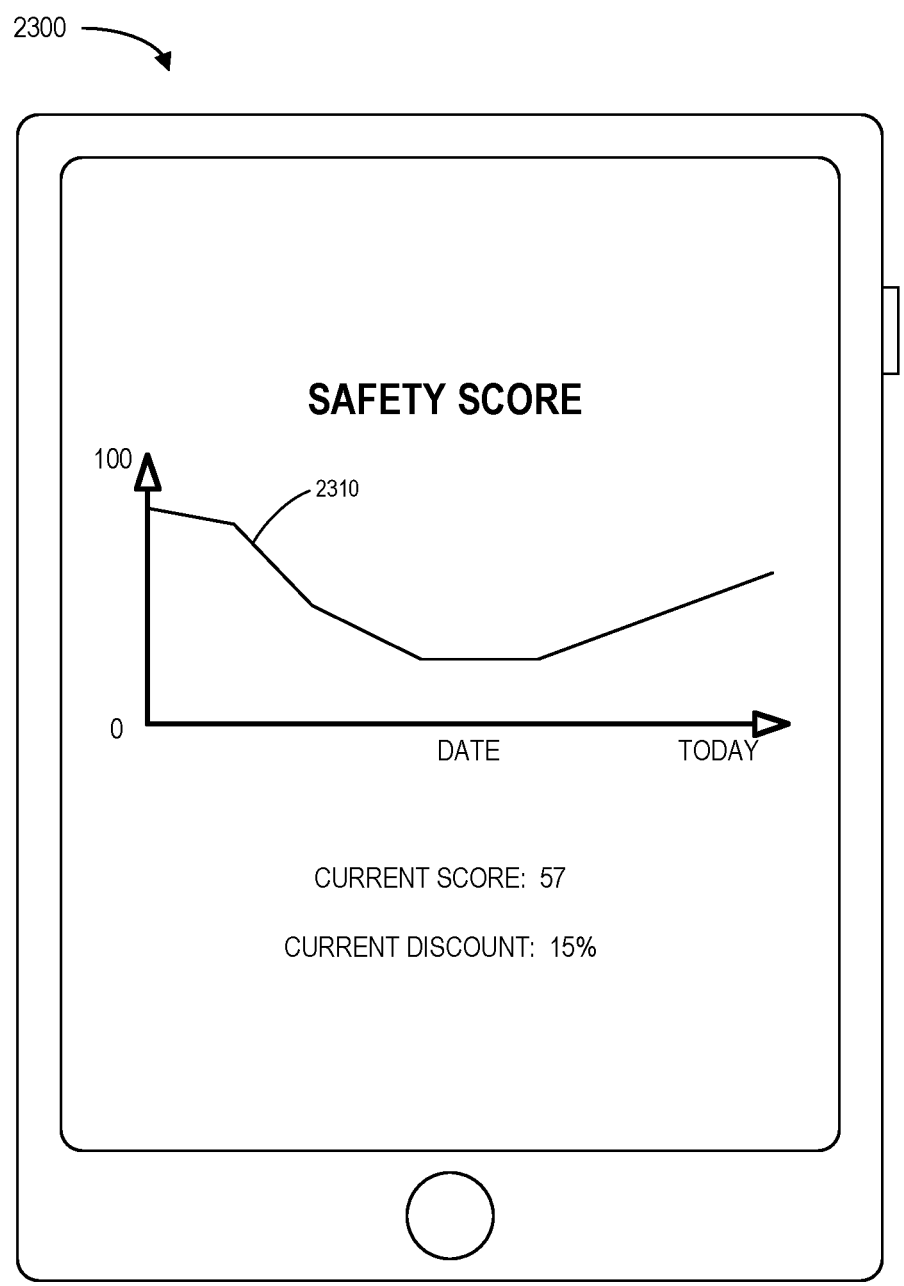
FIG. 23 illustrates a safety score display according to some embodiments.

Note that a driver's safety score will change over time based on his or her driving habits. FIG. 23 is an example of a safety score display 2300 that might be provided to a driver according to some embodiments. In particular, the display 2300 includes a graph 2310 showing the drivers safety score over a particular period of time (e.g., over the last month or year). According to some embodiments, a driver may select the period of time depicted on the graph 2310. Such a safety score display 2300 may encourage a driver to improve his or her safety score and become a less risky driver.

Figure 24:
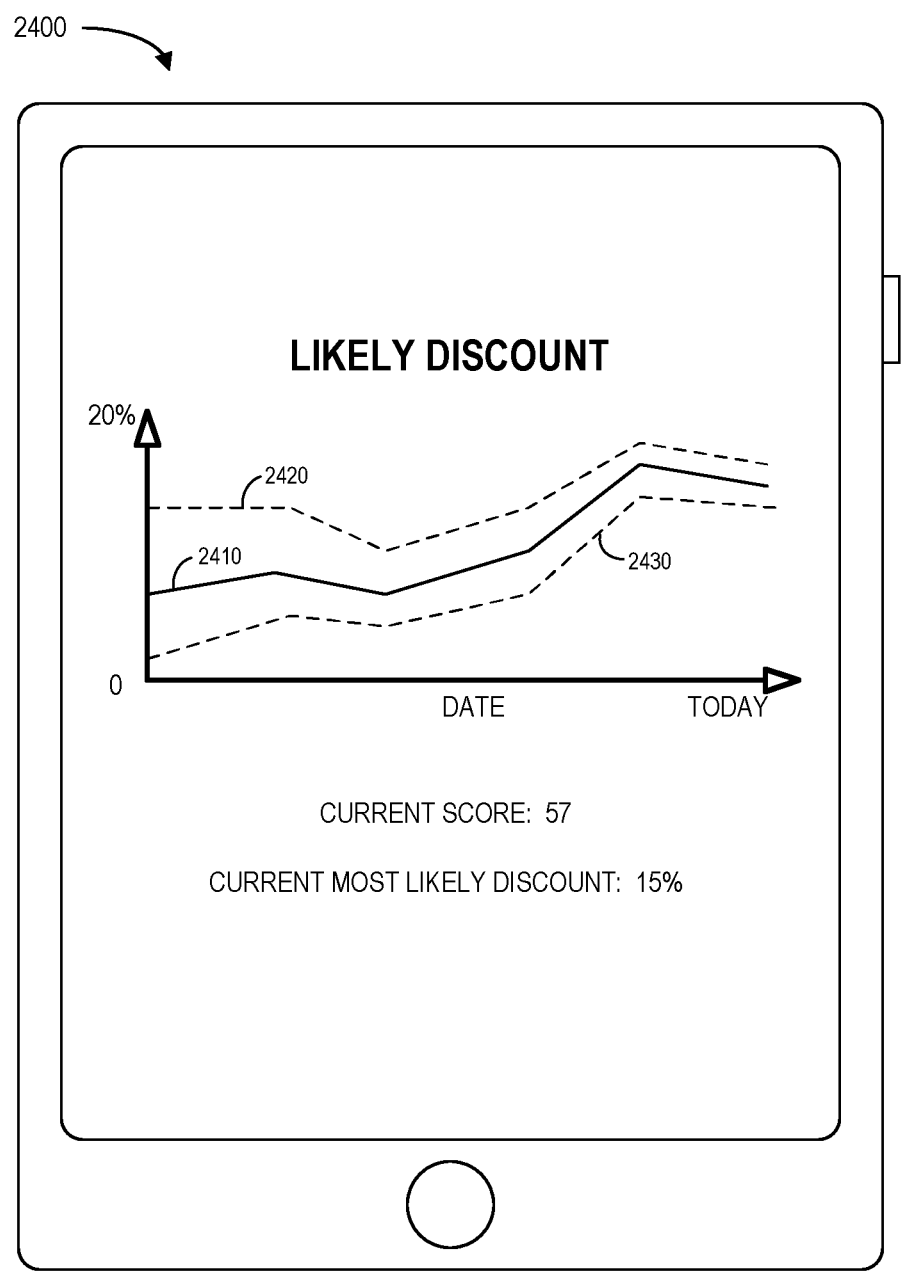
FIG. 24 illustrates a likely discount display according to some embodiments.

An insurance premium discount or other benefit may be based at least in part on telematics data, a driver's safety score, and/or safety events that occur over time. According to some embodiments, a final discount value may not be determined until telematics data has been collected for a predetermined period of time and/or a predetermined number of miles. Even before the final discount value is determined, a likely discount value might be calculated based on a driver's known driving habits. For example, during a trial or initial period, a likely discount value might be calculated based on safety events that have occurred during the trial period. FIG. 24 illustrates a likely discount display 2400 according to some embodiments. In particular, the display 2400 includes a current most likely discount 2410 calculated based on the existing telematics data that has been collected for that driver. Moreover, an upper likely discount 2420 and lower likely discount 2430 may also be displayed (e.g., there might be a 90% chance that the driver's final discount will not exceed the upper likely discount 2420). Note that as more telematics data is collected over time, the upper and lower likely discounts 2420, 2430 might converge until, at the end of a trial period, the final premium discount is actually computed for the driver.

Figure 25:
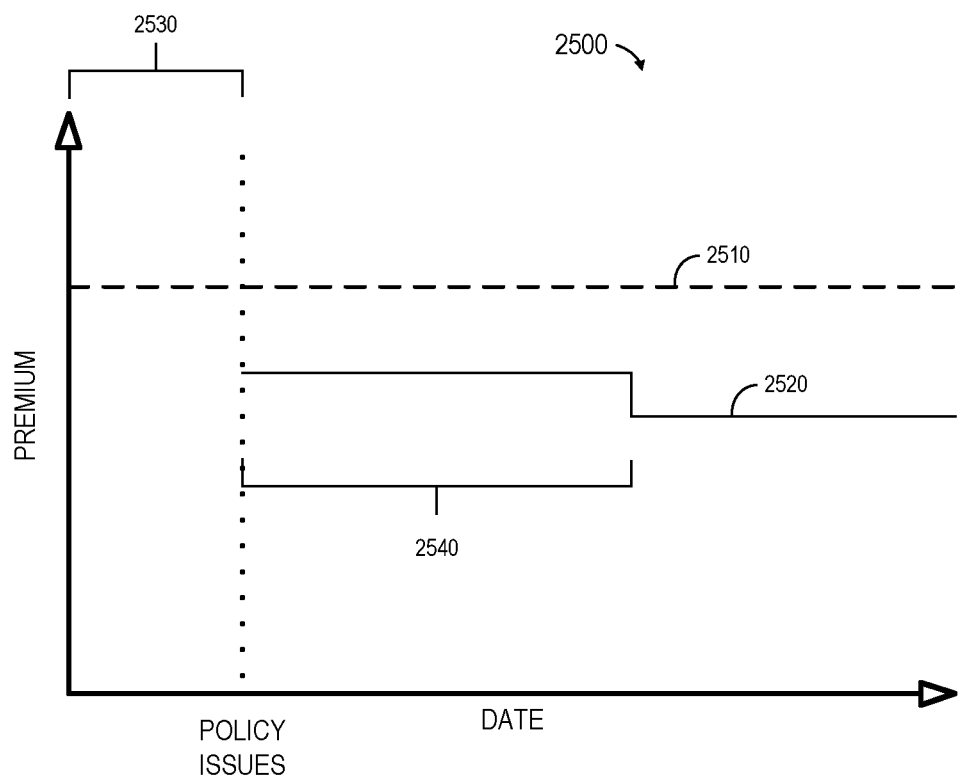
FIG. 25 illustrates how an insurance premium might change over time according to some embodiments.

According to some embodiments, an initial insurance policy benefit might be calculated based on preliminary telematics data collected by a smartphone and be provided to a driver while actual telematics data is collected. FIG. 25 is an illustration 2500 of how an insurance premium might change over time according to some embodiments. A baseline insurance premium associated with what a driver would pay if he or she did not participate in a telematics program is represented by a dashed line 2510 in FIG. 25 along with a solid line 2520 representing his or her actual premiums that begin on the date the insurance policy is issued (represented by a dotted line in FIG. 25). During a period 2530 prior to issuance of the insurance policy, preliminary telematics data is collected by a driver's smartphone. After the policy is issued and the driver agrees to participate in the program, actual telematics data is collected 2540 (e.g., by a smartphone application provided by the insurance company) until a pre-determined condition is met (e.g., three months of actual telematics data has been collected). During this time 2540, the driver's insurance premium is reduced by an initial discount amount that is calculated based at least in part on the preliminary telematics data collected by the driver's smartphone during time 2530. After the pre-determined condition is met, a final discount amount is determined and applied to his or her insurance premium (and the final amount might be more or less than the initial discount depending on his or her driving habits as reflected by the actual telematics data).

Figure 26:
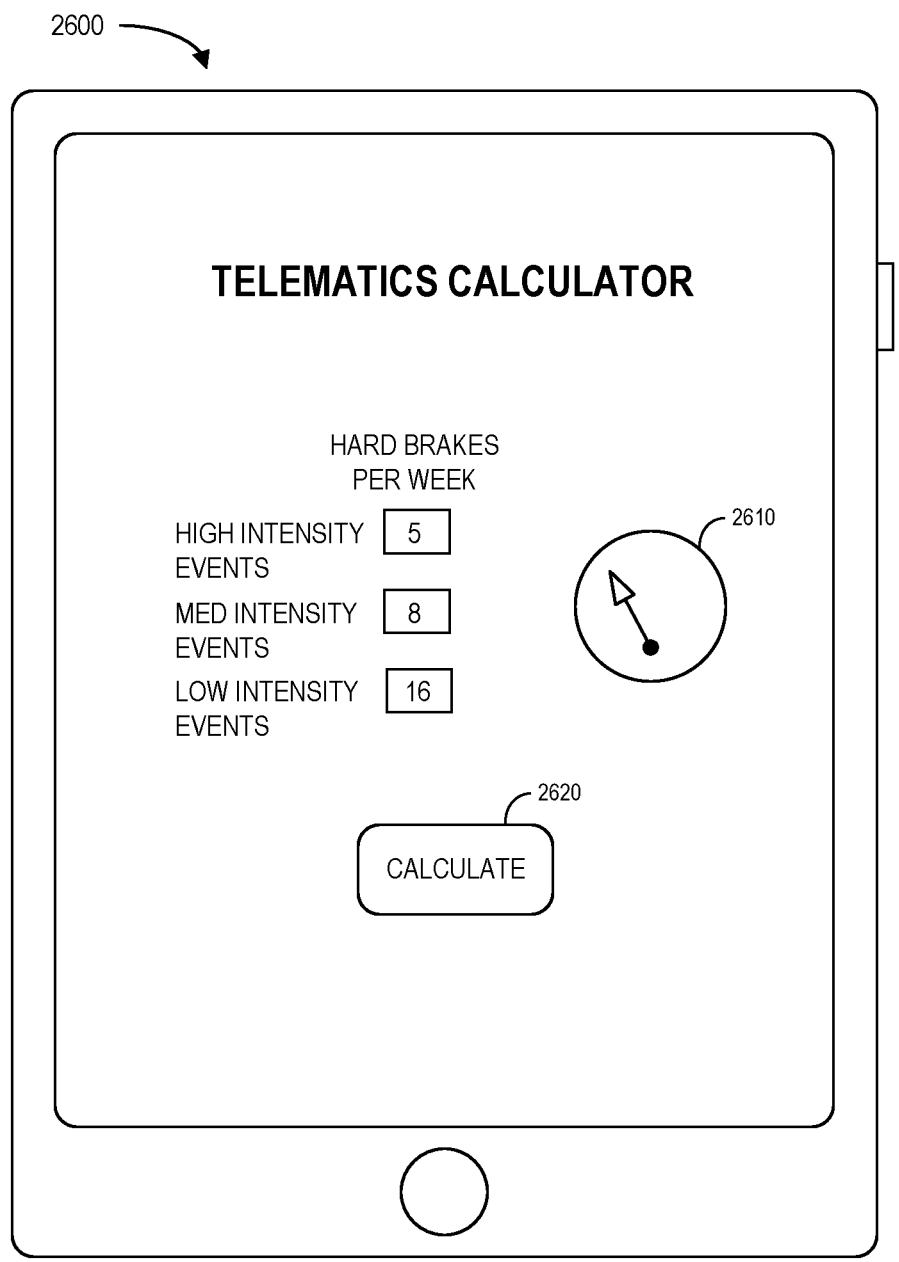
FIGS. 26 and 27 are examples of insurance discount calculator displays in accordance with some embodiments described herein.

It may be difficult for a driver to predict or understand exactly how his or her driving habits will adjust a safety score or premium discount value. According to some embodiments, a telematics calculator may be provided for a driver to reduce this problem. For example, FIG. 26 is a telematics calculator 2600 where a driver can predict safety events of various severity or intensity levels. In the example of FIG. 26, a driver predicts how many "high," "medium," and "low" intensity hard brake events will occur each week. According to other embodiments, a graphical representation 2610 may be used to reflect the entered information and/or may be used instead by the driver to enter information (e.g., by rotating a gauge or dial). Based on this information, the calculator 2600 may generate and display a predicted score and/or discount value.

Figure 27:
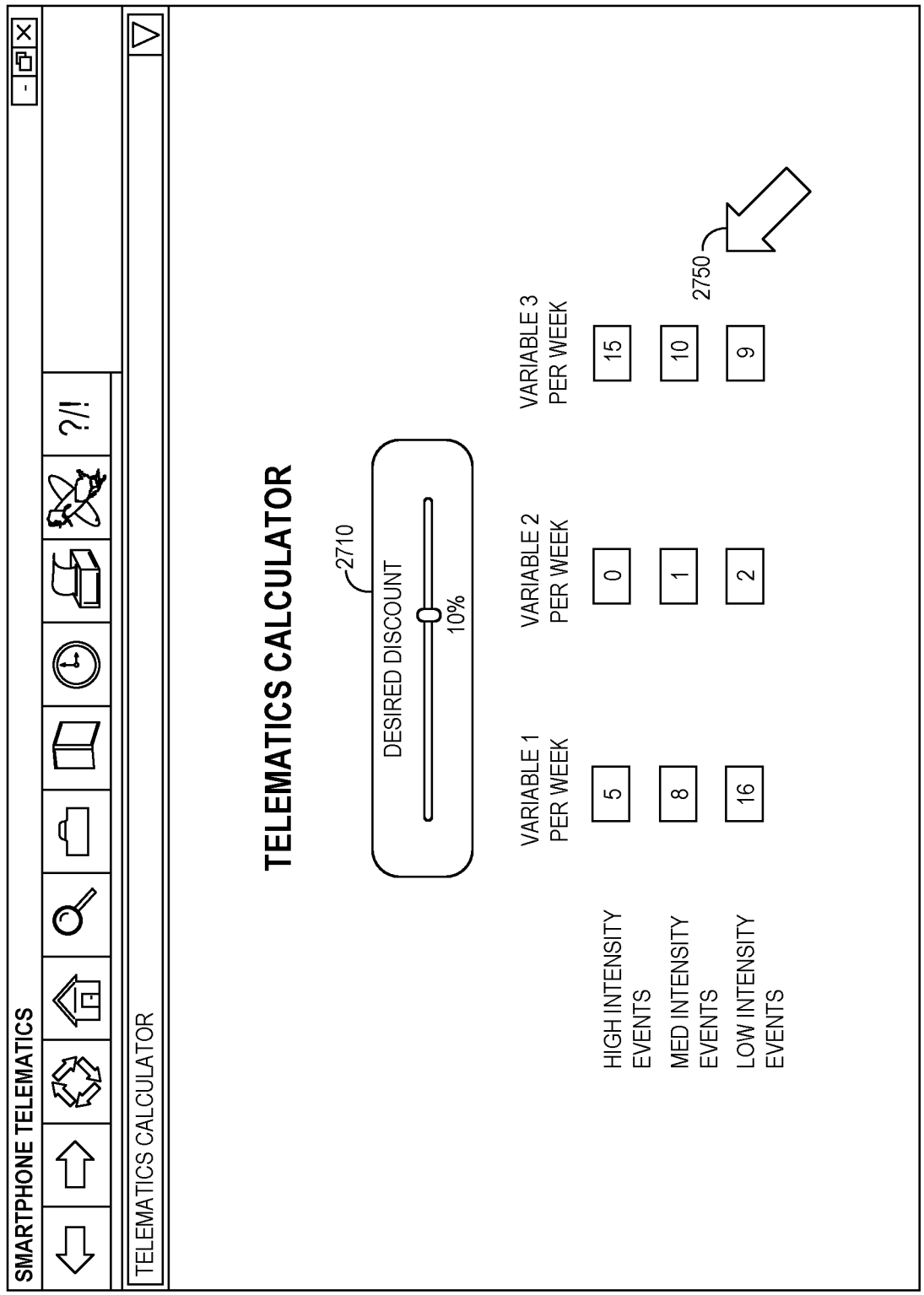

According to other embodiments, a driver might enter a desired score or premium discount value. For example, FIG. 27 is an example of an insurance discount calculator 2700 in accordance with some embodiments described herein. The calculator 2700 may receive from a driver a desired premium discount via a sliding scale 2710 movable via computer mouse pointer 2750 (e.g., in the example of FIG. 27 the driver is interested in receiving a 10% discount). Based on the desired discount, the calculator 2700 generates a number of safety events for various types of events and/or various levels of severity. For example, the calculator 2700 might indicate that 5 high intensity hard brake events should be experienced per week in order for the driver to receive a 10% discount. The calculator 2700 may be, for example, associated with a web page, a smartphone application, and/or a kiosk and may encourage drivers to adopt less risky driving habits.

Figure 28:
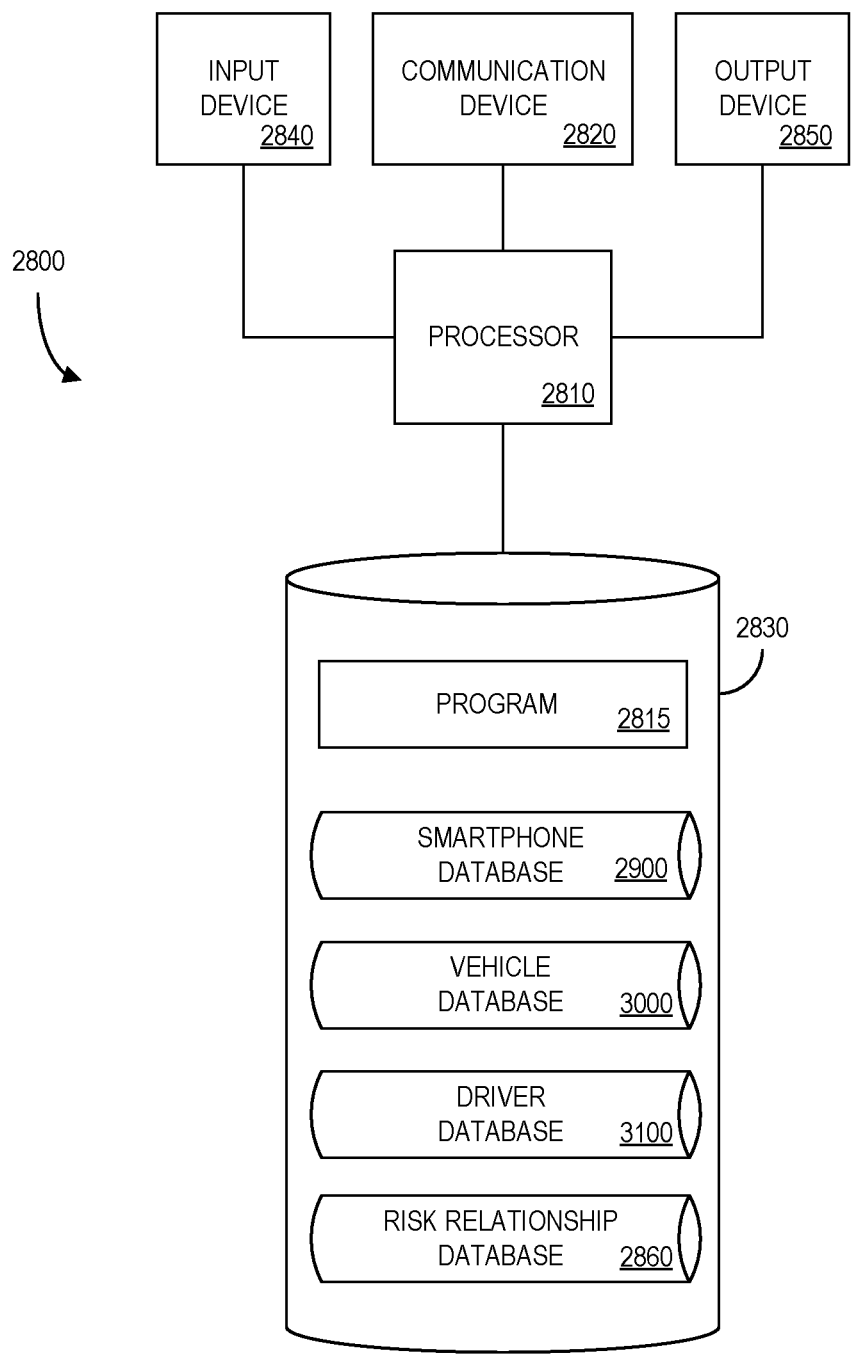
FIG. 28 is a block diagram of an apparatus in accordance with some embodiments of the present invention.

The embodiments described herein may be implemented using any number of different hardware configurations. For example, FIG. 28 illustrates an apparatus 2800 that may be, for example, associated with system that utilizes telematics data collected via a smartphone associated with a machine. The apparatus 2800 comprises a processor 2810, such as one or more commercially available Central Processing Units ("CPUs") in the form of one-chip microprocessors, coupled to a communication device 2820 configured to communicate via a communication network (not shown in FIG. 28). The communication device 2820 may be used to communicate, for example, with one or more remote administrator computers and or communication devices (e.g., PCs and smartphones). Note that communications exchanged via the communication device 2820 may utilize security features, such as those between a public internet user and an internal network of the insurance enterprise. The security features might be associated with, for example, web servers, firewalls, and/or PCI infrastructure. The apparatus 2800 further includes an input device 2840 (e.g., a mouse and/or keyboard to enter information about pre-determined driver prediction rules to automatically and dynamically adjust a data input flow, etc.) and an output device 2850 (e.g., to output reports regarding insurance premium discounts).

The processor 2810 also communicates with a storage device 2830. The storage device 2830 may comprise any appropriate information storage device, including combinations of magnetic storage devices (e.g., a hard disk drive), optical storage devices, mobile telephones, and/or semiconductor memory devices. The storage device 2830 stores a program 2815 and/or a smartphone telematics tool or application for controlling the processor 2810. The processor 2810 performs instructions of the program 2815, and thereby operates in accordance with any of the embodiments described herein. For example, the processor 2810 may monitor operation of a machine and provide feedback to maintain use within certain parameters. Mobile personal communication device sensors may each be configured to monitor at least one machine parameter (speed, acceleration, location, etc.), generate a signal encapsulating the monitored machine parameter, and transmit the generated sensor signals to a control unit of the communication device. The control unit may receive the generated sensor signals, store the received signals, and selectively combine the received signals. The communication device also includes a transmitter coupled to the control unit capable of transmitting the combined signal. The processor 2810 may then determine a current machine condition and compare that condition to received conditions from other machines. Feedback may then be provided to adjust operation of the machine based on the comparison. For example, an operator interface may provide audio and/or visual feedback to the operator of a vehicle.

The program 2815 may be stored in a compressed, uncompiled and/or encrypted format. The program 2815 may furthermore include other program elements, such as an operating system, a database management system, and/or device drivers used by the processor 2810 to interface with peripheral devices.

As used herein, information may be "received" by or "transmitted" to, for example: (i) the back-end application computer server 2800 from another device; or (ii) a software application or module within the back-end application computer server 2800 from another software application, module, or any other source.

In some embodiments (such as shown in FIG. 28), the storage device 2830 further stores a smartphone database 2900, a vehicle database 3000, a driver database 3100, and a risk relationship database 2860 (e.g., storing information about insurance policies). Examples of databases that might be used in connection with the apparatus 2800 will now be described in detail with respect to FIGS. 29 through 31. Note that the databases described herein are only examples, and additional and/or different information may be stored therein. Moreover, various databases might be split or combined in accordance with any of the embodiments described herein. For example, the vehicle data database 3000 and driver database 3100 might be combined and/or linked to each other within the program 2815.

Referring to FIG. 29, a table is shown that represents the smartphone database 2900 that may be stored at the apparatus 2900 according to some embodiments. The table may include, for example, entries associated with smartphones that collect telematics data. The table may also define fields 2902, 2904, 2906, 2908, 2910 for each of the entries. The fields 2902, 2904, 2906, 2908, 2910 may, according to some embodiments, specify: a vehicle identifier 2902, a customer name and policy number 2904, a date and time 2906, a smartphone identifier 2908, and a vehicle speed 2910. The smartphone database 2900 may be created and updated, for example, based on information electrically received from various computer systems, including those associated with insurance provider.

The vehicle identifier 2902 may be, for example, a unique alphanumeric code identifying a vehicle (e.g., an automobile to be insured). The customer name and policy number 2904 may identify, for example, an owner of the vehicle and insurance policy number. The date and time 2906 might indicate when the entry was updated and the smartphone identifier 2908 might indicate the mobile personal communication device that sensed and provided telematics data. For example, the vehicle speed 2910 might indicate telematics data sensed and reported by a smartphone in connection with operation of an insured vehicle (or a vehicle potentially to be insured).

Referring to FIG. 30, a table is shown that represents the vehicle database 3000 that may be stored at the apparatus 3000 according to some embodiments. The table may include, for example, entries associated with smartphones that collect telematics data. The table may also define fields 3002, 3004, 3006, 3008, 3010 for each of the entries. The fields 3002, 3004, 3006, 3008, 3010 may, according to some embodiments, specify: a vehicle identifier 3002, a customer name and policy number 3004, a manufacturer and model 3006, safety feature 1 3008, and safety feature N3010. The vehicle database 3000 may be created and updated, for example, based on information electrically received from various computer systems, including those associated with insurance provider.

The vehicle identifier 3002 may be, for example, a unique alphanumeric code identifying a vehicle (e.g., an automobile to be insured) and may be based on or associated with the vehicle identifier 2902 in the smartphone database 2900. The customer name and policy number 3004 may indicate an owner or driver of the vehicle and the manufacturer and model 3006 may describe the vehicle. The vehicle database

3000 may store information about safety features of the vehicle including, for example, safety feature 1 3008 through safety feature N 3010 (e.g., anti-lock brakes, adaptive headlights, tire pressure sensors, etc.).

Figure 31:
FIG. 31 is a portion of a tabular driver database according to some embodiments.

Referring to FIG. 31, a table is shown that represents the driver database 3100 that may be stored at the apparatus 3100 according to some embodiments. The table may include, for example, entries associated with smartphones that collect telematics data. The table may also define fields 3102, 3104, 3106, 3108, 3110 for each of the entries. The fields 3102, 3104, 3106, 3108, 3110 may, according to some embodiments, specify: a driver identifier 3102, a machine learning algorithm 3104, distracted driving 3106, a smartphone identifier 3108, and a driver rating 3110. The driver database 3100 may be created and updated, for example, based on information electrically received from various computer systems, including those associated with insurance provider.

The driver identifier 3102 may be, for example, a unique alphanumeric code identifying a person predicted to be operating a vehicle, and the machine learning algorithm 3104 might identify how that prediction was made. The distracted driving 3106 might indicate, for example, that the driver was texting, participating in a telephone call, etc. The smartphone identifier 3108 might indicate a personal mobile communication device that is reporting telematics data, and the driver rating 3110 might indicate a level of risk associated with the operator of the vehicle (based on telematics data received from the smartphone).

Figure 32:
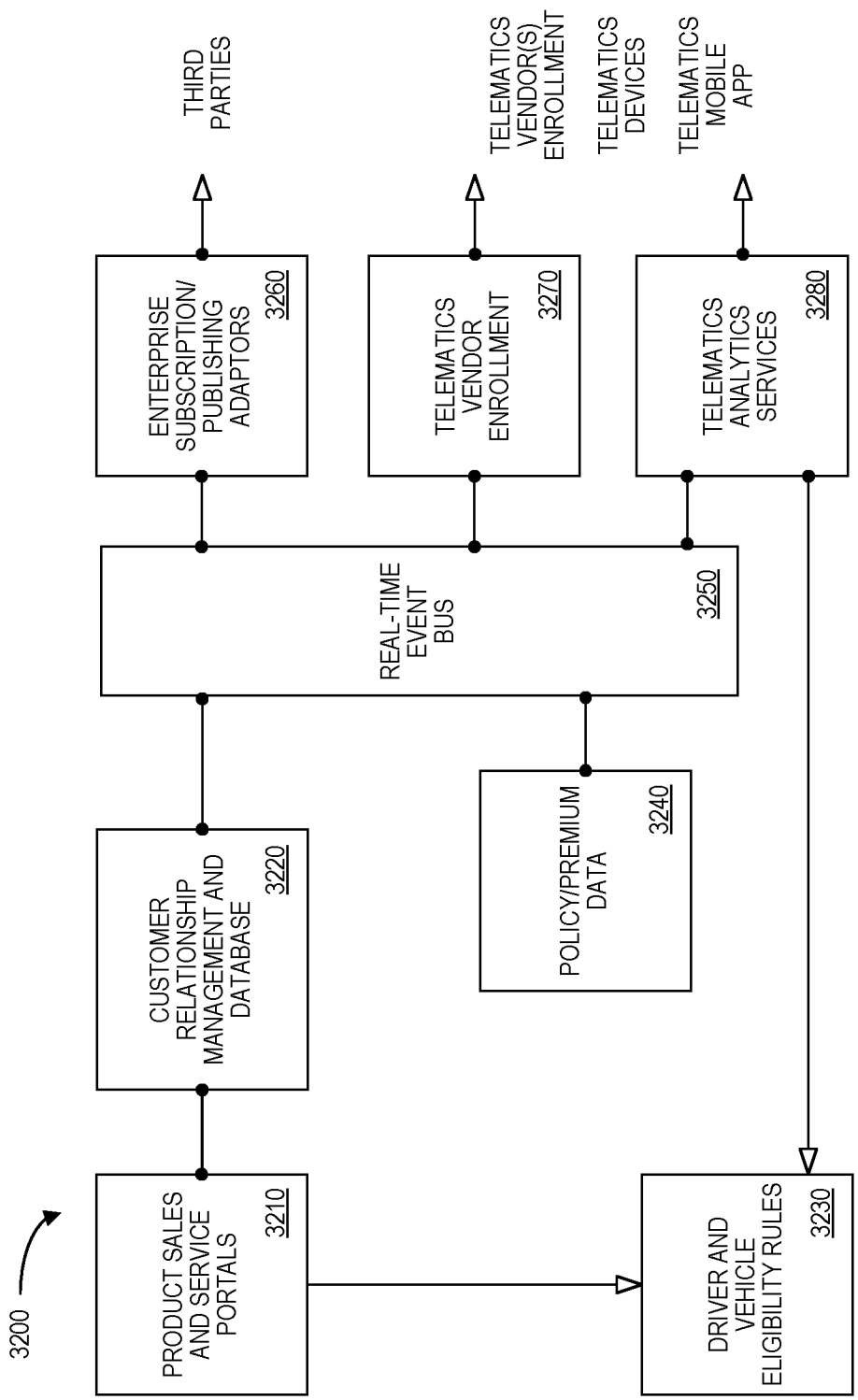
FIG. 32 is a real-time information flow diagram of a processing system in accordance with some embodiments.

FIG. 32 is a real-time information flow diagram of a processing system 3200 in accordance with some embodiments. In particular, an event bus 3250 may utilize a publisher-subscriber model to exchange event signals that an event has occurred (e.g., as opposed to a command to make something happen). The use of such an event bus 3250 may efficiently let a substantial number of entities realize that an event occurred and may conform to a common canonical model. For example, customer relationship management and database 3220, enterprise subscription/publishing adaptors 3260, telematics vendor enrollment 3270, and telematics analytics services 3280 (e.g., that analyzes the aggregated telematics, policy, customer experience and third party data, collectively known as big data, to determine compliance with telematics program, risk scoring and digital experience actions and insights) may interface with the event bus 3250 and provide data to third parties (and the ability to receive data from third parties), a telematics mobile application, etc. Product sales and service portals 3220 may create and utilize insurance policy and/or premium data. According to some embodiments, a product sales and service portal 3220 may query driver and vehicle eligibility rules 3230 (e.g., to determine if a driver and/or vehicle qualifies to participate in a telematics program). The driver and vehicle eligibility rules 3230 may be defined using historical information derived from telematics analytics services 3280 to improve risk selection. This type of processing system 3200 architecture may allow for plug-and-play design as well as device and/or vendor agnostic interfaces to leverage an IT infrastructure for insurance purposes.

Thus, embodiments may provide an automated and efficient way for remotely monitoring and/or controlling the use of a machine that provides faster, more accurate results.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in additional to and/or instead of the policies described herein (e.g., business insurance policies, motorcycle insurance policies, etc.). Similarly, although certain attributes were described in connection some embodiments herein, other types of attributes might be used instead.

According to some embodiments a risk score and/or driver signature data might be made available to another insurance company in connection with a future automobile insurance policy associated with the driver. For example, a driver's risk score might travel with him or her when they switch insurance companies (e.g., like a credit score might follow a person). A risk score might, in some embodiments, be associated with lead generation (e.g., to target better drivers with insurance offers) and/or gamified digital engagement to improve driving performance.

According to some embodiments, a risk score may be used to facilitate an incremental insurance policy. For example, an incremental insurance policy might be a "pay-per-mile" policy for infrequent drivers based on a number of miles driven. Similarly, an incremental insurance policy might instead be based on an amount of time spent driving (e.g., "pay-per-hour" insurance).

As described herein, information from a mobile personal communication device may be used in connection with risk score determinations and/or insurance underwriting decisions. Note, however, that information from the mobile personal communication device (e.g., a smartphone app) might also be used for other purposes. For example, a smartphone might offer vehicle diagnostics (e.g., associated with a battery life alert and/or road side assistance). As other example, the smartphone might be utilized for accident detection and/or adjudication, insurance claim processing (e.g., reducing the need for claim handler involvement), a First Notice Of Loss ("FNOL") and associated time requirements, etc.

According to some embodiments, the prediction of the operator identifier may be further based on social media data or other third-party data. For example, a social media post might indicate that a particular person is at an event (and this can be used to predict that he or she is the driver on the way home from the event). In some embodiments, this type of information might even be used to retroactively "correct" a prediction of an operator identifier.

As described herein, information from a mobile personal communication device is used to predict operator identifiers and/or to facilitate risk score calculations. Note, however, that information from other devices might supplement these processes. For example, information from an apparatus coupled to the machine (e.g., a tag or dongle) might be used to supplement smartphone data. Similarly, information from a device in direct communication with the machine (e.g., while attached to a windshield or dashboard) could be used to supplement smartphone data.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system associated with a risk relationship between an enterprise and an entity in connection with a vehicle and a mobile personal communication device, comprising:

a risk relationship data store containing electronic records, each electronic record including a risk relationship identifier along with at least one driver identifier and at least one vehicle identifier; and a back-end application computer server associated with a data processing service to reduce processing performed by the mobile personal communication device, including:

a communication port to receive encrypted vehicle information, representing operation of the vehicle, from an application executing on the mobile personal communication device, including association of the vehicle with a primary axis of movement and at least one of geo-position information and vehicle kinematics data, via a distributed communication network, and a back-end application computer processor, and a back-end application computer memory storing instructions that, when executed by the back-end application computer processor, cause the back-end application computer server to:

receive the encrypted vehicle information from the mobile personal communication device, decrypt the encrypted vehicle information to create vehicle information, determine a risk relationship identifier associated with the received vehicle information, based on the received vehicle information, automatically predict a current driver identifier of a person who is currently driving the vehicle associated with the received vehicle information, wherein said prediction utilizes all of:

movement of the mobile personal communication device relative to the primary axis of movement prior to operation of the vehicle, a prediction algorithm based on a pattern detected via a machine learning analysis of past driver usage of the vehicle in connection with the current driver of the vehicle and other drivers of the vehicle, wherein the pattern is based on clustering of given driver characteristics in data to identify discrete segments of use associated with a particular driver signature, and location information of the vehicle compared to employment information of the current driver of the vehicle received with biographical information during a creation of the electronic record, store, based on the predicted current driver identifier, at least some of the vehicle information in a database, identify, by the application executing on the mobile personal communication device, distracted operation of the vehicle via identification of at least one of: (i) accessing a text message, (ii) creating a text message, (iii) accessing an email message, (iv) accessing streaming video, and (v) accessing a chat application, calculate a risk score for the risk relationship based on all of: 1. the identified distracted operation, 2. the at least one of the geo-position information, 3. vehicle kinematics data along with the predicted current driver identifier, and 4. at least one machine safety feature associated with the vehicle identifier, wherein the risk score represents a risk assessment that includes expected claims and losses associated with the vehicle, compare the vehicle kinematics data with an expected value for the predicted current driver identifier;

adjust the risk relationship based on the comparison; and update an appropriate electronic record in the risk relationship data store with the calculated risk score.

2. The system of claim 1, wherein the machine learning analysis is associated with at least one of: (i) a location of operation, (ii) a time-of-day of operation, (iii) a day-of-week of operation, and (iv) a time-of-year of operation.

3. The system of claim 1, wherein the vehicle is associated with a primary direction of movement and said prediction is based at least in part on a location of the mobile personal communication device relative to the primary direction of vehicle during operation of the vehicle.

4. The system of claim 1, wherein the vehicle exchanges information with the mobile personal communication device and said prediction is based at least in part on the exchanged information, and further wherein the exchanged information is associated with at least one of: (i) a manual driver selection, (ii) a location of the mobile personal communication device within the vehicle, (iii) a command to start the vehicle, and (iv) telematics information associated with the vehicle.

5. The system of claim 1, wherein the distracted operation is associated with participating in a telephone call and at least one of: (i) accessing the text message, (ii) creating the text message, (iii) accessing the email message, (iv) accessing streaming video, and (v) the chat application.

6. The system of claim 1, wherein the at least one vehicle safety feature is associated with (i) adaptive headlights, and at least one of: (ii) an autonomous operation feature, (iii) a camera, (iv) a sensor, (v) an automatic braking feature, (vi) a brake warning feature, (vii) a parking feature, and (viii) a lane departure warning.

7. The system of claim 6, wherein a determination that a safety feature is associated with the vehicle identifier is based on a safety feature database containing indications of safety features in connection with vehicle identifiers.

8. The system of claim 7, wherein the safety feature database is maintained by at least one of: (i) a vehicle manufacturer, (ii) vehicle dealerships, (iii) a governmental department of motor vehicles, and (iv) a third-party service.

9. The system of claim 1, wherein the risk relationship is an automobile insurance policy, the enterprise is an insurance company, and the mobile personal communication device is a smartphone.

10. The system of claim 9, wherein the risk score is used to adjust at least one of: (i) an insurance premium percentage discount, (ii) an insurance premium monetary discount, (iii) an insurance coverage amount, and (iv) a deductible amount.

11. The system of claim 9, wherein the automobile insurance policy comprises at least one of: (i) a potential automobile insurance policy, (ii) a newly issued automobile insurance policy, and (iii) an automobile insurance policy renewal.

12. The system of claim 9, wherein the risk score is made available to another insurance company in connection with a future automobile insurance policy associated with the current driver.

13. The system of claim 9, wherein risk score is used to target the current driver with an insurance offer.

14. The system of claim 9, wherein the risk score is used to facilitate an incremental insurance policy associated with at least one of: (i) a number of miles driven, and (ii) an amount of time spent driving.

15. The system of claim 9, wherein the information from the smartphone is further used in connection with at least one of: (i) vehicle diagnostics, (ii) accident detection, (iii) insurance claim processing, and (iv) a first notice of loss.

16. The system of claim 9, wherein the prediction of the current driver identifier is further based on at least one of: (i) social media data, and (ii) third-party data.

17. The system of claim 9, wherein the smartphone device is further to receive information from an apparatus coupled to, or in direct communication with, the vehicle.

18. The system of claim 1, wherein prior to storing the electronic record, the communication port is adapted to receive risk relationship type data and zip code data for the entity, and in response to receipt of the risk relationship type data and the zip code data, a web browser module executing on the mobile personal communication device updates a user interface with additional questions associated with receipt of at least one of the risk relationship type data and the zip code data.

19. A computerized method associated with a risk relationship between an enterprise and an entity in connection with a machine and a mobile personal communication device, comprising:
  accessing a risk relationship data store containing electronic records, each electronic record including a risk relationship identifier along with at least one driver identifier and at least one vehicle identifier;
  receiving, at a back-end application computer server associated with a data processing service to reduce processing performed by the mobile personal communication device, encrypted vehicle information representing operation of the vehicle, from an application executing on the mobile personal communication device, including association of the vehicle with a primary axis of movement and at least one of geo-position information and vehicle kinematics data, via a distributed communication network;
  decrypting the encrypted vehicle information to create vehicle information;
  determining a risk relationship identifier associated with the received vehicle information;
  based on the received vehicle information, automatically predicting a current driver identifier of a person who is currently driving the vehicle associated with the received vehicle information, wherein said prediction utilizes all of:
    movement of the mobile personal communication device relative to the primary axis of movement prior to operation of the vehicle,
    a prediction algorithm based on a pattern detected via a machine learning analysis of past driver usage of the vehicle in connection with the current driver of the vehicle and other drivers of the vehicle, wherein the pattern is based on clustering of given driver characteristics in data to identify discrete segments of use associated with a particular driver signature, and
    location information of the vehicle compared to employment information of the current driver of the vehicle received with biographical information during a creation of the electronic record;
  storing, based on the predicted current driver identifier, at least some of the vehicle information in a database;
  identifying distracted operation of the vehicle via identification of at least one of: (i) accessing a text message, (ii) creating a text message, (iii) accessing an email message, (iv) accessing streaming video, and (v) accessing a chat application;
  calculating a risk score for the risk relationship based on all of: 1. the identified distracted operation, 2. the at least one of the geo-position information, 3. vehicle kinematics data along with the predicted current driver identifier, and 4. at least one machine safety feature associated with the vehicle identifier, wherein the risk score represents a risk assessment that includes expected claims and losses associated with the vehicle;
  comparing the vehicle kinematics data with an expected value for the predicted current driver identifier;
  adjusting the risk relationship based on the comparison; and
  updating an appropriate electronic record in the risk relationship data store with the calculated risk score.

20. The method of claim 19, wherein the machine learning analysis is associated with at least one of: (i) a location of operation, (ii) a time-of-day of operation, (iii) a day-of-week of operation, (iv) a time-of-year of operation.

* * * * *